United States Patent
Ding et al.

(10) Patent No.: US 12,473,872 B2
(45) Date of Patent: Nov. 18, 2025

(54) COMBINED SEALING PIECE, VOLUMETRIC MACHINE AND WIDE FUEL ENGINE

(71) Applicants: Zhiqiang Ding, Guangdong (CN); Junhao Ding, Guangdong (CN)

(72) Inventors: Zhiqiang Ding, Guangdong (CN); Junhao Ding, Guangdong (CN)

(*) Notice: Subject to any disclaimer, the term of this patent is extended or adjusted under 35 U.S.C. 154(b) by 0 days.

(21) Appl. No.: 18/842,094

(22) PCT Filed: Feb. 28, 2023

(86) PCT No.: PCT/CN2023/078671
§ 371 (c)(1),
(2) Date: Aug. 28, 2024

(87) PCT Pub. No.: WO2023/169254
PCT Pub. Date: Sep. 14, 2023

(65) Prior Publication Data
US 2025/0198363 A1     Jun. 19, 2025

(30) Foreign Application Priority Data
Mar. 9, 2022 (CN) .......................... 202210225328.8

(51) Int. Cl.
*F02F 11/00* (2006.01)
*F01C 19/00* (2006.01)
(Continued)

(52) U.S. Cl.
CPC .......... *F02F 11/007* (2013.01); *F01C 19/005* (2013.01); *F01C 19/025* (2013.01);
(Continued)

(58) Field of Classification Search
CPC ... F02B 2053/005; F02B 55/02; F02F 11/007; F01C 19/005; F01C 19/025; F01C 19/08
See application file for complete search history.

(56) References Cited

U.S. PATENT DOCUMENTS

| 4,106,780 A | * | 8/1978 | Black | ...................... F01C 19/08 277/357 |
| 2013/0028771 A1 | * | 1/2013 | Gekht | ...................... F01C 1/00 29/888.012 |

FOREIGN PATENT DOCUMENTS

| CN | 110344964 A | * | 10/2019 | ............. F02B 55/08 |
| CN | 111852862 A | | 10/2020 | |

(Continued)

OTHER PUBLICATIONS

International Search Report dated Jun. 28, 2023, issued in connection with International Application No. PCT/CN2023/78671, along with an English-language translation thereof (6 pages).
(Continued)

*Primary Examiner* — Ngoc T Nguyen
(74) *Attorney, Agent, or Firm* — McCarter & English, LLP

(57) ABSTRACT

Provided are a combined sealing piece, a volumetric machine and a wide fuel engine using the combined sealing piece. The combined sealing piece includes a slider with a main sealing piece. The combined sealing piece further includes at least one auxiliary sealing piece, a first auxiliary sealing piece is backed against the slider or leans against the main sealing piece and the slider at the same time, and an elastic member is disposed between the first auxiliary sealing piece and the slider.

40 Claims, 37 Drawing Sheets

(51) Int. Cl.
  *F01C 19/02*     (2006.01)
  *F01C 19/08*     (2006.01)
  *F02B 53/00*     (2006.01)
  *F02B 53/10*     (2006.01)
  *F02B 55/02*     (2006.01)
  *F02B 55/10*     (2006.01)

(52) U.S. Cl.
  CPC .............. *F01C 19/08* (2013.01); *F02B 53/10* (2013.01); *F02B 55/02* (2013.01); *F02B 55/10* (2013.01); *F02B 2053/005* (2013.01)

(56) References Cited

FOREIGN PATENT DOCUMENTS

| | | |
|---|---|---|
| CN | 112360737 A | 2/2021 |
| CN | 214742069 U | 11/2021 |
| CN | 217742069 U | 11/2022 |
| JP | 2014206173 A | 10/2014 |

OTHER PUBLICATIONS

Written Opinion dated Jun. 28, 2023, issued in connection with International Application No. PCT/CN2023/78671 (5 pages).

\* cited by examiner

COMBINED SEALING PIECE, VOLUMETRIC MACHINE AND WIDE FUEL ENGINE

CROSS-REFERENCES TO RELATED APPLICATIONS

This is a National Stage Application, filed under 35 U.S.C. 371, of International Patent Application No. PCT/CN2023/078671, filed on Feb. 28, 2023, which claims priority to Chinese Patent Application No. 202210225328.8 filed with the China National Intellectual Property Administration (CNIPA) on Mar. 9, 2022, the disclosure of which is incorporated herein by reference in its entirety.

TECHNICAL FIELD

The present application relates to the field of volumetric machines for compression and expansion of a working medium, for example, a combined sealing piece, a volumetric machine, and a wide fuel engine.

BACKGROUND

The crank-piston internal combustion engine has gone through more than 140 years of improvement, the manufacturing has become increasingly sophisticated, the structure is more and more complex, the thermal efficiency is close to the limit, and it is difficult to make any satisfactory breakthroughs. With the introduction of increasingly stringent emission standards in recent years, people have shifted the focus of research and development from the internal combustion engine to the exhaust after-treatment, undoubtedly leading to increased manufacturing costs and usage costs, which may even outweigh the benefits.

How to break through the limitations of the crank-piston internal combustion engine? People thought of the step-by-step cycle method, that is, suction and compression, combustion, and expansion and exhausting are performed step by step in different volumetric spaces. The purposes are described below.

First, since the fuel is burned in a specific combustion chamber, the combustion time is greatly extended so that the carbon monoxide CO, hydrocarbons HC, and particulate matter that are generated in the crank-piston internal combustion engine and have no time to be completely burned are not produced at all or may be burned in the combustion chamber after being produced in small quantities, and environmental advantages are obvious.

Second, after the fuel is completely burned, the high heat is obtained; the volume at the power side can easily be greater than the volume at the compression side, which is equivalent to the Atkinson cycle and is conducive to ensuring higher thermal efficiency.

The gas turbine belongs to the Brayton cycle, which may also be considered as a step-by-step cycle method. The gas turbine can operate only in a propeller working condition or a power generation working condition, has a high cost, and is not suitable for most occasions. Except for the gas turbine, the step-by-step cycle method has not yet had successful commercial applications. The reason is firstly that the efficiency at the compression side is too low at higher pressure and secondly that the expansion side has technical problems such as loose sealing at higher pressure.

Based on the principle of the internal combustion engine, the maximum pressure of the working medium in a cycle of the step-by-step cycle method cannot be too low, but should be increased as much as possible, which is directly related to the thermal efficiency. The single-stage working pressure of various volumetric compressors is generally below 0.7 MPa, while for efficient internal combustion engines, the single-stage working pressure must be at least above 3 MPa.

Simply increasing the maximum pressure of the working medium may be achieved through the multi-stage series connection of compressors. The crank-piston compressor has multiple piston rings for sealing, has a good sealing effect, and is most suitable for multi-stage series use. The disadvantage is that the clearance volume is large, and 2 to 3 stages are required in series to reach a pressure of 3 MPa. If there are multiple stages connected in series, the friction loss increases, the overall efficiency is not ideal, the volume, weight, and cost are too large, and the practicality is reduced.

In industrial rotary compressors, such as screws and scrolls, it is impossible for the components that form a closed volume to be in complete contact with each other. Sometimes, liquids such as water are used for auxiliary sealing, and the sealing effect is limited. The improvement method is to increase the component accuracy. The working pressure is difficult to increase.

In another type of rotary compressor, such as the cam rotor type and rolling rotor type or the sliding vane type and rotary vane type, the clearance volume is relatively small. However, this type of compressor using the sliding vane adopts a single sliding vane structure and has only one level of sealing, the simple contact sealing effect is very limited, the leakage is serious in case of high pressure, and the ideal pressure cannot be reached. Since the used sliding vane basically adopts a single line contact, the contact stress is too large in case of too high a rotational speed, and the rotational speed is limited.

To sum up, for an engine using the step-by-step cycle method, the satisfactory efficiency at the compression side needs to be achieved at higher pressure, and the expansion side needs to operate efficiently at higher pressure. The most ideal is that a single stage without a series connection can achieve high pressure and high efficiency, which has practical significance for industries such as compressors. To achieve this, it is necessary to select a volumetric machine with a small clearance volume and improve a contact sealing piece.

In Chinese Patent Application No. 201680025835.X, the following is proposed: the sliding vane is divided into two parts: a slider (that is, a gate 600) and a sealing piece (that is, a tip sealing member 620). The slider slides back and forth along the radial direction to drive the sealing piece to slide together. The function of the slider is to withstand pressure and bending moment, and the function of the sealing piece is to seal. If the sliding vane is decomposed into a combination of the slider and the sealing piece, it still belongs to primary seal.

In Chinese Patent Applications No. 200910194315.3 and No. 201310021409.7, a double sliding vane structure is adopted. Although the sealing effect is somewhat improved, the mass of the sliding vane is still relatively large, so the double sliding vane structure can only be used in an air conditioner compressor or a low-speed and low-pressure situation.

Another type of sealing piece has only a slight displacement relative to the component that accommodates the sealing piece. For example, the apex seal for the rotor of the Felix Wankel rotary engine has only a slight displacement relative to the outline of the rotor, and in another rotary engine, the outline of the rotor of the rotary engine is similar with the outline of the inner wall of the cylinder block of the Felix Wankel rotary engine, the apex seal for the inner wall of the cylinder block of the rotary engine has only a slight displacement relative to the outline of the cylinder block of the rotary engine. The sealing performance of two sealing pieces, which are referred to as the apex seal for the rotor of the Felix Wankel rotary engine and the apex seal for the inner wall of the cylinder block of the rotary engine, is a difficult problem that has not yet been completely solved.

SUMMARY

The present application provides a combined sealing piece, a volumetric machine, and a wide fuel engine. The combined sealing piece is provided to achieve both good sealing during working under relatively high pressure and the normal operation in a relatively wide rotational speed range. The present application further provides the volumetric machine, which is manufactured using an improved combined sealing piece to achieve satisfactory efficiency in a single stage under relatively high pressure. The present application further provides the wide fuel engine, which is manufactured using an improved volumetric machine to achieve the purpose of being more environmentally friendly and energy-saving.

The present application adopts the technical solutions described below.

The present application provides a combined sealing piece. The combined sealing piece includes a slider with a main sealing piece, where the combined sealing piece further includes at least one auxiliary sealing piece, a first auxiliary sealing piece of the at least one auxiliary sealing piece is backed against the slider or leans against the main sealing piece and the slider at the same time, an elastic member is disposed between the first auxiliary sealing piece and the slider.

The present application further provides a volumetric machine. The volumetric machine includes a rotor, a cylinder block, and cylinder heads located at two sides of the cylinder block.

The rotor is rotatably mounted in a cylindrical inner wall of the cylinder block through a main shaft and bearings by means of the cylinder heads.

The rotor is a cam rotor, an outline of the rotor extends smoothly from a maximum radius arc to two sides until overlapping, the distance from each point of the outline to a rotary axis center gradually decreases from the maximum value to the minimum value during an extension process, an arc cylindrical surface of the maximum radius arc includes at least one groove, and a radial sealing strip that acts on the cylindrical inner wall of the cylinder block is disposed in a groove of the at least one groove.

Each of two end surfaces of the rotor includes at least a pair of arc-shaped grooves and arc-shaped sealing members in the at least a pair of arc-shaped grooves.

The cylinder block is provided with a front accommodation cavity configured to accommodate a combined sealing piece and a rear accommodation cavity configured to accommodate a drive mechanism of the combined sealing piece.

A variable volume is isolated in the cylindrical inner wall of the cylinder block by the rotor and the combined sealing piece, and an opening and a valve for entry and exit of a working medium are located on the cylinder block or a cylinder head of the cylinder heads on each of one side of a low-pressure region and one side of a high-pressure region separated by the combined sealing piece, respectively.

The volumetric machine further includes a lubrication channel and a cooling surface.

The combined sealing piece is the combined sealing piece in the preceding technical solution.

The present application further provides a volumetric machine. The volumetric machine includes a rotor, a cylinder block, and cylinder heads located at two sides of the cylinder block.

The rotor is rotatably and eccentrically mounted in a cylindrical inner wall of the cylinder block through a main shaft and bearings by means of the cylinder heads.

The rotor is a rotor of a combined sealing piece, a basic cylinder of the rotor is provided with an accommodation cavity that passes through a rotation axis, and the accommodation cavity is configured to accommodate the combined sealing piece.

Each of two end surfaces of the rotor includes at least a pair of arc-shaped grooves with the same radius and arc-shaped sealing members in the at least a pair of arc-shaped grooves.

At least one groove is opened on an inner wall where the rotation axis of the rotor is closest to the cylindrical inner wall of the cylinder block, and a radial sealing strip that acts on the rotor is disposed in a groove of the at least one groove.

A variable volume is isolated in the cylindrical inner wall of the cylinder block by the rotor and the radial sealing strip that acts on the rotor, and an opening and a valve for entry and exit of a working medium are on the cylinder block or a cylinder head of the cylinder heads on each of one side of a low-pressure region and one side of a high-pressure region separated by the radial sealing strip, respectively.

The volumetric machine further includes a lubrication channel and a cooling surface.

The combined sealing piece is the combined sealing piece in the preceding technical solution.

The present application further provides a volumetric machine. The volumetric machine includes a rotor, a cylinder block, and cylinder heads located at two sides of the cylinder block.

The rotor is rotatably mounted in a cylindrical inner wall of the cylinder block through a main shaft and bearings by means of the cylinder heads.

The rotor is an olive-shaped rotor, an outline of the rotor closest to the cylindrical inner wall of the cylinder block is formed by two centrosymmetric arcs whose centers are coincident, the outline extends smoothly from the same side of the two arcs towards each other until overlapping, the distance from each point of the outline to a rotary axis center gradually decreases from the maximum value to the minimum value during an extension process, cylindrical surfaces of the two arcs closest to the cylindrical inner wall of the cylinder block each include at least one groove, and a radial sealing strip that acts on the cylindrical inner wall of the cylinder block is disposed in a groove of the at least one groove.

Each of two end surfaces of the rotor is provided with at least one elliptical annular groove and a sealing ring located in the at least one elliptical annular groove.

The cylinder block is provided with two centrosymmetric front accommodation cavities configured to accommodate two combined sealing pieces and two centrosymmetric rear accommodation cavities configured to accommodate drive mechanisms of the two combined sealing pieces.

A variable volume is isolated in the cylindrical inner wall of the cylinder block by the rotor and the two combined sealing pieces, and two openings and two valves for entry and exit of a working medium are on the cylinder block or a cylinder head of the cylinder heads on each of a side of a low-pressure region and a side of a high-pressure region separated by the two combined sealing pieces, respectively.

The volumetric machine further includes a lubrication channel and a cooling surface.

Each combined sealing piece of the two combined sealing pieces is the combined sealing piece in the preceding technical solution.

The present application further provides a wide fuel engine. The wide fuel engine includes a compression side volumetric machine, an expansion side volumetric machine, and a working medium heater.

A outlet of the compression side volumetric machine is connected with an inlet of the working medium heater, and an outlet of the working medium heater is connected with an inlet of the expansion side volumetric machine.

A main shaft of the compression side volumetric machine is operably connected to a main shaft of the expansion side volumetric machine.

The compression side volumetric machine adopts any volumetric machine in the preceding technical solutions, where an opening is a working medium inlet of the compression side volumetric machine, and a valve is a one-way valve of the compression side volumetric machine.

The expansion side volumetric machine adopts any volumetric machine in the preceding technical solutions, where an opening is a working medium outlet of the expansion side volumetric machine, and a valve is a control valve of the expansion side volumetric machine.

The present application further provides a volumetric machine including a compressor on which the combined sealing piece in any of the preceding technical solutions is mounted.

The present application further provides an engine, on which the combined sealing piece in any of the preceding technical solutions is mounted.

The present application further provides the use of the combined sealing piece in any of the preceding technical solutions in a volumetric machine or an engine.

DETAILED DESCRIPTION

Figure 1:
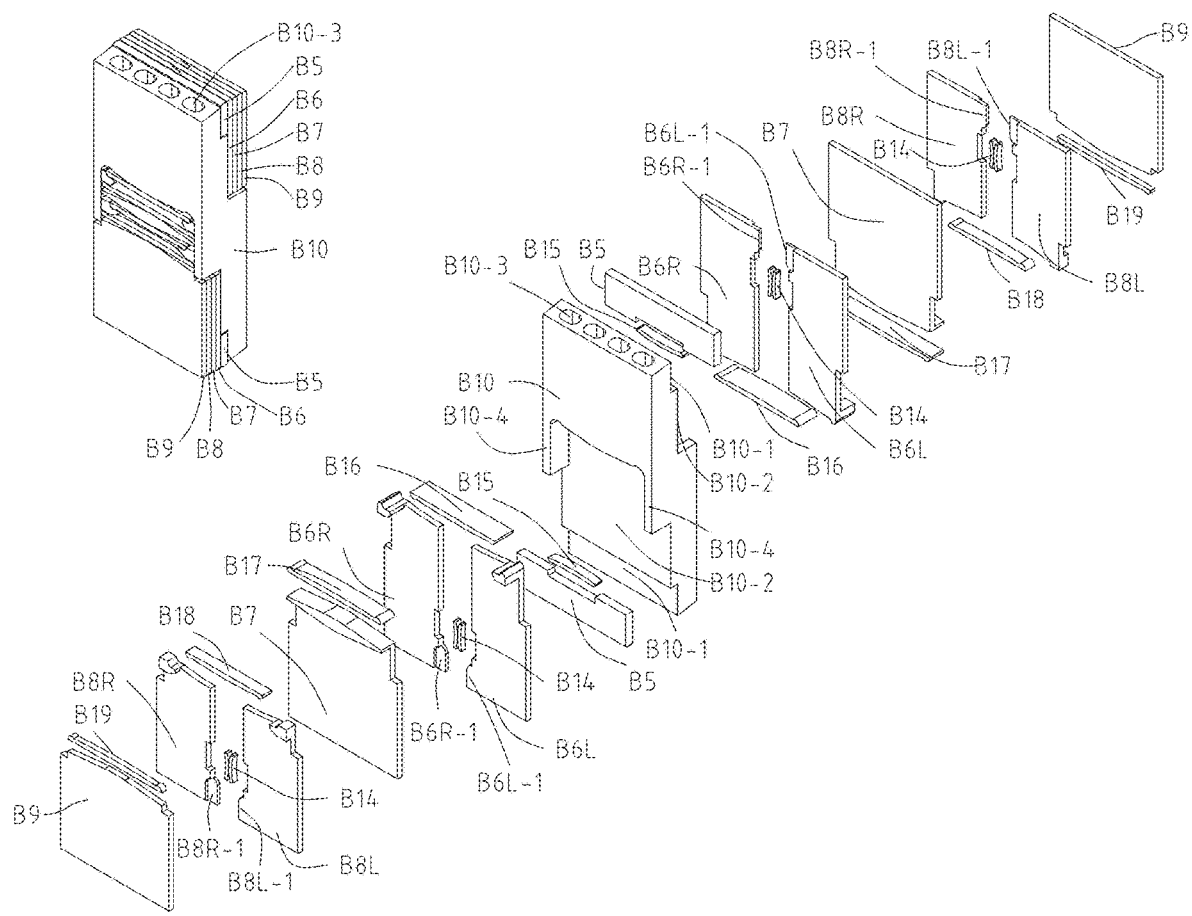
FIG. 1 is an exploded view of a combined sealing piece according to a first embodiment of the present application.

The details of one or more embodiments of the present application are set forth in the following description of the drawings and embodiments.

In application, the illustrated and described embodiments are not limited to the details of construction and arrangement of components set forth in the following description or illustrated in the drawings. The illustrated embodiments may be other embodiments and can be implemented or carried out in various manners. Multiple examples are provided by way of explanation of the disclosed embodiments, not limitation. Various modifications and variations may be made to the multiple embodiments of the present application without departing from the scope or essence of the disclosure of the present application. For example, features illustrated or described as part of one embodiment may be used with another embodiment to still produce other embodiments. Therefore, the disclosure of the present application covers such modifications and variations that fall within the scope of the appended claims and their equivalents.

The phrases and terminology used herein are for description and should not be regarded as limiting. The use of "including", "comprising", "having", or variations thereof herein is intended to include the items listed thereafter and their equivalents as well as additional items in an inclusive manner.

The present application is described below with reference to the multiple embodiments and drawings of the present application.

In the present application, the following terms and definitions may be used.

A working medium can achieve the mutual conversion of thermal energy and mechanical energy or work, such as air, a gas, a mixed gas, combustion gas, water vapor, supercritical liquid carbon dioxide, supercritical water, water, or a refrigerant.

A combined sealing piece may include a slider, a main sealing piece, and at least one auxiliary sealing piece.

A volumetric machine uses periodic changes in the volume of a sealed chamber to achieve the entering and discharge of the working medium and is used as a fluid energy conversion machine, such as a pump, a vacuum pump, a motor, a compressor, or an engine.

A wide fuel engine is an engine in which the mechanical moving part of the engine basically does not need to be modified and only the manner for a working medium heater to obtain heat is modified or switched. For example, an engine that can use different fuels simply by modifying or switching different fuel injection devices and/or combustion chambers. The working medium heater should be understood broadly. For example, the manner of heat exchange from an external heat source is adopted and the manner is not limited to internal combustion.

A compression ratio is the ratio of the volume of the largest sealed chamber at the compression side to the volume of the smallest sealed chamber at the moment when the one-way valve at the compression side is about to open and has the same thermal work meaning as the compression ratio of the crank-piston internal combustion engine. Apparently, the pressure of the working medium in the working medium heater is directly related to the compression ratio.

Central symmetry refers to that a figure can coincide with another figure after being rotated by 180° around a point in a plane.

The abbreviation for an electronic control unit is ECU.

The present application adopts the technical solutions described below.

In technical solution 1, a combined sealing piece includes a slider with a main sealing piece, where the combined sealing piece further includes at least one auxiliary sealing piece, a first auxiliary sealing piece of the at least one auxiliary sealing piece is backed against the slider or leans against the main sealing piece and the slider at the same time, an elastic member is disposed between the first auxiliary sealing piece and the slider.

In technical solution 2, according to the combined sealing piece in technical solution 1, a second auxiliary sealing piece of the at least one auxiliary sealing piece is backed against the first auxiliary sealing piece or leans against the first auxiliary sealing piece and the slider at the same time, and the elastic member is disposed between the second auxiliary sealing piece and the first auxiliary sealing piece or the slider.

In technical solution 3, according to the combined sealing piece in technical solution 2, the number of the at least one auxiliary sealing piece is N, and the at least one auxiliary sealing piece is arranged in the following continuous descending order.

The N-th auxiliary sealing piece is backed against the (N−1)-th auxiliary sealing piece or leans against the (N−1)-th auxiliary sealing piece and the slider at the same time, and the elastic member is disposed between the N-th auxiliary sealing piece and the (N−1)-th auxiliary sealing piece or the slider; the (N−1)-th auxiliary sealing piece is backed against the (N−2)-th auxiliary sealing piece or leans against the (N−2)-th auxiliary sealing piece and the slider at the same time, and the elastic member is disposed between the (N−1)-th auxiliary sealing piece and the (N−2)-th auxiliary sealing piece or the slider; . . . and so on until the sequence decreases to the second auxiliary sealing piece, where N is one of 3, 4, 5, 6, 7, 8, 9, or 10.

In technical solution 4, according to the combined sealing piece in any one of the preceding technical solutions, at least one of the main sealing piece or the at least one auxiliary sealing piece is formed by splicing a left piece and a right piece, and the elastic member for applying a transverse force is disposed between the left piece and the right piece.

In technical solution 5, according to the combined sealing piece in technical solution 4, the left piece and the right piece are provided with left and right cross lapped portions on a sealing end surface.

In technical solution 6, according to the combined sealing piece in any one of the preceding technical solutions, sealing end surfaces of the main sealing piece and/or the at least one auxiliary sealing piece are arc-shaped cylindrical surfaces.

In technical solution 7, according to the combined sealing piece in any one of the preceding technical solutions, the elastic member is disposed between the main sealing piece and the slider.

In technical solution 8, according to the combined sealing piece in any one of the preceding technical solutions, an accommodation cavity for accommodating the combined sealing piece includes at least one groove, a sealing strip and the elastic member are disposed in a groove of the at least one groove, and the sealing strip is in contact with the combined sealing piece through elastic member.

In technical solution 9, according to the combined sealing piece in technical solution 8, a cross-sectional shape of the sealing strip is basically triangular, and a direction of a force applied by the elastic member is biased towards a side of a low-pressure region.

In technical solution 10, according to the combined sealing piece in any one of the preceding technical solutions, a wear-resistant strip and a circular arc-shaped groove for accommodating the wear-resistant strip are further disposed near a port of an accommodation cavity for accommodating the combined sealing piece.

In technical solution 11, according to the combined sealing piece in any one of the preceding technical solutions, a combination of the main sealing piece and the at least one auxiliary sealing piece is disposed on each of a front surface and a back surface of the slider, and a side shape of the slider is centrosymmetric.

In technical solution 12, according to the combined sealing piece in technical solution 11, the slider is provided with a hollow portion and/or a stiffener.

In technical solution 13, according to the combined sealing piece in any one of the preceding technical solutions, the main sealing piece and the at least one auxiliary sealing piece are disposed on a surface of the slider, and a roller follower that passes through a shaft is mounted at an end of the slider.

In technical solution 14, according to the combined sealing piece in technical solution 1, the main sealing piece and the slider are integrated, and the at least one auxiliary sealing piece and a corresponding elastic member of the at least one auxiliary sealing piece are symmetrically distributed on two sides of the main sealing piece.

In technical solution 15, according to the combined sealing piece in technical solution 1, the main sealing piece and the slider are integrated, and two combinations of main sealing pieces, the at least one auxiliary sealing piece, and corresponding elastic members of the at least one auxiliary sealing piece are arranged symmetrically back to back with each other, where the main sealing piece serves as the slider.

According to one or more embodiments, the main sealing piece and the at least one auxiliary sealing piece included in the combined sealing piece may be combined together by the slider, may be placed in a specific accommodation cavity and slide back and forth in a straight line or swing in an arc relative to the accommodation cavity, and may move slightly or even be basically stationary. The sealing end surface of the combined sealing piece may be pressed against the surface of the component with periodic relative motion outside the accommodation cavity so that the radial sealing end surface is sealed, and two transverse side surfaces are sealed.

The First Embodiment of the Combined Sealing Piece

Referring to FIG. 1, the side shape of a slider B10 is centrosymmetric, the slider B10 includes two steps B10-1 for carrying main sealing pieces B5 and two steps B10-2 for carrying auxiliary sealing pieces B6, the auxiliary sealing piece B6 leans against the main sealing piece B5 and the step B10-2 of the slider B10, an auxiliary sealing piece B7 is backed against the auxiliary sealing piece B6, an auxiliary sealing piece B8 is backed against the auxiliary sealing piece B7, and an auxiliary sealing piece B9 is backed against the auxiliary sealing piece B8.

An elastic member B15 is disposed between the main sealing piece B5 and the slider B10, an elastic member B16 is disposed between the auxiliary sealing piece B6 and the slider B10, an elastic member B17 is disposed between the auxiliary sealing piece B7 and the auxiliary sealing piece B6, an elastic member B18 is disposed between the auxiliary sealing piece B8 and the auxiliary sealing piece B7, and an elastic member B19 is disposed between the auxiliary sealing piece B9 and the auxiliary sealing piece B8.

The auxiliary sealing piece B6 is formed by splicing a left piece B6L and a right piece B6R, the sealing end surface of the sealing piece is provided with left and right cross lapped portions B6R-1 and B6L-1, and an elastic member B14 for applying a transverse force is disposed between the left piece and the right piece. The auxiliary sealing piece B8 is formed by splicing a left piece B8L and a right piece B8R, the sealing end surface of the sealing piece is provided with left and right cross lapped portions B8R-1 and B8L-1, and the elastic member B14 for applying a transverse force is disposed between the left piece and the right piece.

The sealing end surfaces of the main sealing piece B5, the auxiliary sealing piece B6, the auxiliary sealing piece B7, the auxiliary sealing piece B8, and the auxiliary sealing piece B9 are arc-shaped cylindrical surfaces. The so-called sealing end surface refers to the sliding surface for the radial seal, which is at the head of each sealing piece.

The slider B10 may have at least one hollow portion B10-3 to reduce mass and inertia. The slider B10 may have a plate stiffener B10-4 to increase the bending strength and stiffness.

The Second Embodiment of the Combined Sealing Piece

Figure 2A:
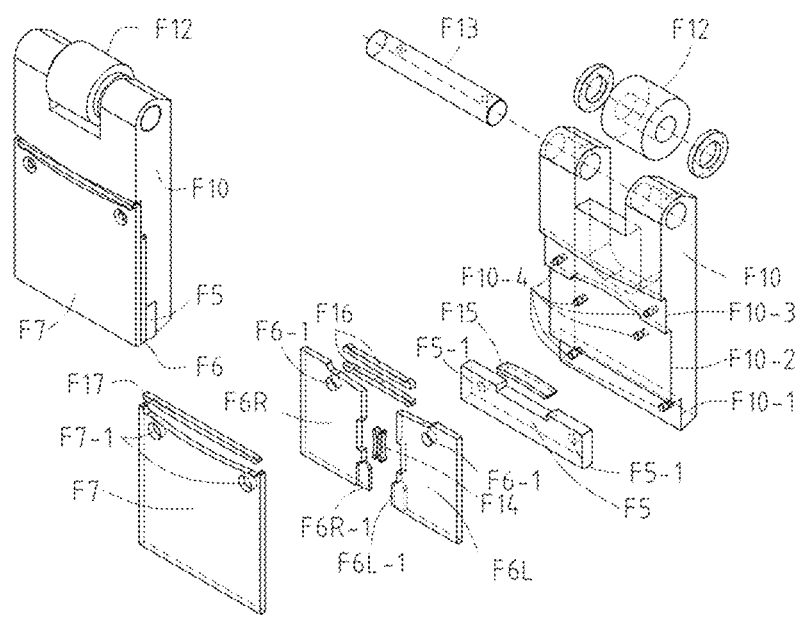
FIG. 2A is an exploded view of a combined sealing piece according to a second embodiment of the present application.
Figure 2B:
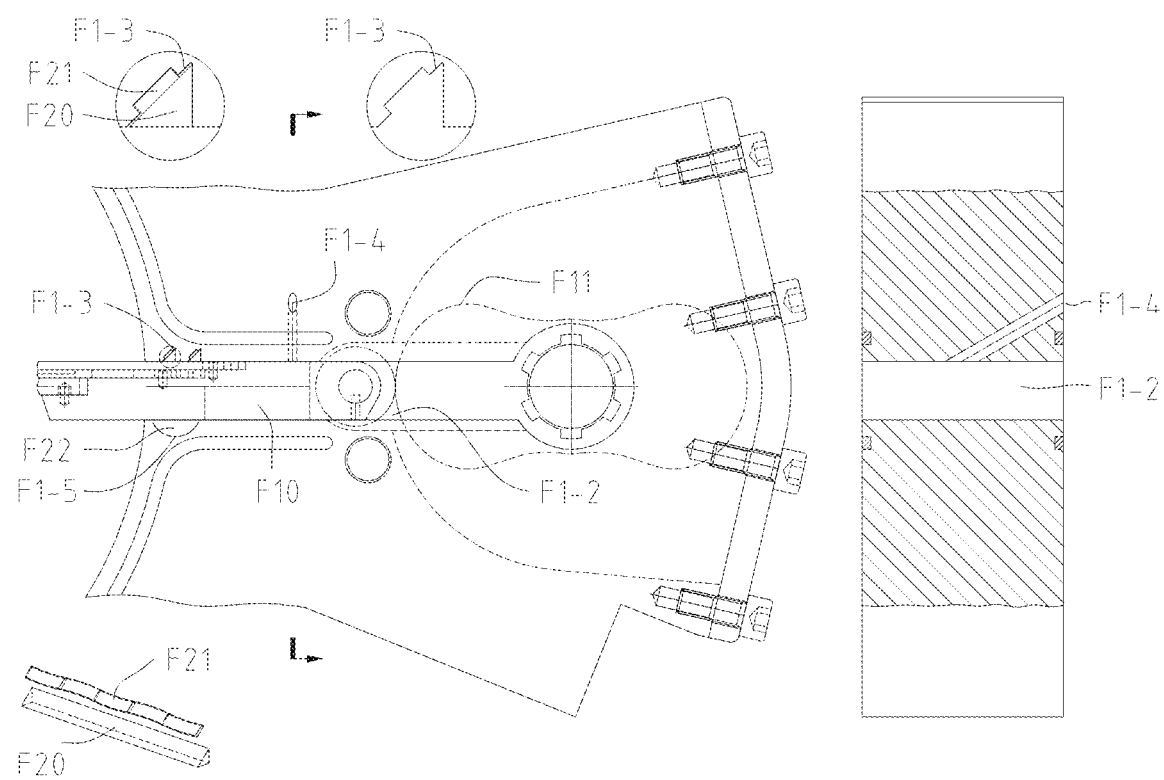
FIG. 2B is an assembly view of a combined sealing piece according to a second embodiment of the present application.

Referring to FIGS. 2A and 2B, a slider F10 has a step F10-1 for carrying a main sealing piece F5, a step F10-2 for carrying an auxiliary sealing piece F6, and a step F10-3 for carrying an auxiliary sealing piece F7, the auxiliary sealing piece F6 leans against the main sealing piece F5 and the step F10-2, the auxiliary sealing piece F7 leans against the auxiliary sealing piece F6 and the step F10-3, and each of the steps F10-1, F10-2, and F10-3 has a pair of pins F10-4.

An elastic member F15 is disposed between the main sealing piece F5 and the slider F10, an elastic member F16 is disposed between the auxiliary sealing piece F6 and the slider F10, and an elastic member F17 is disposed between the auxiliary sealing piece F7 and the slider F10.

The auxiliary sealing piece F6 is formed by splicing a left piece F6L and a right piece F6R, the sealing end surface of the sealing piece is provided with left and right cross lapped portions F6R-1 and F6L-1, and an elastic member F14 for applying a transverse force is disposed between the left piece and the right piece.

The sealing end surfaces of the main sealing piece F5, the auxiliary sealing piece F6, and the auxiliary sealing piece F7 are arc-shaped cylindrical surfaces. The so-called sealing end surface refers to the sliding surface for the radial seal, which is at the head of each sealing piece.

The main sealing piece F5 has a blind hole F5-1, and the auxiliary sealing piece F6 and the auxiliary sealing piece F7 have holes F6-1 and F7-1, which are separately sleeved on the pins F10-4 corresponding to the slider F10, so as to prevent the misalignment between the main sealing piece F5, the auxiliary sealing piece F6, and the auxiliary sealing piece F7 and the misalignment between the elastic members F15, F16, and F17 during assembly.

A roller follower F12 is mounted on the slider F10 through a shaft F13 and is in contact with a cam drive mechanism F11.

The main sealing piece and the auxiliary sealing piece that are carried by the slider F10 and the slider F10 are in an accommodation cavity F1-2. At least one groove F1-3 is disposed in the accommodation cavity F1-2. A sealing strip F20 and an elastic member F21 are disposed in the groove F1-3. The cross-sectional shape of the sealing strip F20 may be triangular, little space is occupied, and the matching with the angle of the force applied by the elastic member F21 is reasonable. The direction of application of force of the elastic member F21 is generally biased towards the side of the low-pressure region.

The accommodation cavity F1-2 is provided with a lubrication passage F1-4 in which the lubricating oil is transported; an arc-shaped groove F1-5 is further disposed near a port of the accommodation cavity F1-2 and configured to accommodate a wear-resistant strip F22, which is both wear-resistant and conducive to selecting the matching gap.

The Third Embodiment of the Combined Sealing Piece

Figure 3:
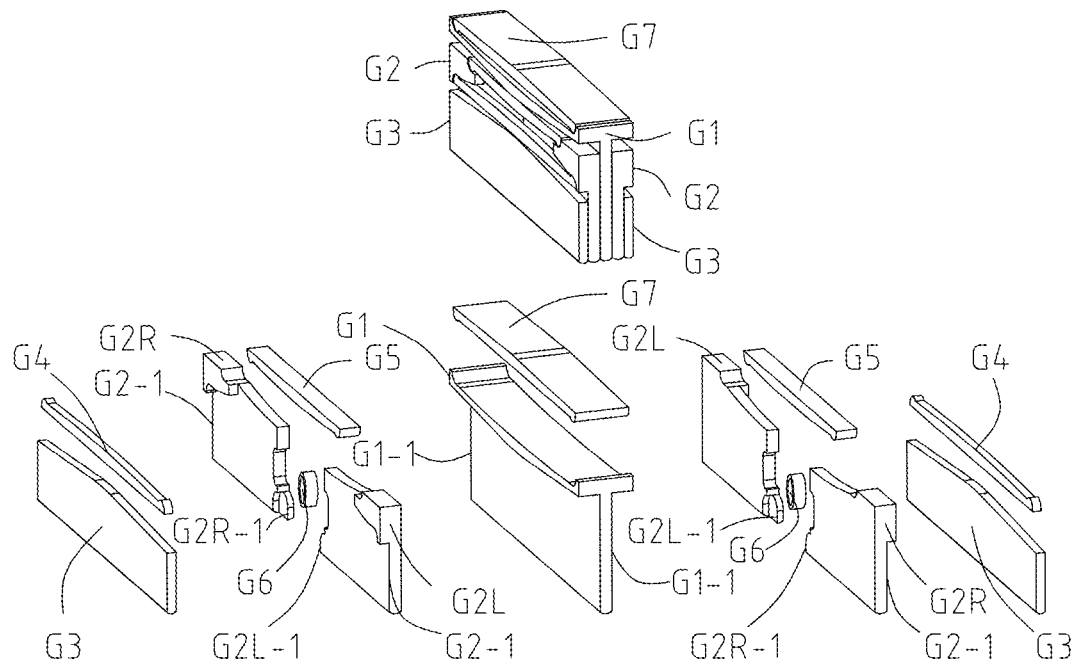
FIG. 3 is an exploded view of a combined sealing piece according to a third embodiment of the present application.

Referring to FIG. 3, a slider G1 is integrated with the main sealing piece, a step G1-1 for carrying an auxiliary sealing piece G2 is disposed on each of two sides of the main sealing piece, the auxiliary sealing piece G2 is backed against the step G1-1, the auxiliary sealing piece G2 has a step G2-1 for carrying an auxiliary sealing piece G3, the auxiliary sealing piece G3 is backed against the step G2-1, and two combinations of auxiliary sealing pieces G2 and G3 are symmetrically distributed on two sides of the slider or main sealing piece G1.

An elastic member G7 is disposed between the slider or main sealing piece G1 and the accommodation cavity, the accommodation cavity is not shown. An elastic member G5 is disposed between the auxiliary sealing piece G2 and the slider or main sealing piece G1, and an elastic member G4 is disposed between the auxiliary sealing piece G3 and the auxiliary sealing piece G2.

The auxiliary sealing piece G2 is formed by splicing a left piece G2L and a right piece G2R, the sealing end surface of the sealing piece is provided with left and right cross lapped portions G2R-1 and G2L-1, an elastic member G6 for applying a transverse force is disposed between the left piece and the right piece, and the shape of the elastic member G6 is a thin-walled tube.

The sealing end surfaces of the slider or main sealing piece G1, the auxiliary sealing piece G2, and the auxiliary sealing piece G3 are arc-shaped cylindrical surfaces. The so-called sealing end surface refers to the sliding surface for the radial seal, which is at the head of each sealing piece.

The Fourth Embodiment of the Combined Sealing Piece

Figure 4:
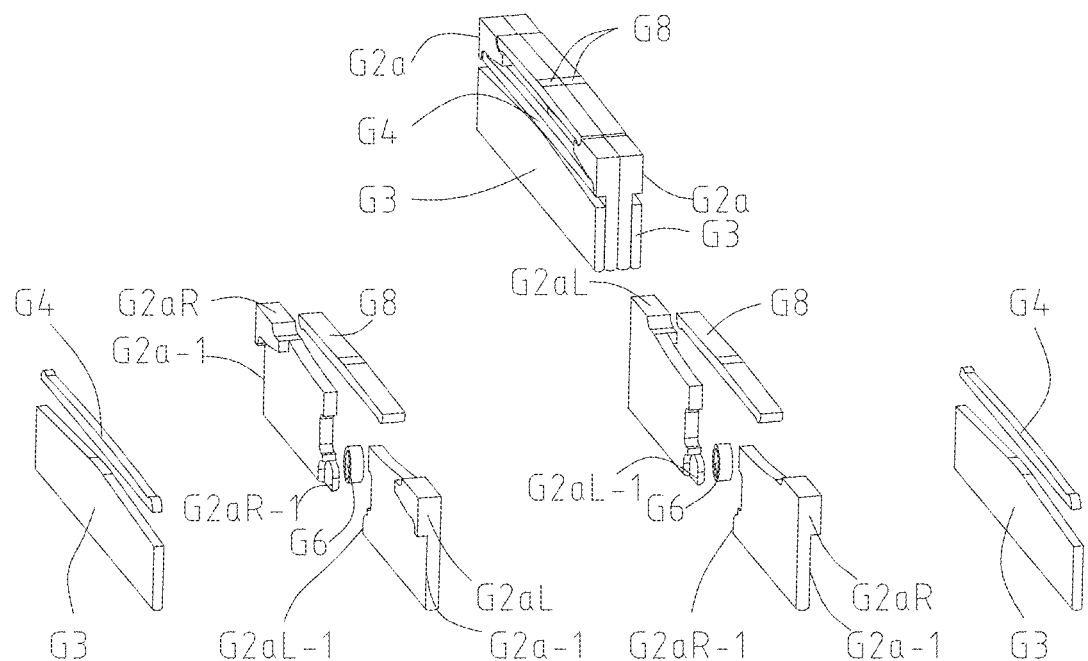
FIG. 4 is an exploded view of a combined sealing piece according to a fourth embodiment of the present application.

Referring to FIG. 4, a combined sealing piece derived based on the third embodiment is shown. The auxiliary sealing piece G2 in FIG. 3 has the same shape as G2a in FIG. 4. G2a serves as the slider and the main sealing piece here. The slider or main sealing piece G2a has a step G2a-1 for carrying the auxiliary sealing piece G3. The auxiliary sealing piece G3 is backed against the step G2a-1. The elastic member G4 is disposed between the auxiliary sealing piece G3 and the slider or main sealing piece G2a.

The slider or main sealing piece G2a is formed by splicing a left piece G2aL and a right piece G2aR, the sealing end surface of the sealing piece is provided with left and right cross lapped portions G2aR-1 and G2aL-1, the elastic member G6 for applying a transverse force is disposed between the left piece and the right piece, and the shape of the elastic member G6 is a thin-walled tube.

Two combinations of sliders or main sealing pieces G2a and auxiliary sealing pieces G3 are distributed symmetrically back to back, and the elastic members G4 and G6 are distributed symmetrically back to back. Elastic members G8 are in accommodation cavities formed after the two combinations of sliders or main sealing pieces G2a and the auxiliary sealing pieces G3 are combined, and the accommodation cavities are not shown.

The combined sealing piece in the third and fourth embodiments may be used in a situation where high pressure occurs alternately on two sides of the sealing end surface, for example, the apex seal for the rotor of the Felix Wankel rotary engine, and the apex seal for the inner wall of the cylinder block of another rotary engine.

The sealing end surfaces of the main sealing piece and the auxiliary sealing piece in the present application are arc-shaped cylindrical surfaces. The so-called arc shape includes the shape of a part of a circle or an ellipse and further includes various planar curves that are closest to a circle or an ellipse.

To sum up, the difference between the slider, the main sealing piece, and the auxiliary sealing piece is that the main function of the slider is to withstand pressure and bending moment, and the main function of the main sealing piece and the auxiliary sealing piece is sealing; the difference between the main sealing piece and the auxiliary sealing piece is that the displacement of the main sealing piece relative to the slider is minimal or even non-existent, the displacement of the auxiliary sealing piece relative to the slider is relatively large, and the farther away from the main sealing piece, the greater the displacement of the auxiliary sealing piece. Therefore, in the present application, different materials can be selected according to different functions. For example, the slider is made of high-strength materials, each sealing piece is made of wear-resistant materials, and the quality can be optimized. For example, each sealing piece may be made of ceramic material, which is both wear-resistant and lightweight.

The present application can achieve multi-level sealing very easily, the number of auxiliary sealing pieces is selected according to the pressure of the outputted or inputted working medium, the high total pressure can be decomposed step by step both in the radial direction and on the side surface, and a pressure difference with small leakage exists between each two layers of sealing pieces, so the combined sealing piece of the present application can work efficiently under very high pressure merely by matching the number of auxiliary sealing pieces with the pressure, which is the same as multiple sealing rings on the piston of the crank-piston compressor.

The combined sealing piece is used for the periodic movement of the volumetric machine. In case of high rotational speed, a large inertia force exists. Since the present application provides a multi-level sealing piece, the inertial force may be decomposed into each sealing piece so that the line contact pressure of a single sealing piece is reduced. Compared with the single sliding vane and double sliding vane solutions, a higher rotational speed or a wider rotational speed range can be achieved.

The surfaces of the main sealing piece and the auxiliary sealing piece of the present application may have a variety of oil storage stripes, and the adjacent sealing pieces periodically slide relative to each other during operation so that the lubricating oil can be evenly applied and brought to each sliding surface to better implement the function of lubricating and sealing.

In technical solution 16, a volumetric machine includes a rotor, a cylinder block, and cylinder heads located at two sides of the cylinder block.

The rotor is rotatably mounted in a cylindrical inner wall of the cylinder block through a main shaft and bearings by means of the cylinder heads.

The rotor is a cam rotor, an outline of the rotor extends smoothly from a maximum radius arc to two sides until overlapping, the distance from each point of the outline to a rotary axis center gradually decreases from the maximum value to the minimum value during an extension process, an arc cylindrical surface of the maximum radius arc includes at least one groove, and a radial sealing strip that acts on the cylindrical inner wall of the cylinder block is disposed in the groove.

Each of two end surfaces of the rotor is provided with at least one annular groove and a sealing ring in the groove.

The cylinder block is provided with a front accommodation cavity configured to accommodate a combined sealing piece and a rear accommodation cavity configured to accommodate a drive mechanism of the combined sealing piece.

A variable volume is isolated in the cylindrical inner wall of the cylinder block by the rotor and the combined sealing piece, and an opening and a valve for entry and exit of a working medium are located on the cylinder block or a cylinder head of the cylinder heads on each of one side of a low-pressure region and one side of a high-pressure region separated by the combined sealing piece, respectively.

The volumetric machine further includes a lubrication channel and a cooling surface.

The combined sealing piece is the combined sealing piece in any one of technical solutions 1 to 15.

In technical solution 17, according to the volumetric machine in technical solution 16, the radius of the maximum radius arc is R0, the center of the maximum radius arc coincides with the rotary axis center, a line between the midpoint of the maximum radius arc and the rotary axis center is a line of symmetry, the radius of another arc with the center on the line of symmetry is R1, a transition arc R2 is disposed between the arc with a radius of R0 and the arc with a radius of R1 on each of two sides of the line of symmetry, or multiple arcs replace the arc R2, and all the multiple arcs are adjacent, tangent, and connected into a smooth curve.

In technical solution 18, according to the volumetric machine in technical solution 16, an anti-off step is disposed between the radial sealing strip that acts on the cylindrical inner wall of the cylinder block and the groove of the radial sealing strip, the radial sealing strip is allowed to have a radial movement gap, and a position of the radial sealing strip on the arc cylindrical surface is centered or biased towards the side of the low-pressure region.

In technical solution 19, according to the volumetric machine in technical solution 16, each the two end surfaces of the rotor further includes a groove bottom of the at least one annular groove and an elastic sealing member between sealing rings, and a cross section of the sealing ring is basically square or rectangular; or the sealing ring is formed by rolling a sheet with a length greater than the circumference of the annular groove, and two ends of the sheet gradually become thinner.

In technical solution 20, according to the volumetric machine in technical solution 16, the cylinder block is provided with two cylindrical inner walls, two rotors with parallel rotation axes are separately mounted in the two cylindrical inner walls, parallel lines between the midpoint of the maximum radius arc and the rotary axis center of outlines of the rotors, and an inter-axis rotational speed ratio of the two rotors are 1:1, the front accommodation cavity is connected with the two cylindrical inner walls, sealing end surfaces of two combinations of main sealing pieces and auxiliary sealing pieces carried by a slider are in contact with the two rotors in opposite directions, an end of the slider receives a force from the rotor on one side acting on sealing end surfaces of multiple sealing pieces, the other end of the slider receives a force from the rotor on the other side acting on the sealing end surfaces of the multiple sealing pieces, the slider on which the two forces act slides back and forth, the two cylindrical inner walls serve as rear accommodation cavities for each other, and the two rotors serve as drive mechanisms of combined sealing pieces for each other.

In technical solution 21, according to the volumetric machine in technical solution 16, the lubrication channel passes through the bearings and the rotor, a lubricating oil inlet is disposed on a gland of one of the bearings at an end of the main shaft, and an oil return port is disposed on a gland of one of the bearings on the other end of the main shaft.

In technical solution 22, according to the volumetric machine in technical solution 21, a surface of the cylinder head facing the rotor is provided with at least one small dent or at least one thin groove, the at least one small dent or the at least one thin groove is closest to the cylindrical inner wall of the cylinder block and has an opportunity to be in contact with lubricating oil in sealing rings on the two end surfaces of the rotor.

In technical solution 23, according to the volumetric machine in technical solution 16, the cooling surface is formed by a hollow part in the cylinder head; or the hollow part used as the cooling surface is disposed in each of the cylinder head and the cylinder block, and circulating coolant passes through the hollow part.

In technical solution 24, a volumetric machine includes a rotor, a cylinder block, and cylinder heads located at two sides of the cylinder block.

The rotor is rotatably and eccentrically mounted in a cylindrical inner wall of the cylinder block through a main shaft and bearings by means of the cylinder heads.

The rotor is a rotor of a combined sealing piece, a basic cylinder of the rotor is provided with an accommodation cavity that passes through a rotation axis, and the accommodation cavity is configured to accommodate the combined sealing piece.

Each of two end surfaces of the rotor includes at least a pair of arc-shaped grooves and arc-shaped sealing members in the at least a pair of arc-shaped grooves.

At least one groove is opened on an inner wall where the rotation axis of the rotor is closest to the cylindrical inner wall of the cylinder block, and a radial sealing strip that acts on the rotor is disposed in the groove.

A variable volume is isolated in the cylindrical inner wall of the cylinder block by the rotor and the radial sealing strip that acts on the rotor, and an opening and a valve for entry and exit of a working medium are on the cylinder block or a cylinder head of the cylinder heads on each of one side of a low-pressure region and one side of a high-pressure region separated by the radial sealing strip, respectively.

The volumetric machine further includes a lubrication channel and a cooling surface.

The combined sealing piece is the combined sealing piece in any one of technical solutions 1 to 15.

In technical solution 25, according to the volumetric machine in technical solution 24, an inner wall of the cylindrical inner wall of the cylinder block facing away from the rotation axis of the rotor is basically an elliptical arc cylindrical surface, an inner wall of the groove opened where the rotation axis of the rotor is closest to the cylindrical inner wall of the cylinder block is an arc cylindrical surface, an arc center line of the arc cylindrical surface coincides with the rotation axis of the rotor, and the arc cylindrical surface and the elliptical arc cylindrical surface are adjacent and tangentially transitioned by an arc cylindrical surface with at least a radius.

In technical solution 26, according to the volumetric machine in technical solution 25, an anti-off step is disposed between the radial sealing strip that acts on the rotor and the groove of the radial sealing strip, the radial sealing strip is allowed to have a radial movement gap, a position of the radial sealing strip on the arc cylindrical surface is centered or biased towards the side of the low-pressure region, and an elastic member is disposed between the radial sealing strip and the groove of the radial sealing strip and the radial sealing strip is in contact with the rotor through the elastic member.

In technical solution 27, according to the volumetric machine in technical solution 24, each of the two end surfaces of the rotor includes an arc-shaped groove and an arc-shaped sealing member in the groove and further includes a groove bottom of the arc-shaped groove and an elastic sealing member between the arc-shaped sealing members, and a cross section of the arc-shaped sealing member is basically square or rectangular.

In technical solution 28, according to the volumetric machine in technical solution 27, the arc-shaped sealing member is provided with a concave-convex interlocking shape between a position closest to a front end in a direction of rotation and the arc-shaped groove, the arc-shaped sealing member is circumferentially fixed, and a tail of the arc-shaped sealing member is provided with a section of jointed arc-shaped sealing member.

In technical solution 29, according to the volumetric machine in technical solution 24, the lubrication channel passes through the bearings and the rotor, a lubricating oil inlet is disposed on a gland of one of the bearings at an end of the main shaft, and an oil return port is disposed on a gland of one of the bearings on the other end of the main shaft.

In technical solution 30, according to the volumetric machine in technical solution 24, the cooling surface is formed by a hollow part in the cylinder head; or the hollow part used as the cooling surface is disposed in each of the cylinder head and the cylinder block, and circulating coolant passes through the hollow part.

In technical solution 31, a volumetric machine includes a rotor, a cylinder block, and cylinder heads located at two sides of the cylinder block.

The rotor is rotatably mounted in a cylindrical inner wall of the cylinder block through a main shaft and bearings by means of the cylinder heads.

The rotor is an olive-shaped rotor, an outline of the rotor closest to the cylindrical inner wall of the cylinder block is formed by two centrosymmetric arcs whose centers are coincident, the outline extends smoothly from the same side of the two arcs towards each other until overlapping, the distance from each point of the outline to a rotary axis center gradually decreases from the maximum value to the minimum value during an extension process, cylindrical surfaces of the arcs closest to the cylindrical inner wall of the cylinder block each include at least one groove, and a radial sealing strip that acts on the cylindrical inner wall of the cylinder block is disposed in the groove.

Each of two end surfaces of the rotor is provided with at least one elliptical annular groove and a sealing ring located in the annular groove.

The cylinder block is provided with two centrosymmetric front accommodation cavities configured to accommodate two combined sealing pieces and two centrosymmetric rear accommodation cavities configured to accommodate drive mechanisms of the two combined sealing pieces.

A variable volume is isolated in the cylindrical inner wall of the cylinder block by the rotor and the combined sealing pieces, and two openings and two valves for entry and exit of a working medium are on the cylinder block or a cylinder head of the cylinder heads on each of a side of a low-pressure region and a side of a high-pressure region separated by the two combined sealing pieces, respectively.

The volumetric machine further includes a lubrication channel and a cooling surface.

Each combined sealing piece of the two combined sealing pieces is the combined sealing piece in any one of technical solutions 1 to 15.

In technical solution 32, according to the volumetric machine in technical solution 31, where the radius of the two centrosymmetric arcs whose centers are coincident is R00, an arc with a radius of R11 is disposed on each of two sides of the two arcs with a radius of R00, two endpoints of each arc with a radius of R11 are equidistant from an adjacent arc with a radius of R00, R11>R00, the distance from the midpoint of the arc with a radius of R11 to the rotary axis center is less than R00, a transition arc with a radius of R22 or multiple transition arcs are disposed between each of the two arcs with a radius of R00 and a respective one of two arcs with a radius of R11, and all the multiple transition arcs are adjacent, tangent, and connected into a smooth curve.

In technical solution 33, according to the volumetric machine in technical solution 31, an anti-off step is disposed between the radial sealing strip that acts on the cylindrical inner wall of the cylinder block and the groove of the radial sealing strip, the radial sealing strip is allowed to have a radial movement gap, and a position of the radial sealing strip on an arc cylindrical surface is centered or biased towards the side of the low-pressure region.

In technical solution 34, according to the volumetric machine in technical solution 31, each of the two end surfaces of the rotor further includes a groove bottom of an annular groove and an elastic sealing member between sealing rings, and a cross section of the sealing ring is basically square or rectangular; or the sealing ring is formed by rolling a sheet with a length greater than the circumference of the annular groove, and two ends of the sheet gradually become thinner.

In technical solution 35, according to the volumetric machine in technical solution 31, a drive mechanism of the drive mechanisms of the two combined sealing pieces is a cam mechanism, the cam mechanism is rotatably mounted in a rear accommodation cavity of the two centrosymmetric rear accommodation cavities and driven by the main shaft at a fixed rotational speed ratio, a slider of a combined sealing piece of the two combined sealing pieces is provided with a roller follower, an end of the slider receives a force from the rotor acting on a sealing end surface of each sealing piece, the other end of the slider receives a force applied by a cam of the cam mechanism to the roller follower, and the slider on which the two forces act slides back and forth.

The shape of the cam is configured such that a main sealing piece is always in contact with the rotor and no relative displacement occurs between the main sealing piece and the slider. Moreover, the rotation of the rotor and the cam determines the moving position of the roller follower.

In technical solution 36, according to the volumetric machine in technical solution 31, the lubrication channel passes through the bearings and the rotor, a lubricating oil inlet is disposed on a gland of one of the bearings at an end of the main shaft, and an oil return port is on a gland of one of the bearings on the other end of the main shaft.

In technical solution 37, according to the volumetric machine in technical solution 36, a surface of the cylinder head facing the rotor is provided with at least one small dent or at least one thin groove, the at least one small dent or the at least one thin groove is closest to the cylindrical inner wall of the cylinder block and has an opportunity to be in contact with lubricating oil in sealing rings on the two end surfaces of the rotor.

In technical solution 38, according to the volumetric machine in technical solution 31, the cooling surface is formed by a hollow part in the cylinder head; or the hollow part used as the cooling surface is disposed in each of the cylinder head and the cylinder block, and circulating coolant passes through the hollow part.

In technical solutions 18, 26, and 33, the anti-off step is used for preventing the radial sealing strip from leaving the groove of the radial sealing strip; the position of the radial sealing strip is biased towards the side of the low-pressure region to further reduce the clearance volume for a compression volumetric machine and further reduce the negative pressure volume for an expansion volumetric machine, and the negative pressure volume is the volume when the expansion working medium has not entered an expansion chamber but the expansion chamber has begun to increase; too narrow a radial sealing strip of the arc cylindrical surface is centered, and to bias the position of the radial sealing strip towards the side of the low-pressure region, the width of the arc cylindrical surface needs to be increased appropriately; the anti-off step may be disposed at the side of the high-pressure region.

In technical solutions 19, 27, and 34, the elastic sealing member may be an annular ring of a thin-walled elastic metal tube used in places with higher temperatures or may be a rubber ring used in places with lower temperatures.

In technical solution 20, two cam rotors may be considered to have a conjugate relationship or an approximate conjugate relationship, so the outlines of the two cam rotors should be designed according to the conjugate relationship as much as possible. The two rotors are generally the same or may have different radial sizes.

In technical solutions 16, 24, and 31, if air cooling is used, the cooling surface may be understood as the cylinder head and/or the heat sink that is on the outer surface of the cylinder block.

The First Embodiment of the Volumetric Machine

Referring to FIGS. 5A, 5B, 5C, 5D, 5E, and 5F, the volumetric machine includes a rotor B2, a cylinder block B1, and cylinder heads B3 and B4 disposed at two sides of the cylinder block B1. The rotor B2 is rotatably mounted in a cylindrical inner wall B1-1 of the cylinder block B1 through a main shaft B30 and bearings B31 by means of the cylinder heads B3 and B4.

Figure 5A:
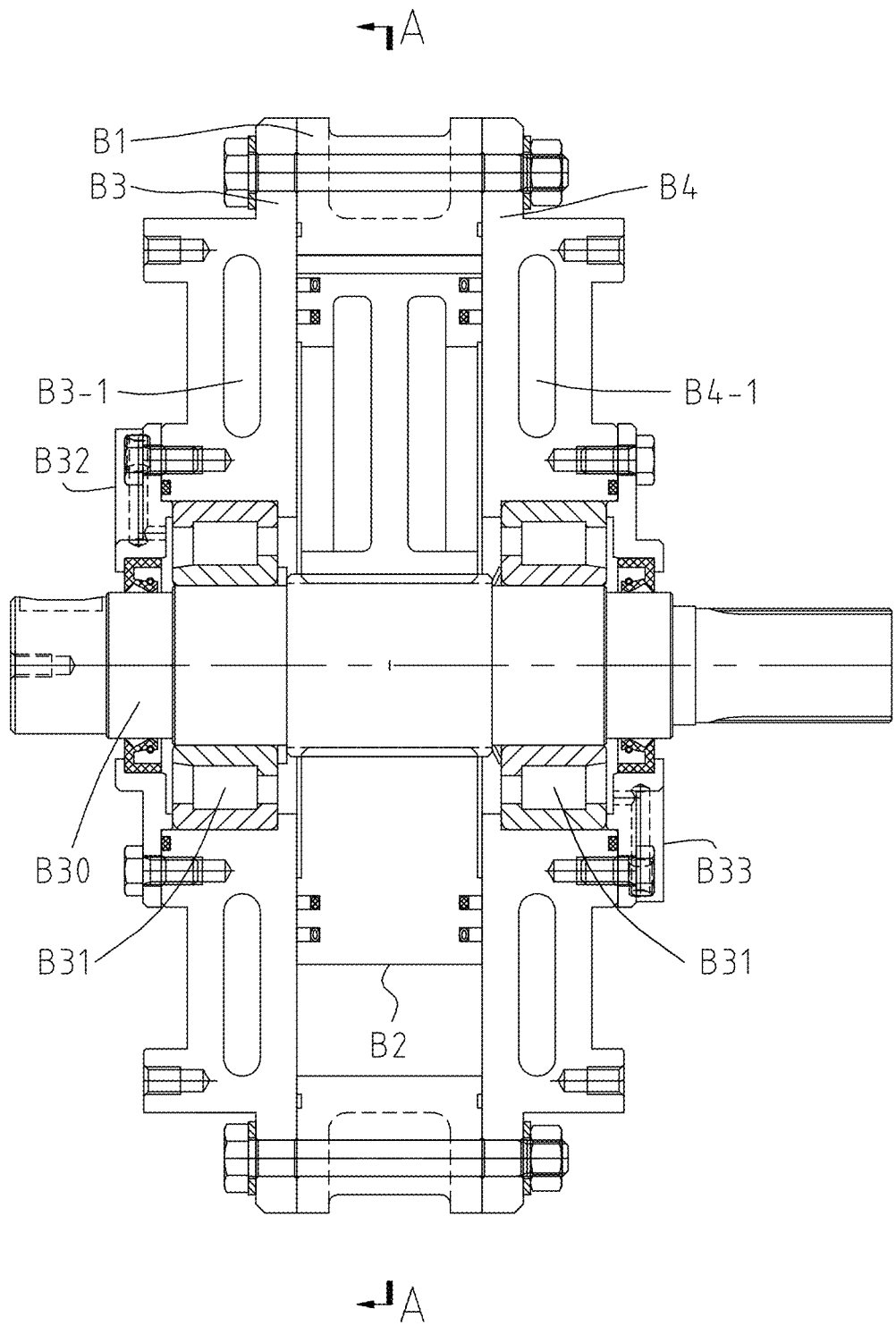
FIG. 5A is a single-axis axial sectional view of a volumetric machine according to a first embodiment of the present application.
Figure 5B:
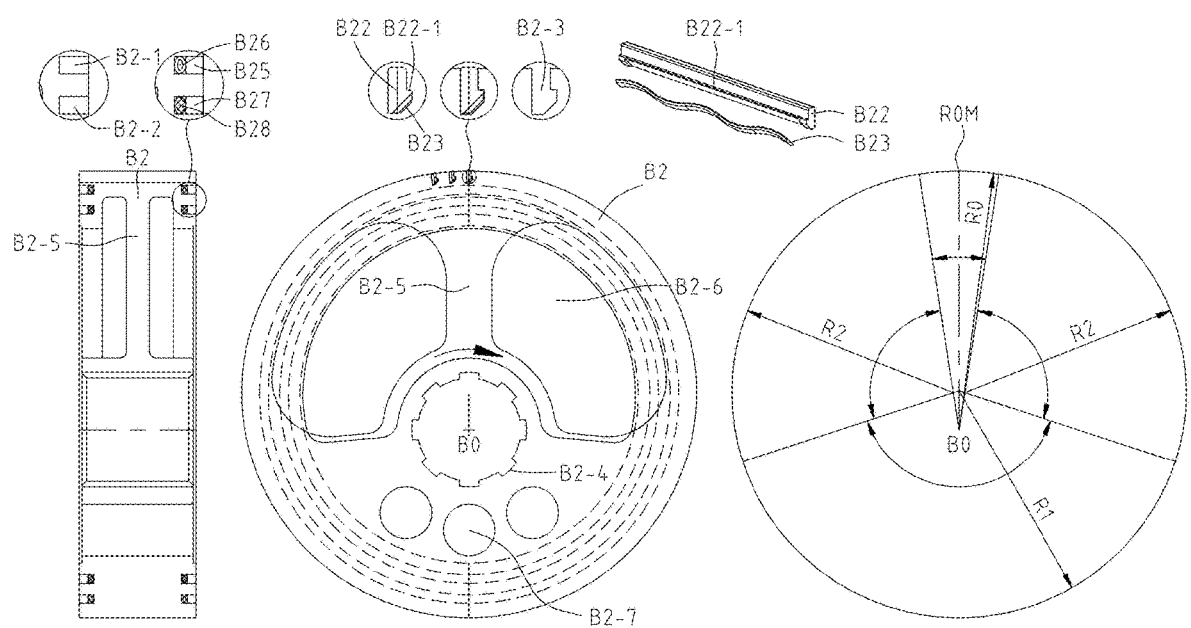
FIG. 5B is a view showing a cam rotor of a volumetric machine according to a first embodiment of the present application.

Referring to FIG. 5B, the rotor B2 is shaped like a cam. The outline of the rotor B2 extends smoothly from the arc with the maximum radius R0 to two sides until overlapping. The distance from each point of the outline to a rotary axis center B0 gradually decreases from the maximum value to the minimum value during the extension process. The method may be that the center of the arc with the maximum radius R0 coincides with the rotary axis center B0, a line R0M-B0 between the midpoint of the arc and the rotary axis center B0 is a line of symmetry, the radius of another arc with the center on the line of symmetry R0M-B0 is R1, R0>R1, a transition arc R2 is disposed between the arc with a radius of R0 and the arc with a radius of R1 on two sides of the line of symmetry R0M-B0, or multiple arcs replace the arc R2, and all the multiple arcs are adjacent, tangent, and connected into a smooth curve.

The arc with the maximum radius R0 is a pure arc, and the remaining arcs may be replaced by curves that approximate arcs, as long as the inertial force of the combined sealing piece in contact with the remaining arcs or curves that approximate arcs is less than a reasonable value. In this embodiment, the arcs may be used to achieve satisfactory results. Moreover, any curve may be replaced by adjacent tangent arcs within a certain accuracy range.

The arc cylindrical surface with the maximum radius R0 is provided with three grooves B2-3. The groove B2-3 accommodates a radial sealing strip B22 that acts on the cylindrical inner wall B1-1 of the cylinder block. The step in the groove B2-3 matches an anti-off step B22-1 of the radial sealing strip B22, and the radial sealing strip B22 is allowed to have a radial movement gap. The positions of the three grooves B2-3 on the arc cylindrical surface with a radius of R0 are biased towards the side of the low-pressure region. An elastic member B23 is disposed between the groove B2-3 and the radial sealing strip B22 and the radial sealing strip B22 is in contact with the cylindrical inner wall B1-1 of the cylinder block through the elastic member B23. If the sealing performance at a very low rotational speed may be neglected, the elastic member B23 is not necessary, for example, during use on the compression side.

The arc cylindrical surface with a radius of R0 is specially designed for the three grooves B2-3, and the positions of the three grooves B2-3 and the radial sealing strip B22 are biased towards the side of the low-pressure region to minimize the compression clearance volume and improve the volumetric efficiency. The clearance volume in this embodiment is closest to the limit 0. The clearance formed by the combined sealing piece, a cam rotor B2, and the cylindrical inner wall B1-1 of the cylinder block only leaves a necessary movement gap when the radial sealing strip B22 approaches an inlet 1-2 of the one-way valve, and basically no excess volume exists.

Each of two end surfaces of the rotor B2 is provided with an annular groove B2-1, an annular groove B2-2, and sealing rings B25 and B27 in the grooves. The end surfaces of the rotor B2 are further provided with elastic sealing members B26 and B28, and the elastic sealing members B26 and B28 are disposed between a groove bottom of the annular groove B2-1 and the sealing ring B25, and between a groove bottom of the annular groove B2-2 and the sealing ring B27. The cross sections of the sealing rings B25 and B27 are square or rectangular. The sealing rings B25 and B27 may be formed by rolling a sheet with a length greater than the circumference of the annular groove, and two ends of the sheet gradually become thinner. The elastic sealing member B26 may be an annular ring formed by a thin-walled elastic metal tube and used in the outer ring with higher temperature. The elastic sealing member B28 may be a rubber ring used in the inner ring with lower temperature.

Splines B2-4 are provided at the rotary axis center of the rotor B2. Some materials need to be dug out of the part of the cam rotor B2 facing away from the rotary axis center. Holes B2-6 are provided at two sides of a rib plate B2-5. In addition, a counterweight B2-7 is further provided for dynamic balance.

Figure 5C:
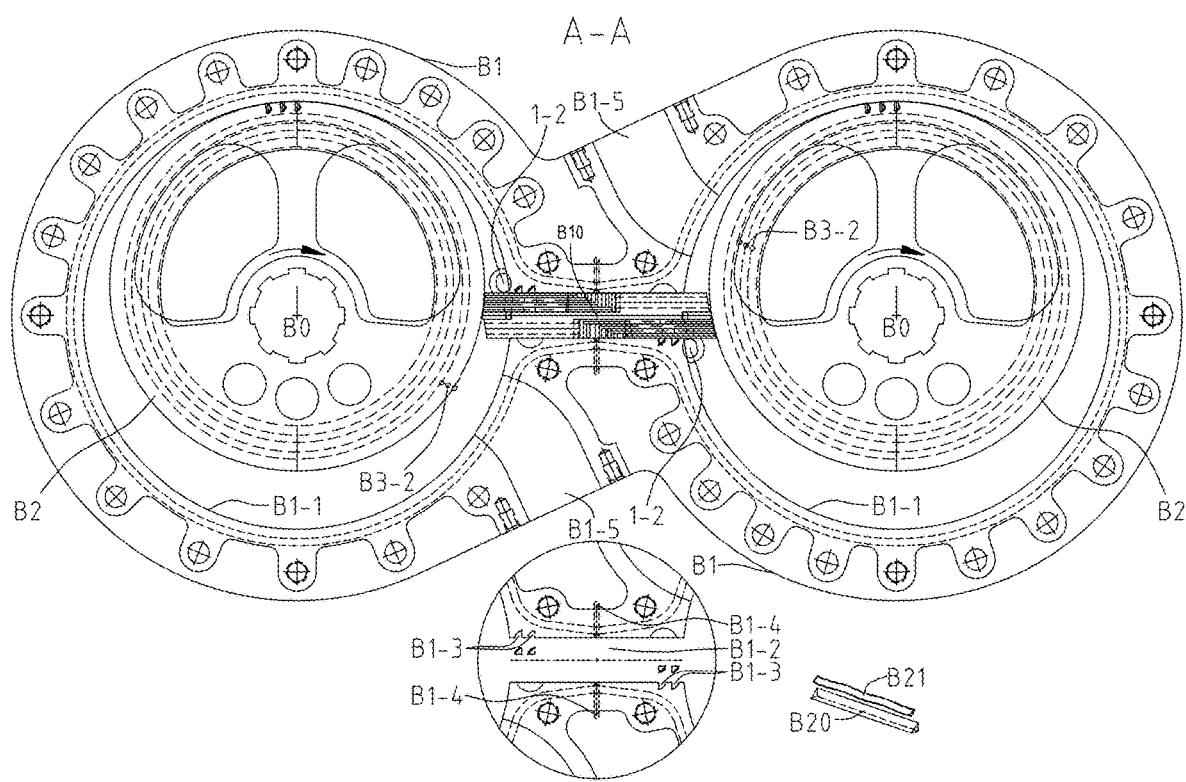
FIG. 5C is a sectional view of a volumetric machine taken along an A-A according to a first embodiment of the present application.
Figure 5D:
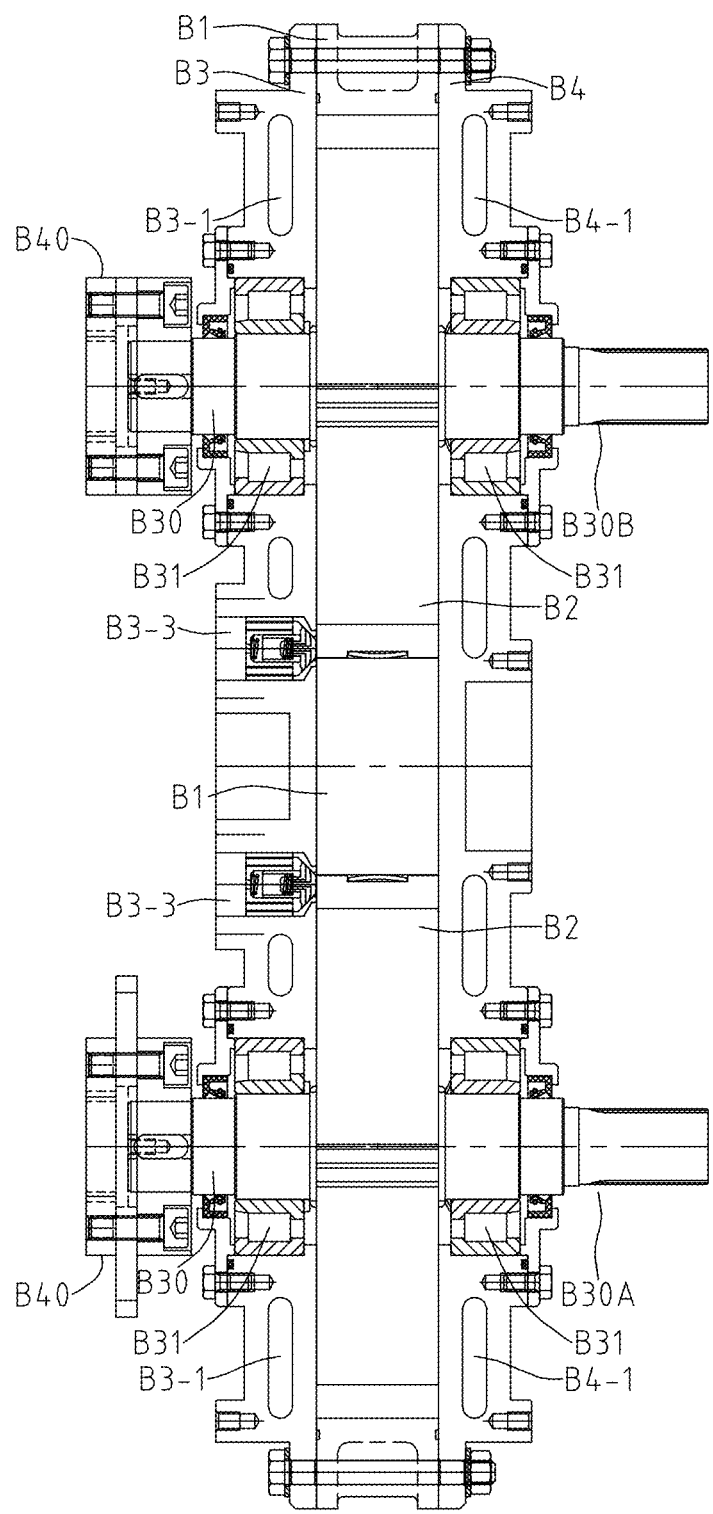
FIG. 5D is a dual-axis axial sectional view of a volumetric machine according to a first embodiment of the present application.
Figure 5E:
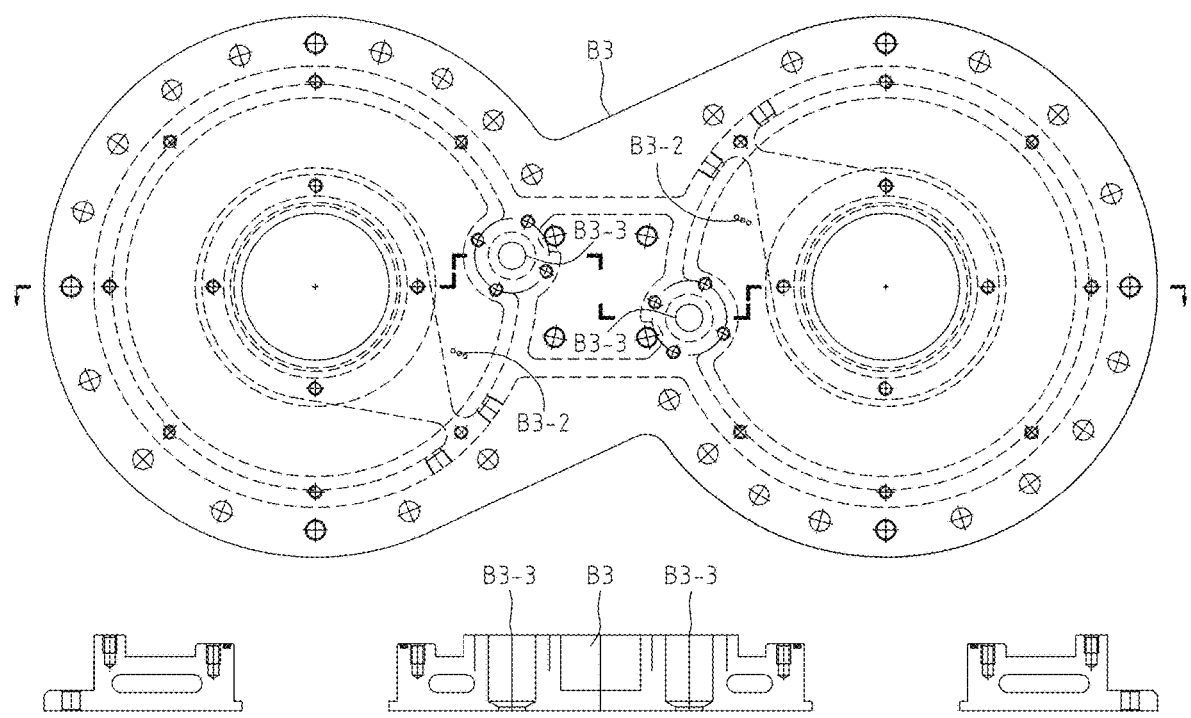
FIG. 5E is a view of a cylinder head B3 of a volumetric machine according to a first embodiment of the present application.
Figure 5F:
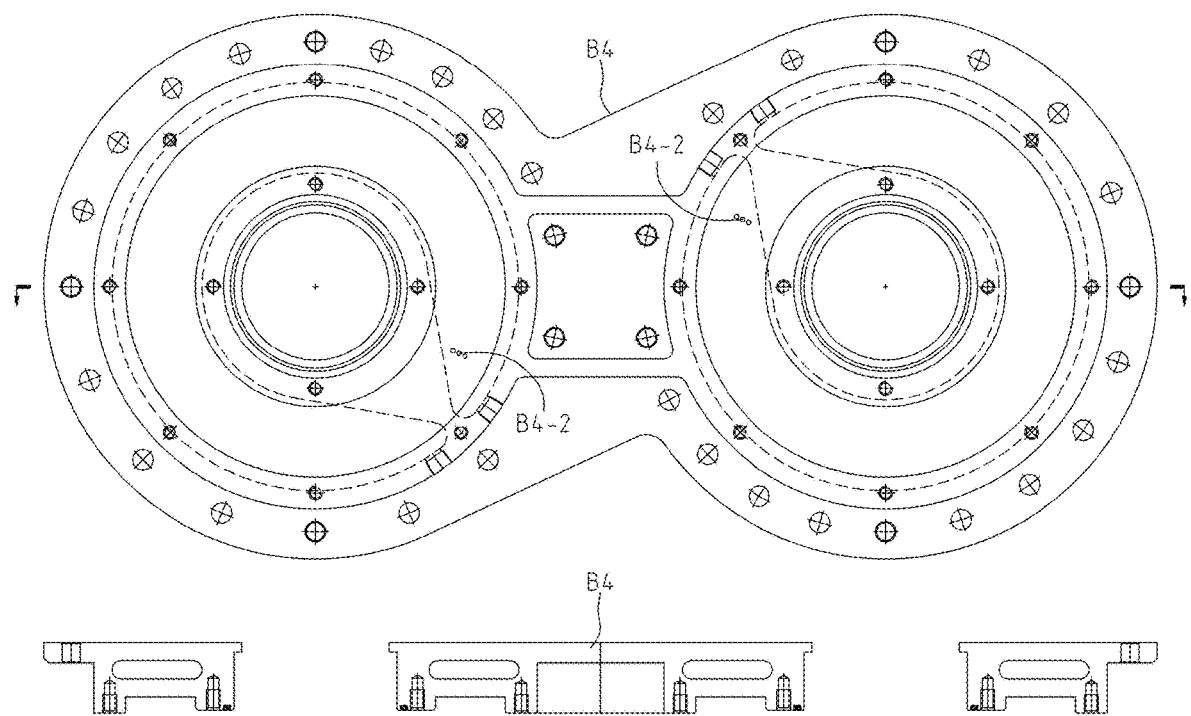
FIG. 5F is a view of a cylinder head B4 of a volumetric machine according to a first embodiment of the present application.

Referring to FIGS. 5C and 5D, the cylinder block B1 is provided with two centrosymmetric cylindrical inner walls B1-1, and two cam rotors B2 with parallel rotation axes are separately mounted in the two cylindrical inner walls B1-1, the two cam rotors B2 have parallel lines between the midpoint ROM of the arc with the maximum radius R0 and the rotary axis center B0 of outlines of the two cam rotors, and an inter-axis rotational speed ratio of the two cam rotors are 1:1. The inter-axis rotational speed ratio of 1:1 is achieved through two couplers B40 with a rotational speed ratio of 1:1. FIG. 5D does not show the transmission manner of the two couplers B40. A front accommodation cavity B1-2 is connected with the two cylindrical inner walls B1-1 and accommodates the combined sealing piece, and the combined sealing piece adopts the embodiment in FIG. 1. Sealing end surfaces of two combinations of main sealing pieces and auxiliary sealing pieces carried by the slider B10 are in contact with the two cam rotors B2 in opposite directions. An end of the slider B10 receives a force from the cam rotor B2 on a side acting on the sealing end surface of each sealing piece, the other end of the slider B10 receives a force from the cam rotor B2 on the other side acting on the sealing end surface of each sealing piece, the slider B10 on which the two forces act slides back and forth, the two cylindrical inner walls B1-1 serve as rear accommodation cavities for each other, and the two cam rotors B2 serve as drive mechanisms of combined sealing pieces for each other.

The accommodation cavity B1-2 is provided with four centrosymmetric grooves B1-3, and a sealing strip B20 and an elastic member B21 are disposed in the groove B1-3. The optional solution is that the cross-sectional shape of the sealing strip B20 is triangular, little space is occupied, the matching with the force application angle of the elastic member B21 is reasonable, and the direction of application of force of the elastic member B21 is biased towards the side of the low-pressure region.

The two cam rotors B2 may be considered to have a conjugate relationship or an approximate conjugate relationship, and the outline error of the two cam rotors B2 may be compensated by the gap between the main sealing piece B5 and the slider B10 through the elastic member B15. The outlines of the two cam rotors are designed according to a conjugate relationship or an approximate conjugate relationship. The so-called conjugate relationship or approximate conjugate relationship is that when the two cam rotors B2 rotate at a rotational speed ratio of 1:1, the distance between two main sealing pieces B5 of the combined sealing piece between the two cam rotors B2 is unchanged or approximately unchanged.

A variable volume is isolated in the cylindrical inner wall B1-1 of the cylinder block by the cam rotor B2 and the combined sealing piece. A working medium inlet B1-5 is disposed at the side of the low-pressure region separated by the combined sealing piece. The valve is a one-way valve located in an accommodation cavity B3-3 on a cylinder head B3 at the side of the high-pressure region separated by the combined sealing piece. When the two cam rotors B2 rotate in the direction of the arrow shown in FIG. 5C, the open volume at the side of the low-pressure region periodically changes from small to large, and the working medium is sucked in; at the same time, the volume of the sealed chamber at the side of the high-pressure region periodically changes from large to small, and the working medium is compressed. Whenever the pressure of the working medium on the side of the high-pressure region can push open the one-way valve, the working medium is squeezed out from the inlet 1-2 of the one-way valve. The volumetric machine is used for compressing the working medium.

The lubrication channel passes through the bearings B31 at two sides and the holes B2-6 of the rotor B2, the lubricating oil inlet is disposed on a gland B32, and the oil return port is on the other gland B33.

Surfaces of the cylinder heads B3 and B4 facing the rotor B2 are separately provided with three small dents B3-2 and B4-2. The small dents B3-2 and B4-2 are close to the cylindrical inner wall B1-1 of the cylinder block and can be intermittently in contact with the lubricating oil in the sealing ring B27 on each of the two end surfaces of the rotor. B3-2 and B4-2 may be thin grooves, and the thin grooves are not shown. In addition to lubrication, the lubricating oil also plays a role in cooling and sealing.

The cooling surface includes the hollow parts B3-1 and B4-1 in the cylinder heads B3 and B4, and the circulating coolant may pass through the hollow parts B3-1 and B4-1. The cylinder heads B3 and B4 have a cooling effect on the cylinder block B1. When the cylinder block B1 is thick enough and the temperature rises too high, a hollow part may be provided in the cylinder block B1 and is not shown in the figure.

To sum up, since the combined sealing piece in the present application is multi-stage combined sealing piece, the sealing performance is improved, and the internal leakage is reduced. At the same time, the design of the cam rotor minimizes the compression clearance volume. The volumetric machine is used with satisfactory single-stage compression efficiency at higher pressure at the compression side. In addition, the mass of the slider of the combined sealing piece is relatively small, and the inertia force is relatively small. One main sealing piece and four auxiliary sealing pieces share the inertial force so that the combined sealing piece can work at a higher rotational speed or within a wider rotational speed range.

The Second Embodiment of the Volumetric Machine

Referring to FIGS. 6A, 6B, 6C, 6D, and 6E, the volumetric machine includes a rotor D52, a cylinder block D51, and cylinder heads D53 and D54 disposed at two sides of the cylinder block D51, and the rotor D52 is rotatably and eccentrically mounted in cylindrical inner walls D51-1, D51-2, D51-3, and D51-4 of the cylinder block through a main shaft D80 and bearings D81 that are integrated by means of the cylinder heads D53 and D54.

A cylinder of the rotor D52 is provided with an accommodation cavity D52-1 that passes through a rotation axis, the accommodation cavity D52-1 is configured to accommodate the combined sealing piece, and the combined sealing piece and the rotor D52 together are referred to as the rotor of the combined sealing piece.

Figure 6A:
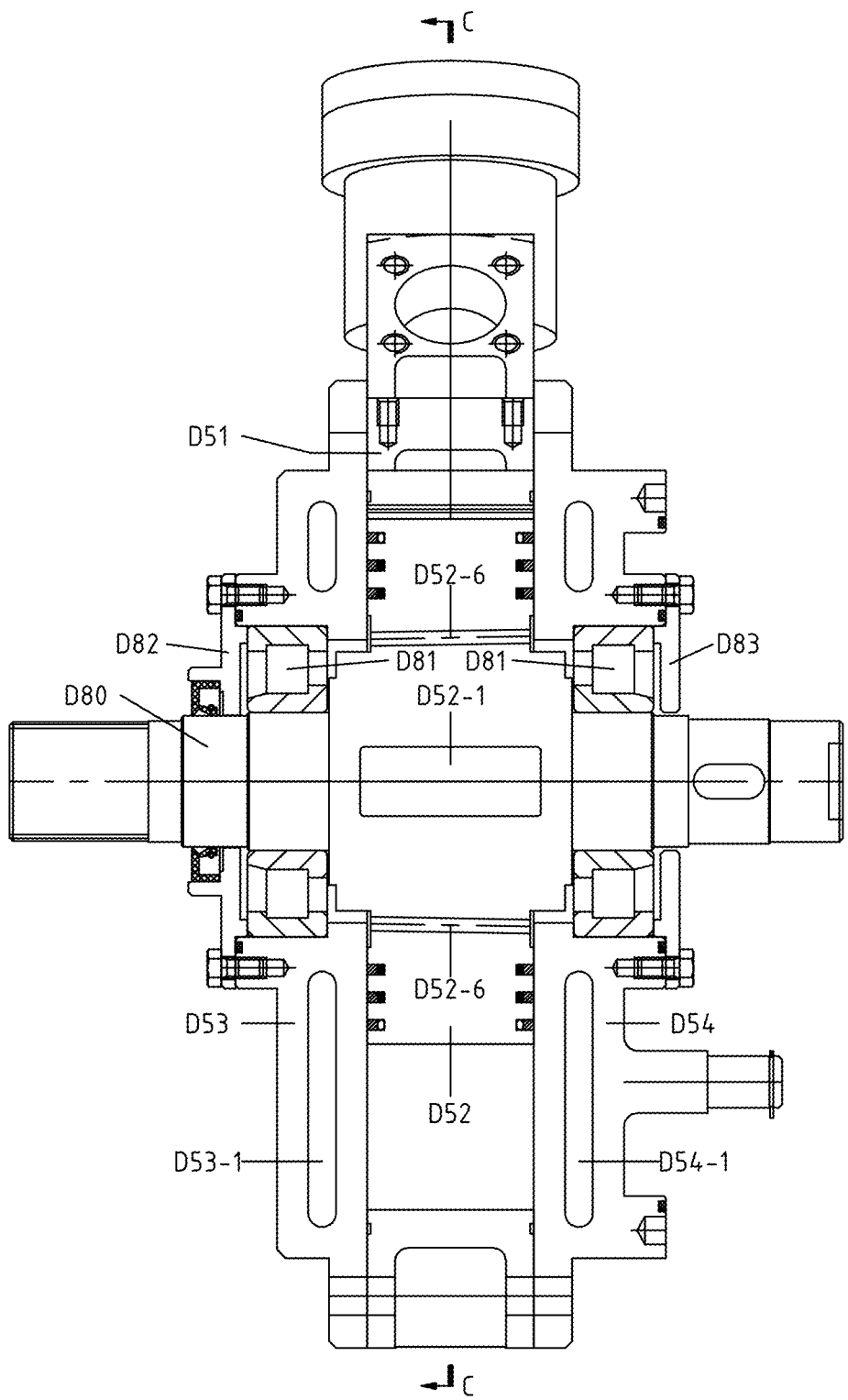
FIG. 6A is an axial sectional view of a volumetric machine according to a second embodiment of the present application.
Figure 6B:
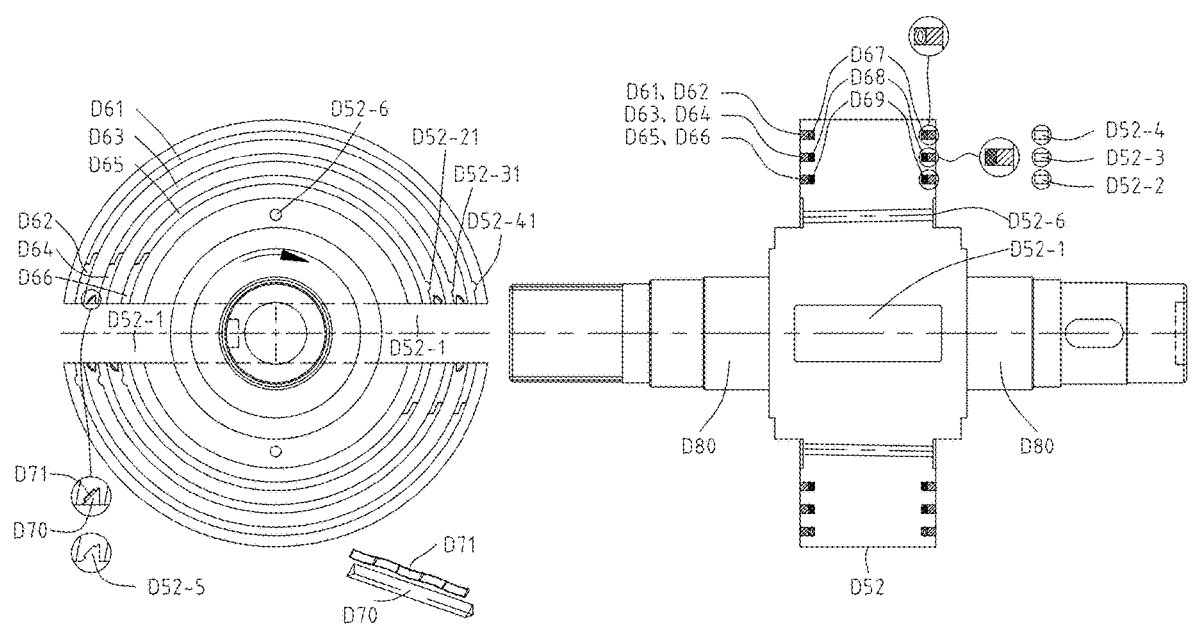
FIG. 6B is a view of a rotor of a combined sealing piece of a volumetric machine according to a second embodiment of the present application.

Referring to FIG. 6B, two end surfaces of the rotor D52 are provided with arc-shaped grooves D52-2, D52-3, and D52-4 as well as arc-shaped sealing members D61, D62, D63, D64, D65, and D66 and elastic sealing members D67, D68, and D69 in the grooves. The cross sections of the arc-shaped sealing member D61, D62, D63, D64, D65, and D66 are square or rectangular, and concave-convex interlocking shapes D52-21, D52-31, and D52-41 are provided between the arc-shaped sealing members D61, D63, and D65 and the arc-shaped grooves D52-2, D52-3, and D52-4 and circumferentially fix the arc-shaped sealing members D61, D63, and D65. The arc-shaped sealing members D61, D63, and D65 are overlapped with the arc-shaped sealing members D62, D64, and D66 at the rear, respectively. Under the function of the elastic sealing members D67, D68, and D69, the arc-shaped sealing members D61, D62, D63, D64, D65, and D66 are separately in contact with the cylinder heads D53 and D54. The cross section of the elastic sealing member D67 is a thin-walled elastic metal tube used in the outer ring with higher temperature, and the elastic sealing members D68 and D69 are rubber strips used in the inner ring with lower temperature.

Figure 6C:
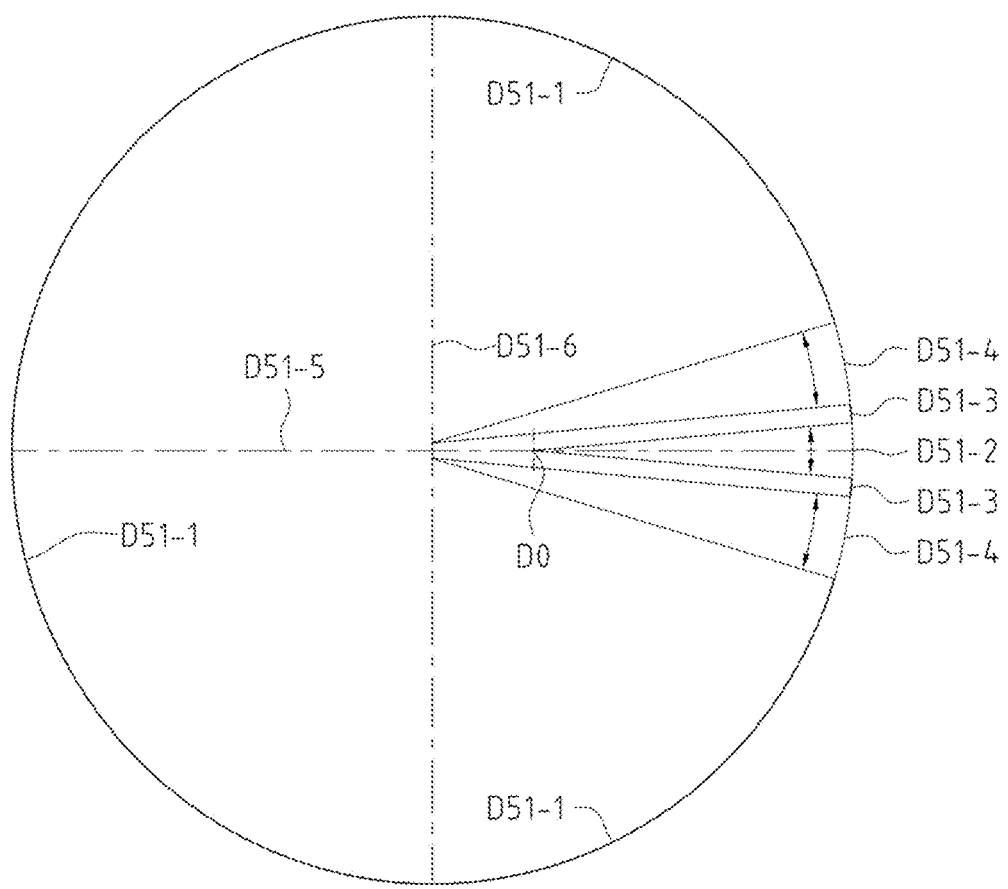
FIG. 6C is a view of an outline of a cylindrical inner wall of a volumetric machine according to a second embodiment of the present application.
Figure 6D:
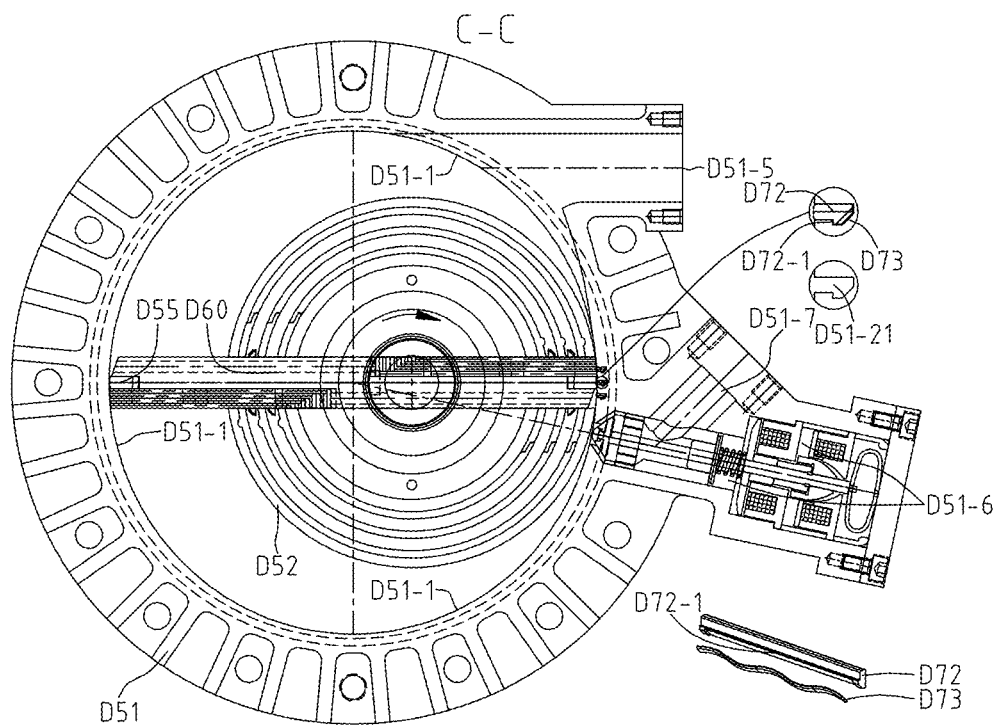
FIG. 6D is a sectional view of a volumetric machine taken along C-C according to a second embodiment of the present application.
Figure 6E:
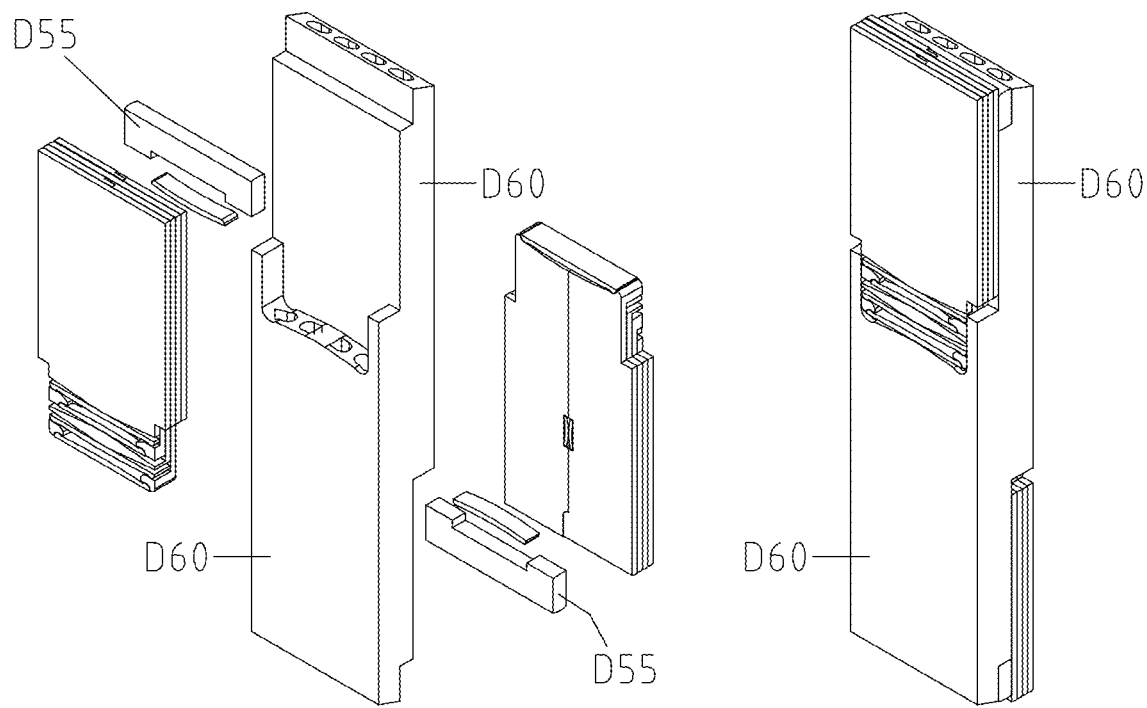
FIG. 6E illustrates a combined sealing piece of a volumetric machine according to a second embodiment of the present application.

The structure and shape of the combined sealing piece shown in FIG. 6E are similar to those of the combined sealing piece in FIG. 1, but the difference lies in the dimensions.

Referring to FIG. 6B, the main sealing piece and the auxiliary sealing piece that are carried by the slider D60 and the slider D60 are disposed in the accommodation cavity D52-1. Six centrosymmetric grooves D52-5 are disposed in the accommodation cavity D52-1. A sealing strip D70 and an elastic member D71 are disposed in the groove D52-5. The cross-sectional shape of the sealing strip D70 may be triangular, little space is occupied, and the matching with the force application angle of the elastic member D71 is reasonable. The direction of application of force of the elastic member D71 is biased towards the side of the low-pressure region.

Referring to FIGS. 6C and 6D, the cylindrical inner wall D51-1 of the cylinder block is an elliptical arc cylindrical surface, the rotary axis center DO of the rotor D52 is on a minor axis D51-5 of the ellipse, an eccentric distance exists between the rotary axis center DO and a major axis D51-6 of the ellipse. An arc center line of the arc cylindrical surface D51-2 coincides with the rotation axis of the rotor D52, and the arc cylindrical surface D51-2 and the elliptical arc cylindrical surface D51-1 are adjacent and tangent through two arcs or straight lines D51-3 and two arcs D51-4. If D51-3 is an arc, the radius is relatively large, otherwise D51-3 cannot be tangent to the arc D51-4; if D51-3 is a straight line, D51-3 may be regarded as an arc with an infinite radius.

The cylindrical inner wall of the cylinder block in this embodiment is basically based on an ellipse and has reached the ideal accuracy. Of course, the ellipse may be replaced by different adjacent tangent arcs and/or adjacent tangent curves of a certain type, and the error may be automatically compensated by the gap between a main sealing piece D55 and the slider D60 through the elastic member between the main and auxiliary sealing pieces and the slider D60. The outline of the cylindrical inner wall of the cylinder block should be smooth so that the combined sealing piece is not impacted by an excessive inertial force.

Three grooves D51-21 are provided on the arc cylindrical surface D51-2, and the groove D51-21 accommodates a radial sealing strip D72 that acts on the rotor D52 of the combined sealing piece and an elastic member D73; the radial sealing strip D72 is in contact with the rotor D52 of the combined sealing piece through the elastic member D73, the groove D51-21 and the radial sealing strip D72 may be provided with an anti-off step D72-1, and the radial sealing strip D72 is allowed to have a radial movement gap. The three grooves D51-21 are centrally distributed relative to the arc cylindrical surface D51-2. The step D72-1 is on the side of the high-pressure region, and the direction of application of force of the elastic member D73 is biased towards the side of the low-pressure region.

Among the cylindrical inner walls D51-1, D51-2, D51-3, and D51-4 of the cylinder block, a variable volume is isolated through the rotor D52 of the combined sealing piece and the radial sealing strip D72 that acts on the rotor of the combined sealing piece, a working medium outlet D51-5 is disposed on the cylinder block at the side of the low-pressure region separated by the radial sealing strip D72, the valve is a solenoid valve and is disposed in an accommodation cavity D51-6 on the cylinder block at the side of the high-pressure region, and the working medium inlet is D51-7. When the rotor D52 of the combined seal piece rotates in the direction of the arrow in FIG. 6D, the open volume at the side of the low-pressure region periodically changes from large to small, and the expanded working medium is discharged; at the same time, the volume of the sealed chamber at the side of the high-pressure region periodically changes from small to large, and the working medium expands to work. Whenever an end of the combined sealing piece comes near the solenoid valve and the smallest sealed chamber at the side of the high-pressure region is formed, the solenoid valve is opened and the working medium enters until the solenoid valve is closed and the working medium stops entering. The volumetric machine is used for expanding the working medium to work.

The lubricating oil inlet is disposed on a gland D82. The lubricating oil passes through a bearing D81 disposed at one side and a side end surface of the rotor D52 and then passes through an oil hole D52-6 of the rotor D52 to reach the other side end surface and the bearing D81. The oil return port is disposed between a hole in the center of the other gland D83 and the shaft.

The cooling surface includes hollow parts D53-1 and D54-1 in the cylinder heads D53 and D54, and the circulating coolant passes through the hollow parts. The cylinder heads D53 and D54 have a cooling effect on the cylinder block D51. When the cylinder block D51 is thick enough and the temperature rises too high, a hollow part may be provided in the cylinder block D51 and is not shown in the figure.

To sum up, since the combined sealing piece in the present application is multi-stage, the sealing performance is improved, and the internal leakage is reduced. At the same time, the design of the cylindrical inner wall of the cylinder block reduces the negative pressure volume. The volumetric machine is used with satisfactory single-stage efficiency at higher pressure on the expansion side. In addition, the mass of the slider of the combined sealing piece is relatively small, and the inertia force is relatively small. One main sealing piece and four auxiliary sealing pieces share the inertial force so that the combined sealing piece can work at a higher rotational speed or within a wider rotational speed range.

The Third Embodiment of the Volumetric Machine

Referring to FIGS. 7A, 7B, 7C, and 7D, the volumetric machine includes a rotor E2, a cylinder block E1, and cylinder heads E3 and E4 disposed at two sides of the cylinder block E1. The rotor E2 is rotatably mounted in a cylindrical inner wall E1-1 of the cylinder block through a main shaft E30 and bearings E31 by means of the cylinder heads E3 and E4. Considering that the rotor is not single in the axial direction, the bearing E31 on the side of the cylinder head E4 is assembled through another cylinder head E54 that has an assembly relationship with the cylinder head E4.

The outline of the rotor E2 is shaped like an olive, the outline of the rotor E2 closest to the cylindrical inner wall E1-1 of the cylinder block is formed by two centrosymmetric arcs whose centers are coincident with a radius of R00, the outline extends smoothly from the same side of the two arcs towards each other until overlapping, and the distance from each point of the outline to the rotary axis center gradually decreases from the maximum value to the minimum value during the extension process. The method may be that the arcs with a radius of R11 are separately disposed at two sides of the two arcs with a radius of R00, and two endpoints of each arc with a radius of R11 are equidistant from an adjacent arc with a radius of R00; R11>R00, the distance from the midpoint of the arc with a radius of R11 to the rotary axis center is less than R00, a transition arc with a radius of R22 is disposed between the arc with a radius of R00 and the adjacent arc with a radius of R11, or more than one transition arc is provided, and all the arcs are adjacent, tangent, and connected into a smooth curve.

The arc with a radius of R00 is a pure arc, and the remaining arcs may be replaced by one or more curves, as long as the inertial force of the combined sealing piece is less than a reasonable value. In this embodiment, the arcs may be used to achieve satisfactory results. Moreover, any curve may be replaced by adjacent tangent arcs within a certain accuracy range.

Each of two arc cylindrical surfaces with a radius of R00 is provided with three grooves E2-3. The groove E2-3 accommodates a radial sealing strip E22 that acts on the cylindrical inner wall E1-1 of the cylinder block. The step in the groove E2-3 matches an anti-off step E22-1 of the radial sealing strip E22, and the radial sealing strip E22 is allowed to have a radial movement gap. The positions of the three grooves E2-3 on the arc cylindrical surface with a radius of R00 are biased towards the side of the low-pressure region. An elastic member E23 is disposed between the groove E2-3 and the radial sealing strip E22 and the radial sealing strip E22 is in contact with the cylindrical inner wall E1-1 of the cylinder block through the elastic member E23. If the sealing performance at a very low rotational speed may be neglected, the elastic member E23 is not necessary, for example, during use on the compression side.

The arc cylindrical surface with a radius of R00 is specially designed for the three grooves E2-3, and the positions of the three grooves E2-3 and the radial sealing strip E22 are biased towards the side of the low-pressure region to minimize the compression clearance volume and improve the volumetric efficiency. The clearance volume in this embodiment is close to the limit 0. The clearance formed by the combined sealing piece, the rotor E2, and the cylindrical inner wall E1-1 of the cylinder block only leaves a necessary movement gap when the radial sealing strip E22 approaches a working medium outlet E1-6, and basically no excess volume exists.

Each of two end surfaces of the rotor E2 is provided with two elliptical annular grooves E2-1 and E2-2 and sealing rings E25 and E27 in the grooves and further includes elastic sealing members E26 and E28 separately located between the groove bottoms of the annular grooves E2-1 and E2-2 and the sealing rings E25 and E27. The cross sections of the sealing rings E25 and E27 are square or rectangular; or each of the sealing rings E25 and E27 may be formed by rolling a sheet with a length greater than the circumference of the annular groove, and two ends of the sheet gradually become thinner. The elastic sealing member E26 may be an annular ring formed by a thin-walled elastic metal tube and used in the outer ring with higher temperature. The elastic sealing member E28 may be a rubber ring used in the inner ring with lower temperature.

The annular grooves E2-1 and E2-2 separated provided on the two end surfaces of the rotor E2 may not be elliptical. For example, the outline of an olive-shaped rotor may be formed by multiple arcs.

Splines E2-4 are provided at the rotary axis center of the rotor E2.

Figure 7A:
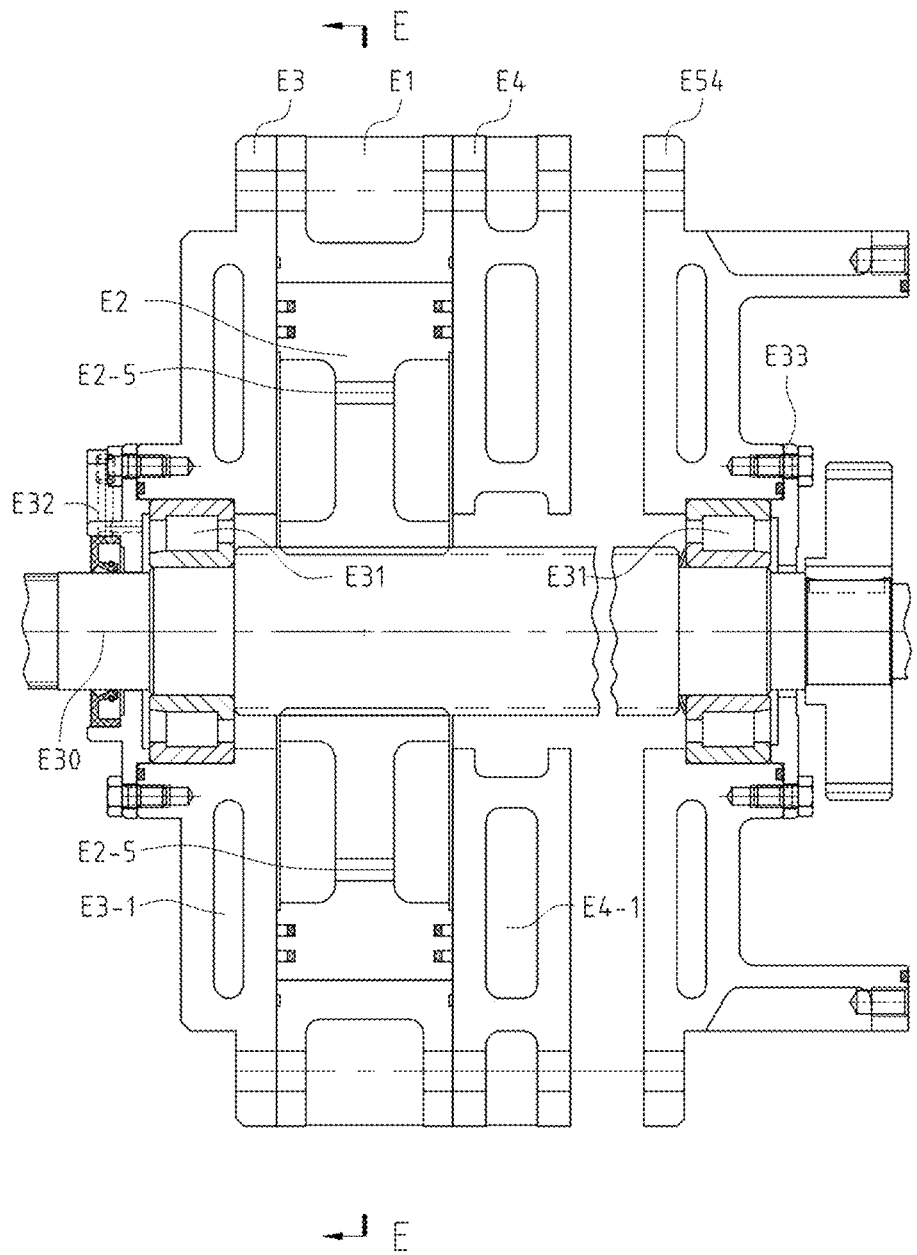
FIG. 7A is an axial sectional view of a volumetric machine according to a third embodiment of the present application.
Figure 7B:
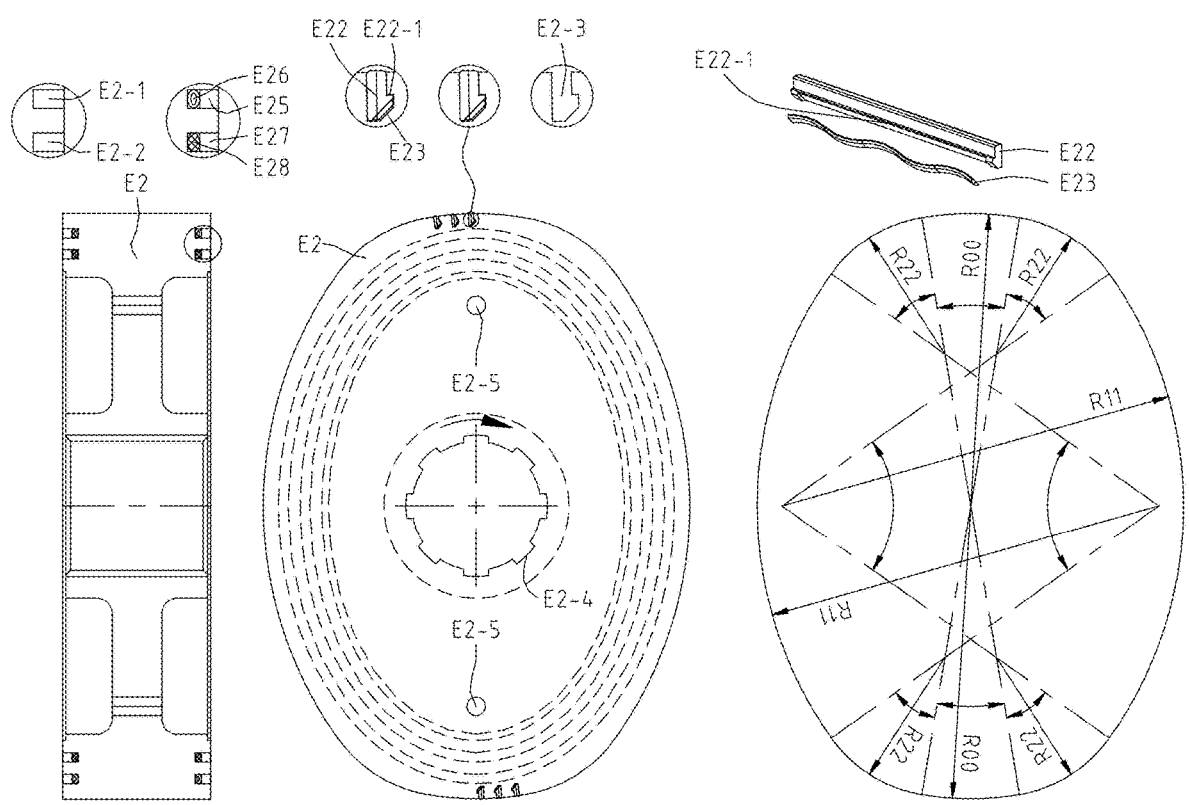
FIG. 7B is a view of an olive-shaped rotor of a volumetric machine according to a third embodiment of the present application.
Figure 7C:
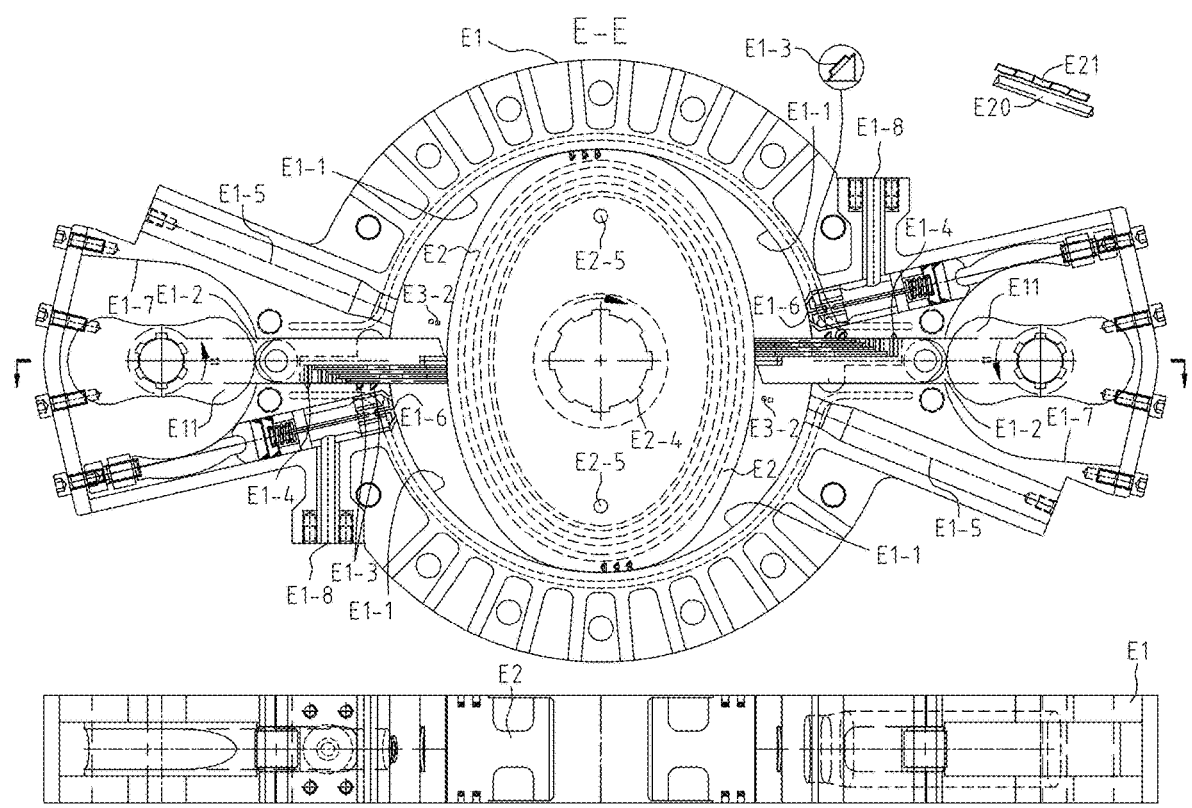
FIG. 7C is a view of a volumetric machine taken along E-E according to a third embodiment of the present application.

Referring to FIG. 7C, the cylinder block E1 is provided with two centrosymmetric front accommodation cavities E1-2 for separately accommodating two combined sealing pieces and two centrosymmetric rear accommodation cavities E1-7 for accommodating drive mechanisms of the two combined sealing pieces. The drive mechanism is formed by two centrosymmetric cams E11 and is driven by the main shaft E30 and the cams E11 at a rotational speed ratio of 1:1. The transmission manner is not shown in the figure. The drive mechanism may also be driven at a rotational speed ratio of 1:2. The cam shape of the cam E11 is not the shape shown in the figure, but is non-centrosymmetric. The rotor E2 and the cam E11 are linked with the combined sealing piece and the roller follower on the slider of the combined sealing piece in a conjugate relationship.

The slider E10 of the combined sealing piece is provided with a roller follower E12, an end of the slider E10 receives a force from the rotor E2 acting on the sealing end surface of each sealing piece, the other end of the slider E10 receives a force applied by the cam E11 to the roller follower E12, and the slider E10 on which the two forces act slides back and forth.

The shape of the cam E11 is determined by the moving position of the roller follower E12 when the rotor E2 and the cam E11 rotate in the case where a main sealing piece E5 is always in contact with the rotor E2 and basically no relative displacement exists between the main sealing piece E5 and the slider E10. In other words, the cam E11 is designed according to the conjugate relationship.

A variable volume is isolated in the cylindrical inner wall E1-1 of the cylinder block by the rotor E2 and the combined sealing piece. Two working medium inlets E1-5 are at the side of the low-pressure region separated by two combined sealing pieces. The two valves are one-way valves and are located in the working medium outlet E1-6 of the cylinder block on the side of the high-pressure region separated by the two combined sealing pieces. When the olive-shaped rotor E2 rotates in the direction of the arrow in FIG. 7C, the open volume at the side of the low-pressure region periodically changes from small to large, and the working medium is sucked in; at the same time, the volume of the sealed chamber at the side of the high-pressure region periodically changes from large to small, and the working medium is compressed. Whenever the pressure of the working medium at the side of the high-pressure region can push open the one-way valve, the working medium is squeezed out from the one-way valve. The volumetric machine is used for compressing the working medium.

The lubricating oil inlet is on a gland E32. The lubricating oil passes through a bearing E31 on a side and a side end surface of the rotor E2 and then passes through an oil hole E2-5 of the rotor E2 to reach the other side end surface and the bearing E31. The oil return port is disposed between a hole in the center of the other gland E33 and the shaft.

Figure 10A:
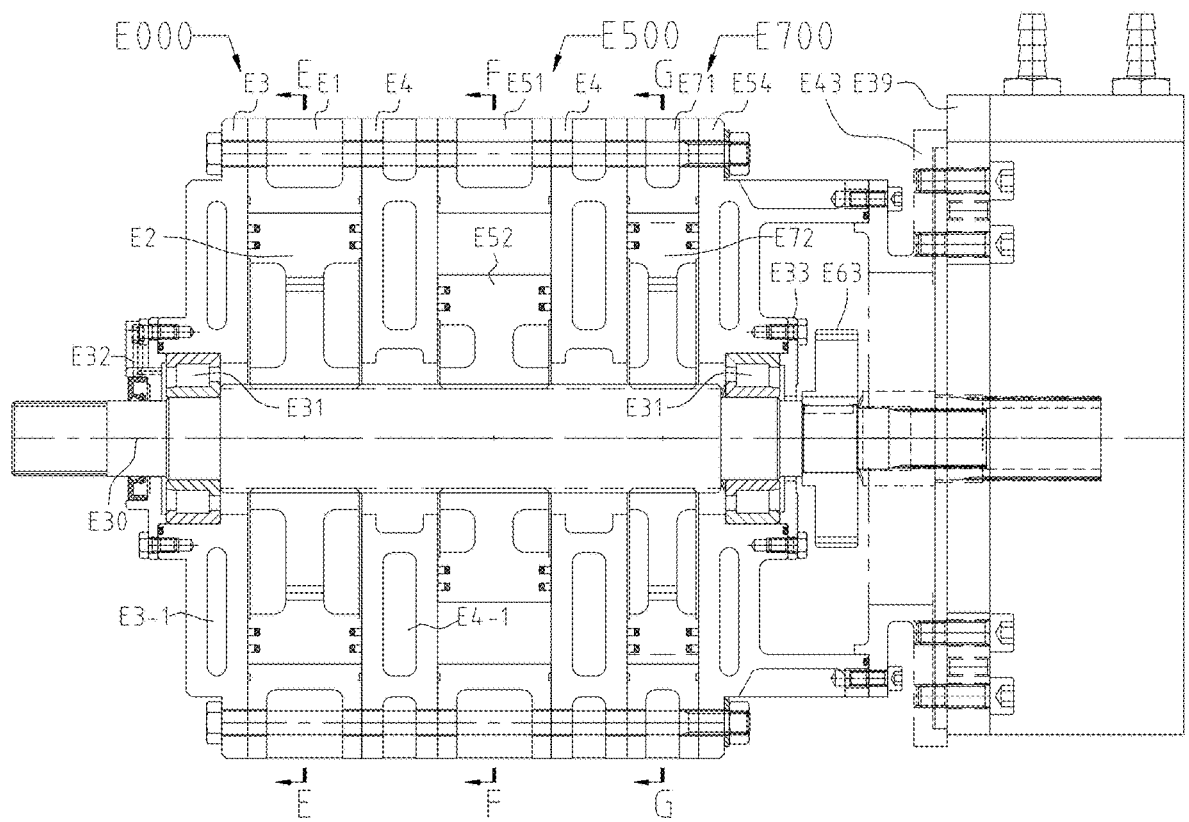
FIG. 10A is an axial sectional view of a wide fuel engine according to a third embodiment of the present application.
Figure 10B:
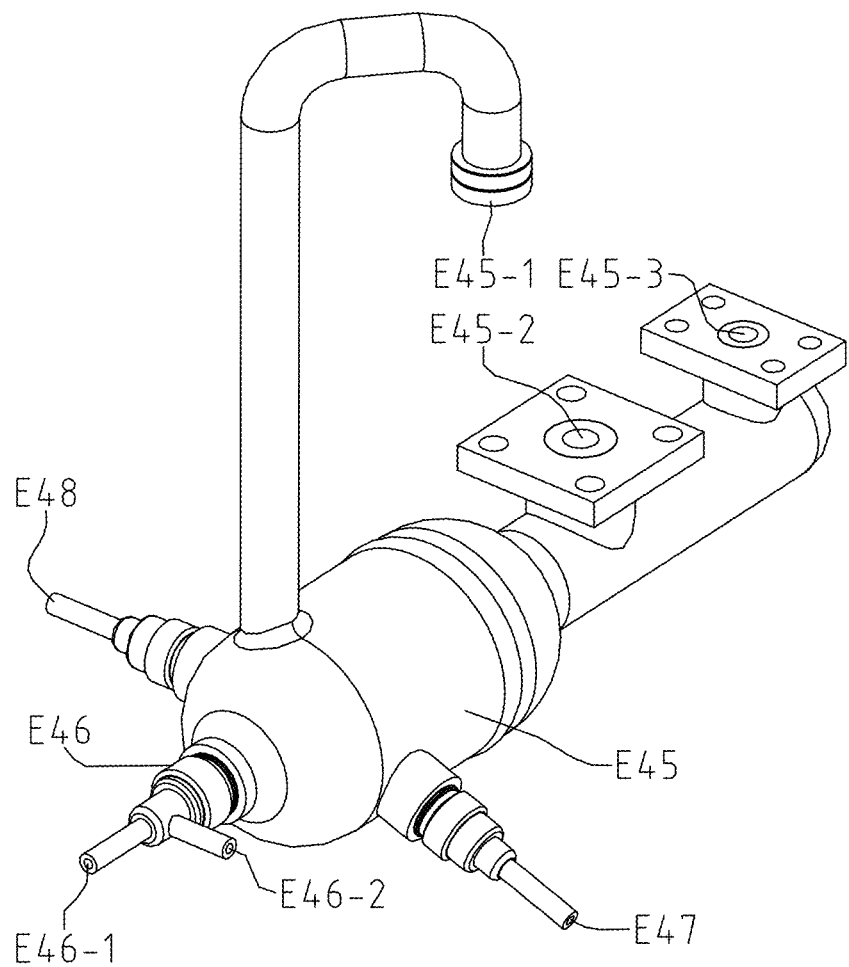
FIG. 10B is a view of a combustion chamber of a wide fuel engine according to a third embodiment of the present application.

Surfaces of the cylinder heads E3 and E4 facing the rotor E2 are separately provided with two small dents E3-2 and E4-2. The small dent E4-2 is shown in FIG. 10E. The small dents E3-2 and E4-2 are close to the cylindrical inner wall E1-1 of the cylinder block and can be intermittently in contact with the lubricating oil in the sealing ring E27 on each of the two end surfaces of the rotor. In addition to lubrication, the lubricating oil also plays a role in cooling and sealing.

The cooling surface includes hollow parts E3-1 and E4-1 in the cylinder heads E3 and E4, and the circulating coolant passes through the hollow parts. The cylinder heads E3 and E4 have a cooling effect on the cylinder block E1. When the cylinder block E1 is thick enough and the temperature rises too high, a hollow part may be provided in the cylinder block E1 and is not shown in the figure.

Figure 7D:
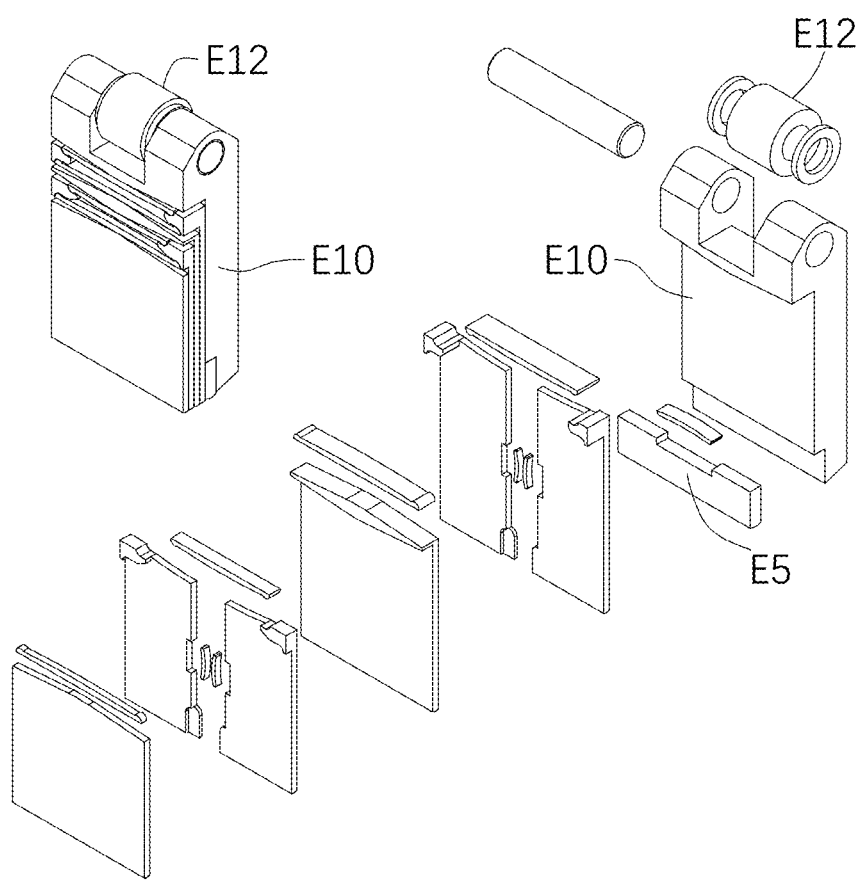
FIG. 7D illustrates a combined sealing piece of a volumetric machine according to a third embodiment of the present application.

The combined sealing piece is shown in FIG. 7D. The structures and shapes of the main sealing piece, four auxiliary sealing pieces, and the elastic member are the same as those in FIG. 1. The main sealing piece and the auxiliary sealing piece that are carried by the slider E10 and the slider E10 are in an accommodation cavity E1-2. Four centrosymmetric grooves E1-3 are disposed in the accommodation cavity E1-2. A sealing strip E20 and an elastic member E21 are disposed in the groove E1-3. The cross-sectional shape of the sealing strip E20 may be triangular, little space is occupied, and the matching with the force application angle of the elastic member E21 is reasonable. The direction of application of force of the elastic member E21 is biased towards the side of the low-pressure region.

To sum up, since the combined sealing piece in the present application is multi-stage, the sealing performance is improved, and the internal leakage is reduced. At the same time, the design of the cam rotor minimizes the compression clearance volume. The volumetric machine is used with satisfactory single-stage efficiency at higher pressure on the compression side. In addition, the mass of the slider of the combined sealing piece is relatively small, and the inertia force is relatively small. One main sealing piece and four auxiliary sealing pieces share the inertial force so that the combined sealing piece can work at a higher rotational speed or within a wider rotational speed range. Since the structure has the conditions for dynamic balance, the combined sealing piece is very quiet at high rotational speed.

In technical solution 39, a wide fuel engine includes a compression side volumetric machine, an expansion side volumetric machine, and a working medium heater.

An outlet of the compression side volumetric machine is connected with an inlet of the working medium heater, and an outlet of the working medium heater is connected with an inlet of the expansion side volumetric machine.

A main shaft of the compression side volumetric machine is operably connected to a main shaft of the expansion side volumetric machine.

The compression side volumetric machine adopts the volumetric machine in any one of technical solutions 16 to 23, any one of technical solutions 24 to 30, or any one of technical solutions 31 to 38, where an opening is a working medium inlet of the compression side volumetric machine, and a valve is a one-way valve of the compression side volumetric machine.

The expansion side volumetric machine adopts the volumetric machine of any one of technical solutions 16 to 23, any one of technical solutions 24 to 30, or any one of technical solutions 31 to 38, where an opening is a working medium outlet of the expansion side volumetric machine, and a valve is a control valve of the expansion side volumetric machine.

In technical solution 40, according to the wide fuel engine in technical solution 39, the working medium heater is a combustion chamber, where the combustion chamber is provided with a fuel nozzle and an ignition device and is optionally provided with at least one of a pressure sensor or a temperature sensor.

In technical solution 41, according to the wide fuel engine in technical solution 40, in the combustion chamber, the fuel injection amount per revolution is less than or equal to the fuel proportioning amount of a theoretical air fuel ratio.

In technical solution 42, according to the wide fuel engine in technical solution 41, the maximum combustion temperature per revolution of the combustion chamber is controlled by adjusting the fuel injection amount per revolution, the fuel injection duration per revolution, and the distribution state of fuel in the combustion chamber, where the maximum combustion temperature is lower than the maximum production temperature of a thermal NOX permitted by regulations.

In technical solution 43, according to the wide fuel engine in any one of technical solutions 40 to 42, at least two fuel nozzles are configured in the combustion chamber, a first fuel nozzle of the at least two fuel nozzles delivers fuel A, and a second fuel nozzle of the at least two fuel nozzles delivers water and/or fuel B.

Alternatively, the combustion chamber has a single fuel nozzle, and the single fuel nozzle is provided with at least two access ports, where a first access port of the at least two access ports delivers fuel A, and a second access port of the at least two access ports delivers water and/or fuel B.

In technical solution 44, according to the wide fuel engine in technical solution 39, the one-way valve includes a stationary sealing surface relative to a cylinder block or a cylinder head, the working medium inlet is disposed in the center of the stationary sealing surface, the one-way valve further includes at least two stacked disc-shaped sealing members, a relative movement gap exists between the at least two stacked disc-shaped sealing members, the disc-shaped sealing member is supported and limited by a guide member, the one-way valve is further provided with an elastic member that acts on the disc-shaped sealing member such that the disc-shaped sealing member leans against the stationary sealing surface, and the disc-shaped sealing member is automatically separated from or in contact with the stationary sealing surface according to a pressure difference between two sides to achieve one-way sealing.

In technical solution 45, according to the wide fuel engine in technical solution 39, the control valve is a plug valve, a valve core of the plug valve is driven by a shaft mounted on a cylinder head, the shaft extends out of the cylinder head and is driven by the main shaft at a fixed rotational speed ratio, the shaft is provided with multiple pressure equalizing grooves, an oil pool is disposed between the shaft and the cylinder head, and oil in the oil pool is used for sealing and lubrication; or the valve core of the plug valve is driven by an electromagnetism component mounted on the cylinder head or driven by a magnetic coupling component mounted on the cylinder head, and the electromagnetism or the magnetic coupling is driven by a magnetic force and separates pressure of inner and outer spaces with a housing or an isolation sleeve.

In technical solution 46, according to the wide fuel engine in technical solution 45, a through-overlap angle between a valve seat opening and a valve core opening of the plug valve is selected such that a compression ratio at a compression side reaches the designed maximum value when the fuel injected into a combustion chamber per revolution reaches the maximum value.

In technical solution 47, according to the wide fuel engine in technical solution 39, the control valve is a solenoid valve and the control valve includes a stationary sealing surface relative to a cylinder block or a cylinder head, a valve stem, a valve stem guide member, a disc-shaped sealing member at an end of the valve stem, a reset elastic member, a first armature, a first electromagnet, a second armature, and a second electromagnet, where a working medium outlet is disposed in the center of the stationary sealing surface, and the current and on-off state of the first electromagnet and the second electromagnet are controlled by an electronic control unit (ECU), where when the solenoid valve is opened, the first armature is attracted by the first electromagnet, and then the second armature is attracted by the second electromagnet; and when the solenoid valve is closed, the second armature is released by the second electromagnet, and then the first armature is released by the first electromagnet.

In technical solution 48, according to the wide fuel engine in technical solution 39, at least two disc-shaped sealing members are provided and nested together with a relative movement gap between the at least two disc-shaped sealing members.

In technical solution 49, according to the wide fuel engine in technical solution 39, the control valve is a gate valve and the gate valve includes a stationary sealing surface relative to a cylinder block or a cylinder head and a gate plate, where the gate plate includes a through hole, accommodation cavities, and at least two nested disc-shaped sealing members accommodated in the accommodation cavities, each of the at least two nested disc-shaped sealing members has an accommodation cavity except for a smallest disc-shaped sealing member of the at least two nested disc-shaped sealing members which has no accommodation cavity and is a sheet sealing member so that a disc-shaped sealing member one level smaller than a disc-shaped sealing member of the at least two nested disc-shaped sealing members is accommodated, radial gaps and axial gaps exist between all the accommodation cavities and disc-shaped sealing members of the at least two nested disc-shaped sealing members accommodated in and in direct contact with the accommodation cavities, the sealing surface is provided with a working medium outlet, and the gate valve further includes a gate plate driving device for driving the gate plate such that the through hole is connected with the working medium outlet or the disc-shaped sealing members and the sheet sealing member seal the working medium outlet to achieve the on-off state of a working medium.

In technical solution 50, according to the wide fuel engine of any one of technical solution 47 or 49, an occasion when the solenoid valve or the gate valve is closed after being opened is controlled to control the pressure of a combustion chamber, thereby controlling a compression ratio at a compression side.

In technical solution 51, according to the wide fuel engine in technical solution 39, the expansion work volume per revolution at an expansion side is greater than the compression volume per revolution at a compression side.

In technical solution 52, according to the wide fuel engine in technical solution 39, at least one auxiliary output shaft is further provided and at least one auxiliary output shaft is configured to power a lubricating oil pump and a coolant pump.

In technical solution 53, according to the wide fuel engine in technical solution 39, a main shaft at the expansion side is coaxial with a main shaft at the compression side, or the main shaft at the expansion side is connected to the main shaft at the compression side through a coupler; or the main shaft at the expansion side is connected to the main shaft at the compression side through an overrunning clutch, and a compression side overruns an expansion side.

In technical solution 54, according to the wide fuel engine in technical solution 53, an electric motor is connected to the main shaft at the compression side, where the electric motor is configured to start the wide fuel engine and/or provide additional torque and power for the wide fuel engine.

In technical solution 55, according to the wide fuel engine in technical solution 54, the electric motor also functions as a generator; or the wide fuel engine is additionally provided with and connected to a generator for generating electricity.

In technical solution 56, according to the wide fuel engine in technical solution 39, at least two stages of the compression side volumetric machine are used in series and/or at least two stages of the expansion side volumetric machine are used in series.

In technical solution 57, according to the wide fuel engine in technical solution 40, the volume of a combustion chamber is 0.02 to 0.9 times the volume of the largest sealed chamber at a compression side.

In technical solution 39, the working medium heater may also be a heat exchanger that transfers heat from a heat source to the compressed working medium.

In technical solution 40, the ignition device is a spark plug or a glow plug, and the ignition device works at startup or when the temperature of the combustion chamber is insufficient to ignite the fuel.

In technical solution 41, the theoretical air fuel ratio is also referred to as the stoichiometric ratio. The present application may implement combustion with an air fuel ratio equal to the theoretical air fuel ratio, lean combustion, and ultra-lean combustion. The fuel injection amount per revolution is adjusted according to the torque and rotational speed required on the expansion side.

In technical solution 42, NOX here refers to a thermal nitrogen oxide. When the combustion temperature is lower than 1800 k, the amount of NOX generated is significantly reduced. If the temperature is further reduced, the amount of NOX generated is further reduced. The standards of regulations are dynamic, so the regulations that are promulgated and implemented are the basis. The combustion temperature is directly related to relevant factors such as the fuel injection amount per revolution, the fuel injection duration per revolution, and the distribution state of fuel in the combustion chamber. Fuel injection is in a continuous mode, an intermittent mode, or a pulse mode. In the intermittent mode, each revolution consists of two periods, which are injection and injection stop. In the pulse mode, each revolution consists of multiple very short injections. The distribution state of the fuel in the combustion chamber should be as dispersed as possible and the fuel is burned at multiple points so that the temperature field is as uniform as possible. The fuel distribution state is related to the nozzle design and injection pressure. The fuel may be atomized through preheating. From a technical perspective, it is possible to control the combustion temperature by controlling these related factors, so as to control the NOX concentration, which is the open-loop control. A temperature detection method may be introduced into the combustion chamber, and the closed-loop control is achieved using the feedback flame temperature.

In technical solution 43, the purpose of injecting water is to appropriately lower the temperature of the combustion chamber, reduce NOX emissions, alleviate the impact of excessive temperature on the expansion side, and improve the workability of the working medium. In the related art, the fuel is emulsified. Although the purpose is similar, the proportion of water cannot be adjusted flexibly. Fuel B is used. One of the characteristics of fuel B is used, such as easy cold start. The cleaning agent or pH neutralizer may be delivered through one fuel nozzle or one access port, so as to achieve cleaning and maintenance.

In technical solution 44, the fitting surface between the stationary sealing surface and the disc-shaped sealing member may be a conical surface, an elliptical conical surface, or a flat surface. Two or more disc-shaped sealing members achieve more than two levels of sealing. The pressure is shared by multiple disc-shaped sealing members, the leakage is reduced, and the disc-shaped sealing members are easy to open level by level. The number of one-way valves is not limited to one and should be determined according to the flow and resistance of the one-way valve.

In technical solution 45, the ratio of the rotational speed of the plug valve to the rotational speed of the main shaft of the double-acting expansion volumetric machine is 1:1, and the ratio of the rotational speed of the plug valve to the rotational speed of the main shaft of the single-acting expansion volumetric machine is 1:2. The case of two times of air intake and air exhaust for each accommodation cavity per revolution refer to double acting, and the case of one time of air intake and air exhaust for each accommodation cavity per revolution refer to single acting.

In the technical solution 46, when the rotational speed ratio between the valve core and the main shaft is determined, the through-overlap angle between the valve seat opening and the valve core opening of the plug valve, that is, the angle at which the valve core rotates in the process from starting importing the working medium to blocking the working medium, determines the initial volume of the expansion side. In the case where the fuel injected into the combustion chamber per revolution is unchanged, the through-overlap angle determines the pressure of the combustion chamber, determines the volume of the smallest sealed chamber at the moment when the one-way valve on the compression side is about to open, and finally, determines the compression ratio at the compression side. If no fuel is injected in a period of time, in the same pressure condition, the volume of the working medium pressed into the combustion chamber at the compression side is basically equal to the initial volume of the expansion side. When the fuel is injected, the initial volume of the expansion side is greater than the volume of the working medium pressed into the combustion chamber at the compression side. Since the initial volume of the expansion side is unchanged, the volume of the working medium pressed into the combustion chamber at the compression side becomes smaller. The volume of the compression side and the volume of the expansion side are compared in the same pressure condition. The fuel injection amount per revolution affects the compression ratio. In the condition where the fuel injected into the combustion chamber per revolution reaches the maximum, the compression ratio reaches the maximum value. The maximum value is the designed maximum value after optimization through comprehensive factors such as the intensity design of the volumetric machine, the common working conditions, and the thermal efficiency. The maximum value is generally greater than 18.

In technical solution 47, the fitting surface between the stationary sealing surface and the disc-shaped sealing member may be a conical surface, an elliptical conical surface, or a flat surface.

In technical solution 48, two or more disc-shaped sealing members can achieve more than two levels of sealing. The pressure is shared by multiple disc-shaped sealing members, the leakage is reduced, and the disc-shaped sealing members are easy to open level by level.

In technical solution 50, the compression ratio is a design value after optimization through comprehensive factors such as the intensity design of the volumetric machine, the common working conditions, and the thermal efficiency. The design value is generally greater than 10. The specific operation method is as follows: the initial volume of the expansion side is calculated according to the fuel injection amount per revolution and the design value of the compression ratio corresponding to the fuel injection amount, and the solenoid valve or the gate valve is closed at the occasion when the volume reaches the initial volume, which is the open-loop control. The feedback value of a pressure sensor may be inputted for the ECU to perform the closed-loop control. The timing of opening the solenoid valve or the gate valve depends on the position of the rotor relative to the working medium inlet. At the moment when the smallest sealed chamber on the side of the high-pressure region on the expansion side is formed and about to expand, the solenoid valve or the gate valve is opened for the working medium to enter until the solenoid valve or the gate valve is closed and the working medium stops entering.

In technical solution 51, the reasonable expansion ratio of the volume of the expansion side to the volume of the compression side depends on the common working conditions, the air fuel ratio, and other conditions and is generally greater than or equal to 1 and less than 3.

In technical solution 52, at least one auxiliary output shaft may be directly connected to a variety of loads, or the generator may be driven to generate electricity, and then the electricity is used to drive a variety of loads.

In technical solution 53, the main shaft at the expansion side and/or the main shaft at the compression side are provided with toothed discs, position sensors are at the positions corresponding to the toothed discs, and the signal is inputted into the ECU for feedback and control. The fuel injection timing, the injection duration, the idle speed, and the rotational speed are controlled.

In technical solution 54, if the main shaft at the expansion side is coaxial with the main shaft at the compression side, or the main shaft at the expansion side is connected to the main shaft at the compression side through the coupler, no substantial difference exists between the case where the electric motor is connected to the expansion side and the case where the electric motor is connected to the compression side, and both cases may be regarded as the case where the electric motor is connected to the compression side. If the main shaft at the expansion side is connected to the main shaft at the compression side through the overrunning clutch, the position of the electric motor is different from that described above, and the electric motor may be connected to only the compression side. In this case, the compression side can overrun the expansion side under the drive of the electric motor so that not only can the additional torque and power be provided for the wide fuel engine, but also the rotational speed at the compression side can overrun the rotational speed at the expansion side, the amount of air intake and the fuel injection amount can be increased, and greater torque and power can be provided.

In technical solution 55, a battery and a battery management system matching the generator are further provided.

In technical solution 56, in the case where quality and space are not limited or the highest pressure of the working medium is very high, serial use may be adopted to improve the thermal efficiency. The volumes of the volumetric machines in series change in different sequences. The volumes at the compression side change from large to small, and the volumes at the expansion side change from small to large.

In technical solution 57, the volume of the combustion chamber may be 0.02 to 0.9 times the volume of the largest sealed chamber at the compression side. For example, the volume of the combustion chamber may be 0.06 to 0.3 times the volume of the largest sealed chamber at the compression side. The volume of the combustion chamber includes the volume after the one-way valve and before the control valve and has a small value on the premise of ensuring the continuous and complete combustion of the fuel, so as to reduce the volume and heat dissipation area of the combustion chamber.

The First Embodiment of the Wide Fuel Engine

Referring to FIGS. 8A, 8B, 8C, 8D, 8E, 8F, 8G, and 8H and FIGS. 5A, 5B, 5C, 5D, 5E, and 5F, the wide fuel engine includes a compression side volumetric machine B000 and an expansion side volumetric machine B500, the working medium heater is a combustion chamber B45, an outlet B3-3 of the compression side volumetric machine B000 is connected with an inlet B45-1 of the combustion chamber B45, and an outlet B45-2 of the combustion chamber B45 is connected with an inlet B51-6 of the expansion side volumetric machine B500.

The compression side volumetric machine B000 and the expansion side volumetric machine B500 are connected into one body through a housing B44. A main shaft at the expansion side B80 and a main shaft at the compression side B30 are connected through a coupler B40.

The compression side volumetric machine B000 adopts the first embodiment shown in FIGS. 5A, 5B, 5C, 5D, 5E, and 5F. The opening is the working medium inlet B1-5, and the valve is the one-way valve.

Figure 8A:
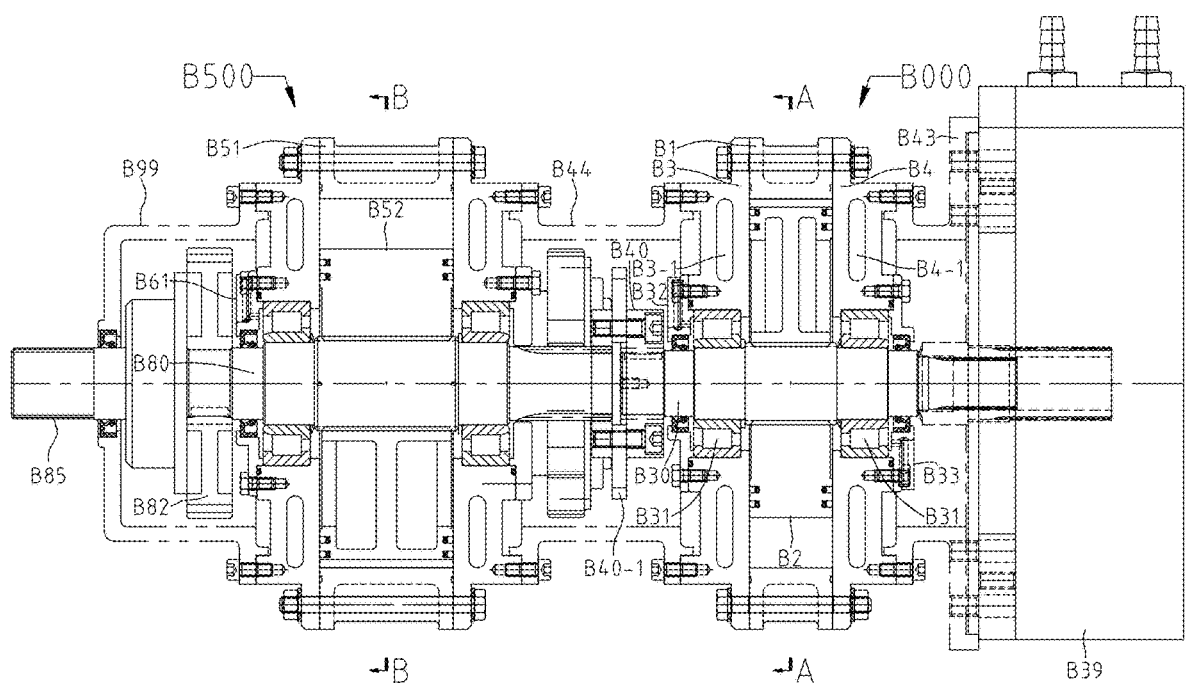
FIG. 8A is a single-axis axial sectional view of a wide fuel engine according to a first embodiment of the present application.
Figure 8B:
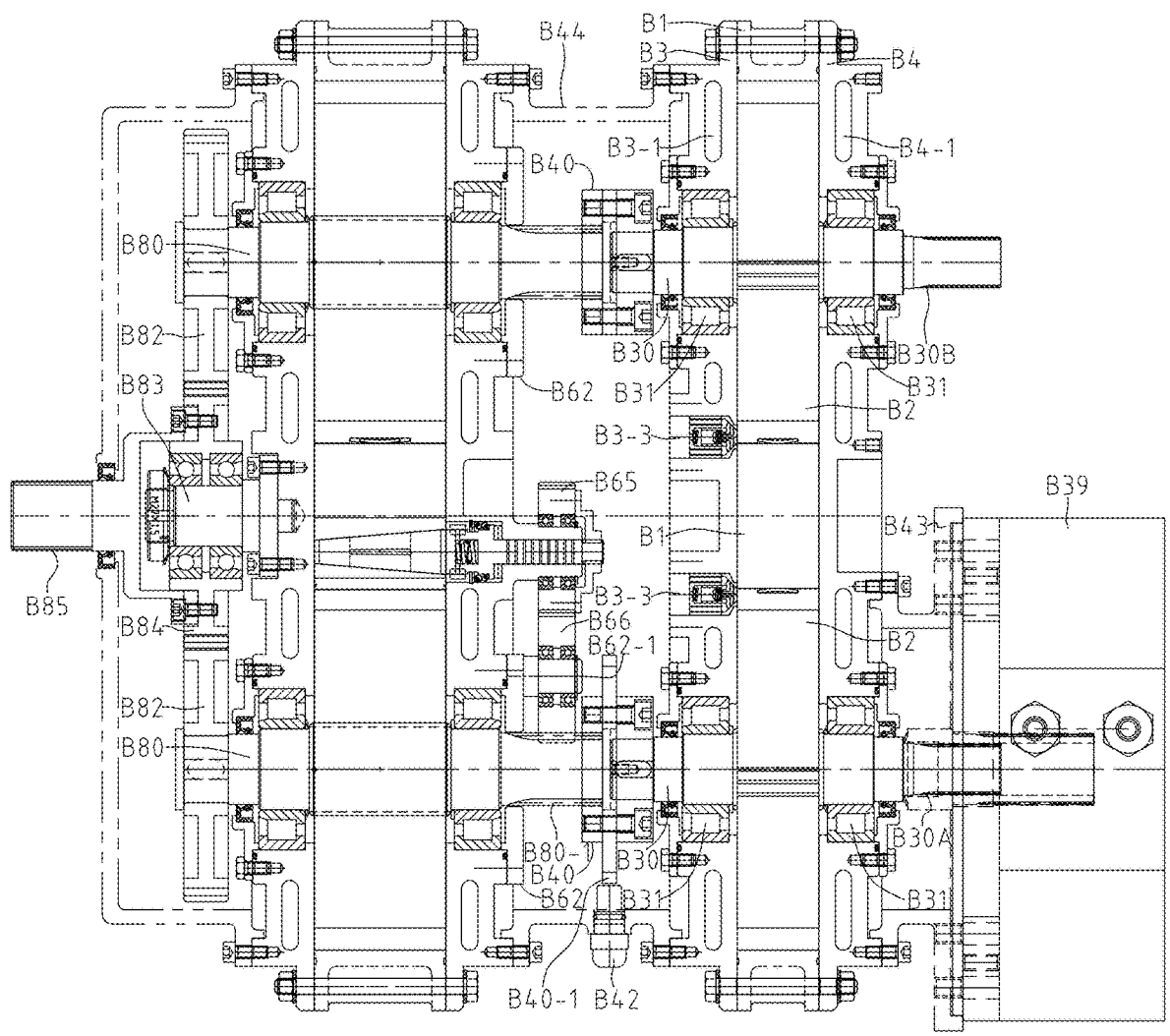
FIG. 8B is a dual-axis axial sectional view of a wide fuel engine according to a first embodiment of the present application.
Figure 8C:
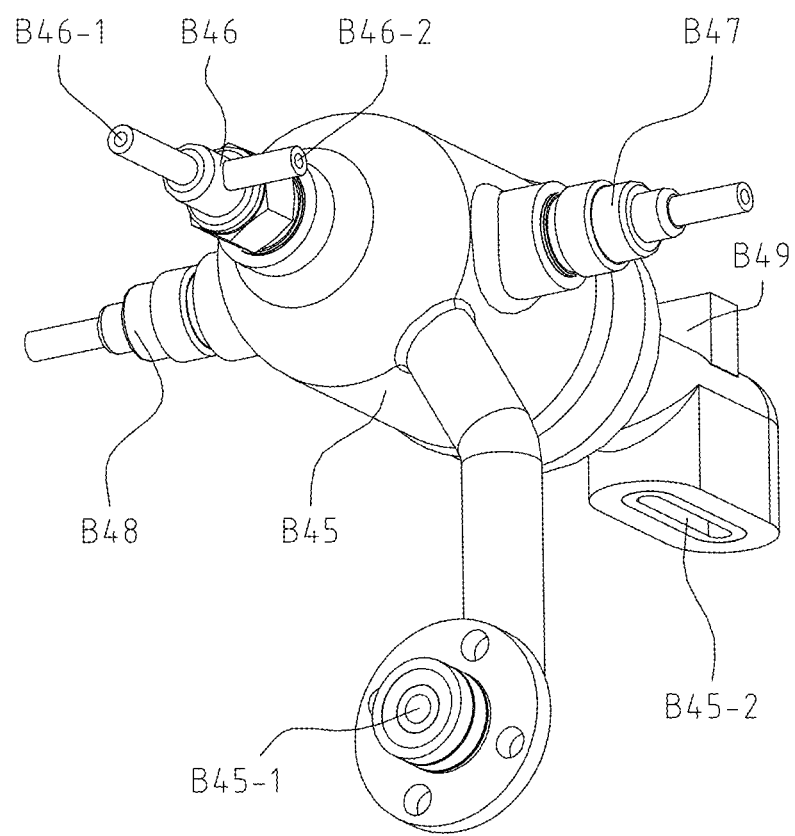
FIG. 8C is a view of a combustion chamber of a wide fuel engine according to a first embodiment of the present application.
Figure 8D:
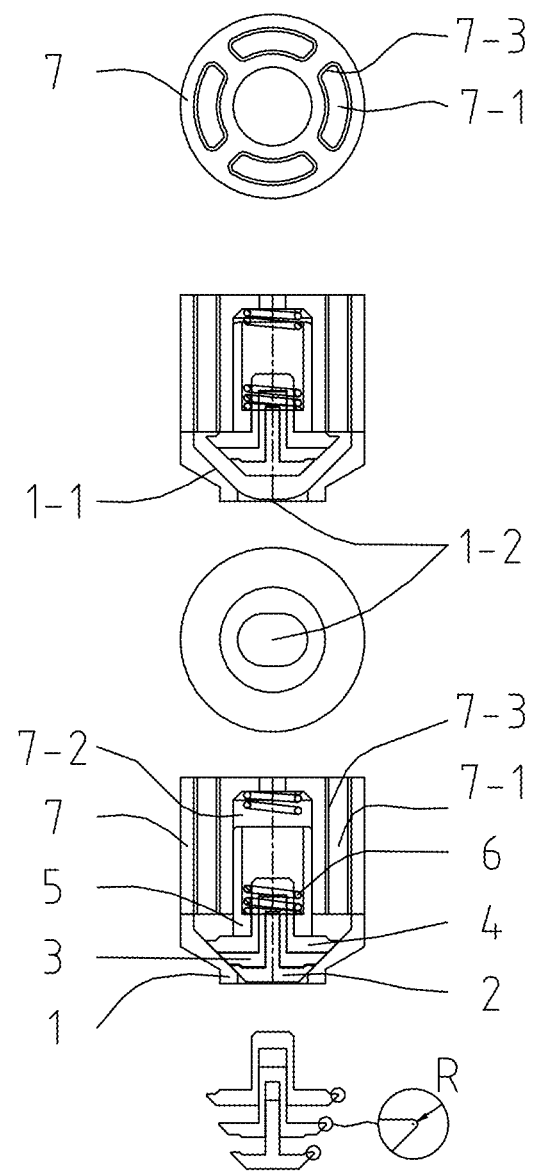
FIG. 8D is a view of a one-way valve of a wide fuel engine according to a first embodiment of the present application.

Referring to FIGS. 5D and 8D, the one-way valve includes an insert 1 embedded into the outlet B3-3 of the cylinder head B3. The insert 1 has a sealing surface 1-1 that is stationary relative to the cylinder head B3. An inlet 1-2 is provided in the center of the sealing surface 1-1.

Since the insert 1 is used on the cylinder head B3, the radial dimension is limited. The inlet 1-2 is not a circle, but an oblate circle formed by two arcs and two straight lines. The one-way valve further includes three stacked disc-shaped sealing members 2, 3, and 4, and the relative movement gap exists between the disc-shaped sealing members 2, 3, and 4. A guide sleeve 5 is disposed between the disc-shaped sealing member 4 and a guide member 7 and the guide sleeve 5 is supported and limited by the guide member 7. Multiple holes 7-1 are disposed on the circumference of the guide member 7, the working medium pressed in through the compression side can pass through the holes 7-1, and a thermal insulation layer 7-3 is disposed in each of the holes 7-1. The guide member 7 is provided with an accommodation cavity 7-2 for accommodating an elastic member 6 that acts on the disc-shaped sealing member 4 so that the disc-shaped sealing members 2, 3, and 4 lean against the stationary sealing surface 1-1. The disc-shaped sealing members 2, 3, and 4 are automatically separated from or in contact with the stationary sealing surface 1-1 according to a pressure difference between two sides to achieve one-way sealing. The guide member 7 has a heat transfer function to prevent the temperature of the elastic member 6 from being too high. The guide sleeve 5 is mainly provided to optimize the space of the elastic member 6. The chamfer arcs R at the sharp corner are provided at the maximum diameters of the disc-shaped sealing members 2, 3, and 4 to make the air pressure on the circumferences of the disc-shaped sealing members 2, 3, and 4 uniform, which is conducive to sealing.

The fitting surfaces between the stationary sealing surface 1-1 and the disc-shaped sealing members 2, 3, and 4 are conical surfaces and may also be elliptical conical surfaces or flat surfaces. The three disc-shaped sealing members achieve three-level sealing, the pressure is shared by the three disc-shaped sealing members, and the pressure difference between the front and rear of each disc-shaped sealing member is relatively small, so the leakage is relatively small, and the disc-shaped sealing members are easy to open level by level.

The structure of the expansion side volumetric machine B500 is similar to the structure of the compression side volumetric machine B000. The differences are as follows: the opening is a working medium outlet B51-5, and the valve is a plug valve; the axial widths of a cylinder block B51, a cam rotor B52, and a slider B60 are greater than at on the compression side; referring to FIG. 1, the slider B60 and the main and auxiliary sealing pieces at the expansion side and the slider B10 and the main and auxiliary sealing pieces at the compression side have the same lengths and thicknesses, similar shapes and structures, and different widths.

Two main shafts B80 of the expansion side volumetric machine B500 achieve a rotational speed ratio of 1:1 through a gear B82 and a transition gear B84. Two main shafts B30 of the compression side volumetric machine B000 are connected to the two main shafts B80 through two couplers B40, so as to achieve a rotational speed ratio of 1:1. The transition gear B84 is sleeved on a shaft B83, and an output shaft B85 is connected to the transition gear B84.

Figure 8E:
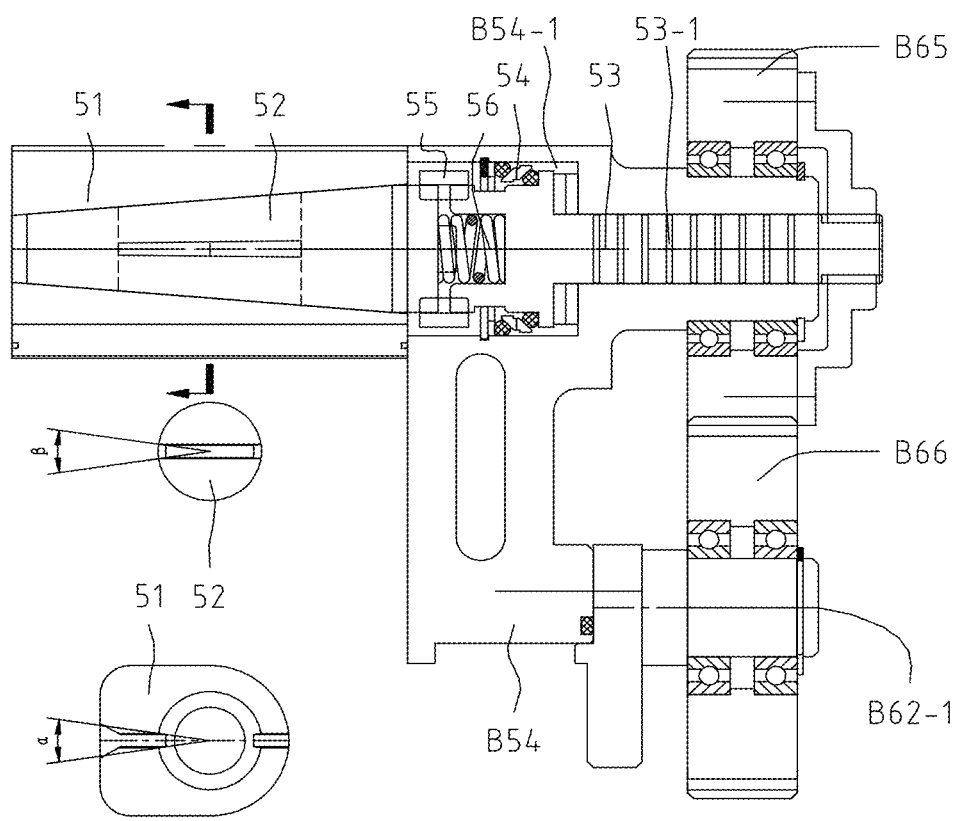
FIG. 8E is a view of a plug valve of a wide fuel engine according to a first embodiment of the present application.
Figure 8F:
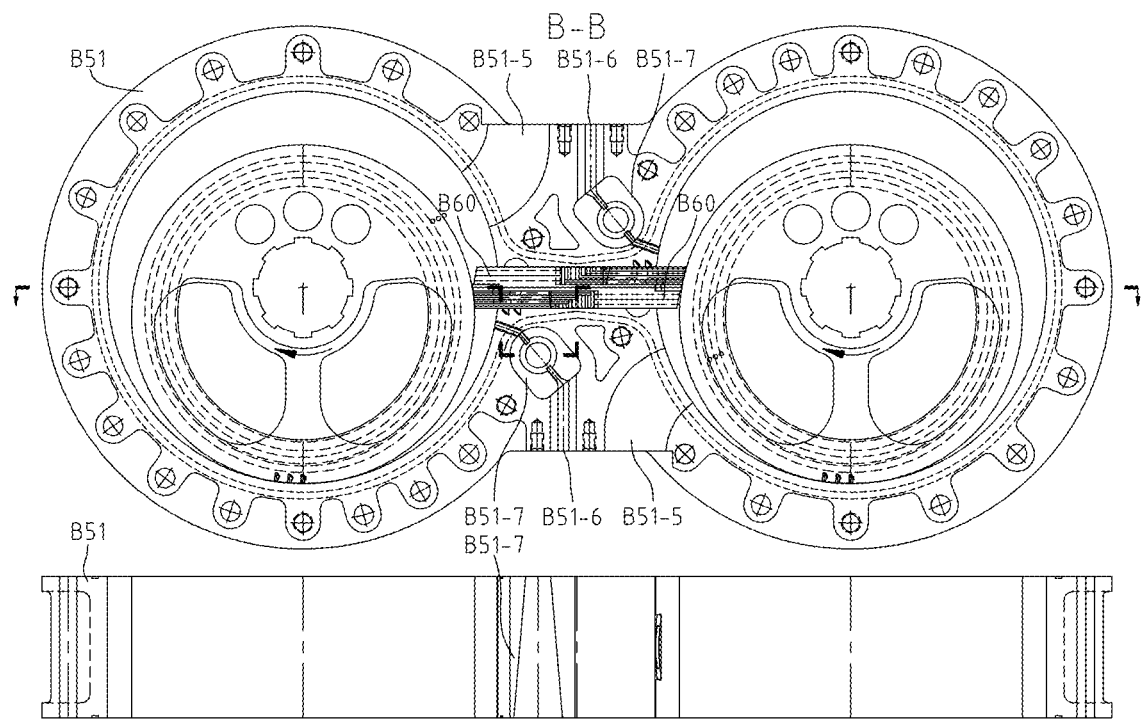
FIG. 8F is a B-B sectional view of a wide fuel engine according to a first embodiment of the present application.

Referring to FIG. 8E, the plug valve includes a valve seat 51, a valve core 52, a shaft 53, a coupler 55 and an elastic member 56 that are disposed between the valve core 52 and the shaft 53, and a gear B65. The valve seat 51 is embedded into an accommodation cavity B51-7 of the cylinder block B51. A part of the shaft 53 is in an accommodation cavity B54-1 of a cylinder head B54, and the other part of the shaft 53 extends out of the accommodation cavity B54-1 and is connected to the gear B65 coaxially with the shaft 53. A mechanical seal 54 is disposed between the shaft 53 and the accommodation cavity B54-1, the mechanical seal 54 forms a chamber, and the lubricating oil is injected into the chamber to form an oil pool. The shaft 53 is provided with multiple pressure equalizing grooves 53-1, the lubricating oil in the oil pool is used for lubrication and sealing, and the pressure equalizing grooves 53-1 may be spiral, but the spiral direction must match the direction of rotation of the valve core 52. The oil pool is provided with an oil replenishing device, which is not shown.

The opening angle of the valve seat 51 is a, the opening angle of the valve core 52 is B, and the sum of a and B is the through-overlap angle. The size of the through-overlap angle is selected such that the compression ratio on the compression side reaches the designed maximum value in the condition where the fuel injected into the combustion chamber per revolution reaches the maximum.

Figure 8G:
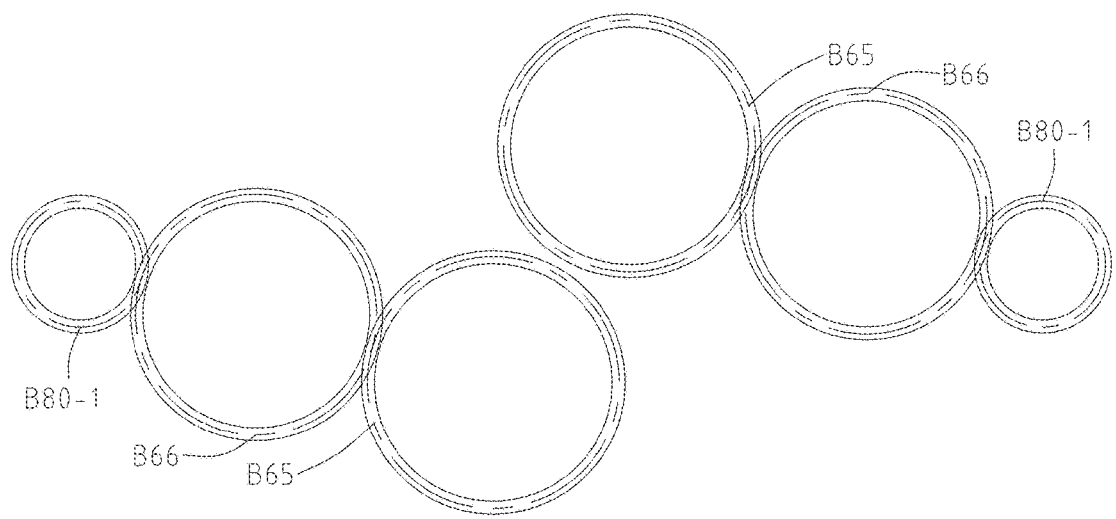
FIG. 8G is a gear transmission view of a plug valve of a wide fuel engine according to a first embodiment of the present application.
Figure 8H:
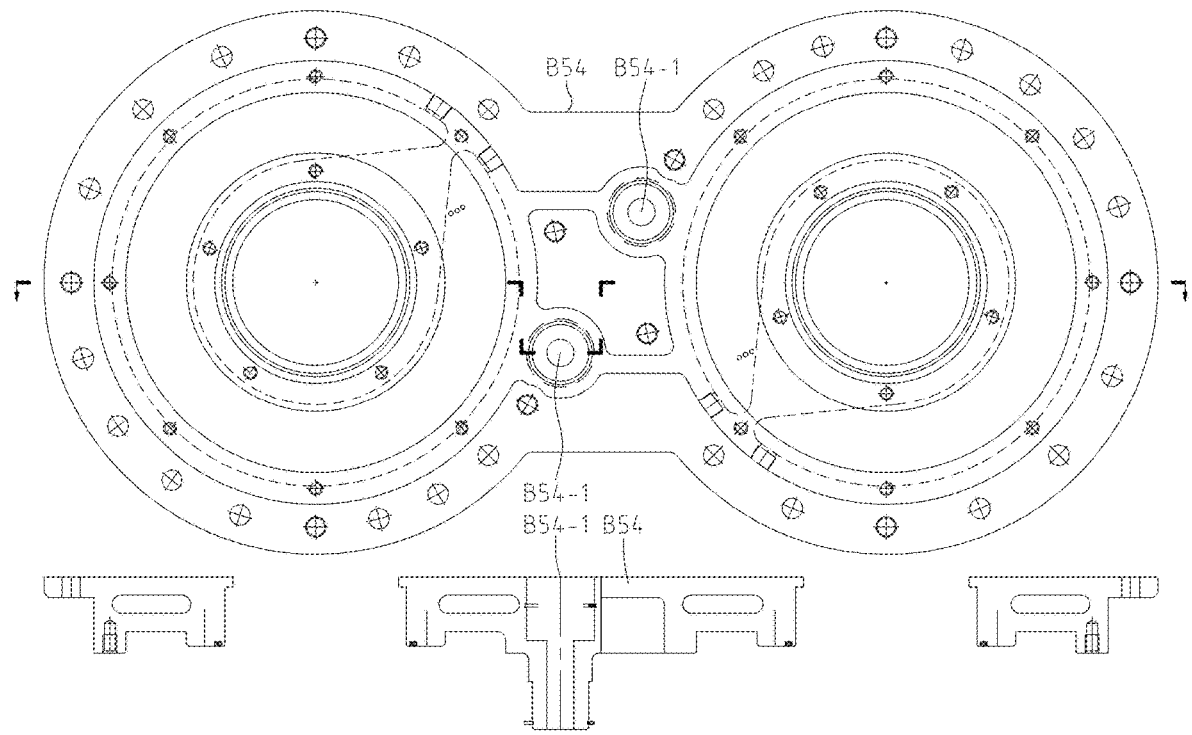
FIG. 8H is a view of a cylinder head B54 of a wide fuel engine according to a first embodiment of the present application.

Referring to FIGS. 8G and 8B, the gear B65 is driven by a gear B80-1 carried by the main shaft B80. The gear ratio between the gear B80-1 and the gear B65 is 1:2, the rotational speed ratio is 2:1, and the gear B80-1 meshes with the gear B65 through a transition gear B66. The transition gear B66 is mounted on a shaft B62-1 of a bearing gland B62 through the bearing. The valve core 52 of the plug valve is driven through the set of gears. The relative angle between the valve core 52 and the valve seat 51 needs to be specially designed, and a passage between the valve core 52 and the valve seat 51 begins to be formed at the occasion when the smallest sealed chamber on the expansion side is formed. The plug valve is a mechanically controlled control valve.

Referring to FIG. 8C, the combustion chamber B45 is provided with a fuel nozzle B46, an ignition device B47, a pressure sensor B48, and a temperature sensor B49. A pressure signal and a temperature signal are inputted into the ECU for feedback and control. The combustion chamber B45 is lined with a heat-resistant insulation layer, which is not shown in the figure.

The fuel nozzle B46 of the combustion chamber B45 has two access ports B46-1 and B46-2. The access port B46-1 delivers the fuel, and the access port B46-2 delivers water. The delivery volume of fuel and water per revolution is controlled by the ECU.

The main shaft at the compression side B30 has two output shafts B30A and B30B. The output shaft B30B powers the lubricating oil pump and the coolant pump. The lubricating oil pump and the coolant pump are not shown.

A toothed disc B40-1 is mounted on the coupler B40, which corresponds to the position of a position sensor B42 mounted on the housing B44. A signal of the position sensor B42 is inputted into the ECU for feedback and control.

The output shaft B30A is connected to an electric motor B39. The electric motor B39 is configured to start the wide fuel engine and may also be configured to provide additional torque and power for the wide fuel engine. The electric motor B39 is fixed to a cylinder head B4 through a housing B43. The electric motor B39 is a permanent magnet synchronous motor that also functions as a generator and is used for generating electricity when needed.

The Second Embodiment of the Wide Fuel Engine

Referring to FIGS. 9A, 9B, 9C, 9D, 9E, and 9F and FIGS. 6A, 6B, 6C, 6D, and 6E, the wide fuel engine includes a compression side volumetric machine D000 and an expansion side volumetric machine D500, the working medium heater is a combustion chamber D45, an outlet D1-3 of the compression side volumetric machine D000 is connected with an inlet D45-1 of the combustion chamber D45, and an outlet D45-2 of the combustion chamber D45 is connected with an inlet D51-7 of the expansion side volumetric machine D500.

The compression side volumetric machine D000 and the expansion side volumetric machine D500 are connected into one body through a housing D44. A main shaft D30 of the compression side volumetric machine D000 and the main shaft D80 of the expansion side volumetric machine D500 are connected through a driven disc D40 and a driver disc D41 of the overrunning clutch. In case of overrunning, the driven disc D40 overruns the driver disc D41.

The expansion side volumetric machine D500 adopts the second embodiment shown in FIGS. 6A, 6B, 6C, 6D, and 6E. The opening is the working medium outlet D51-5, and the valve is the solenoid valve.

Figure 9A:
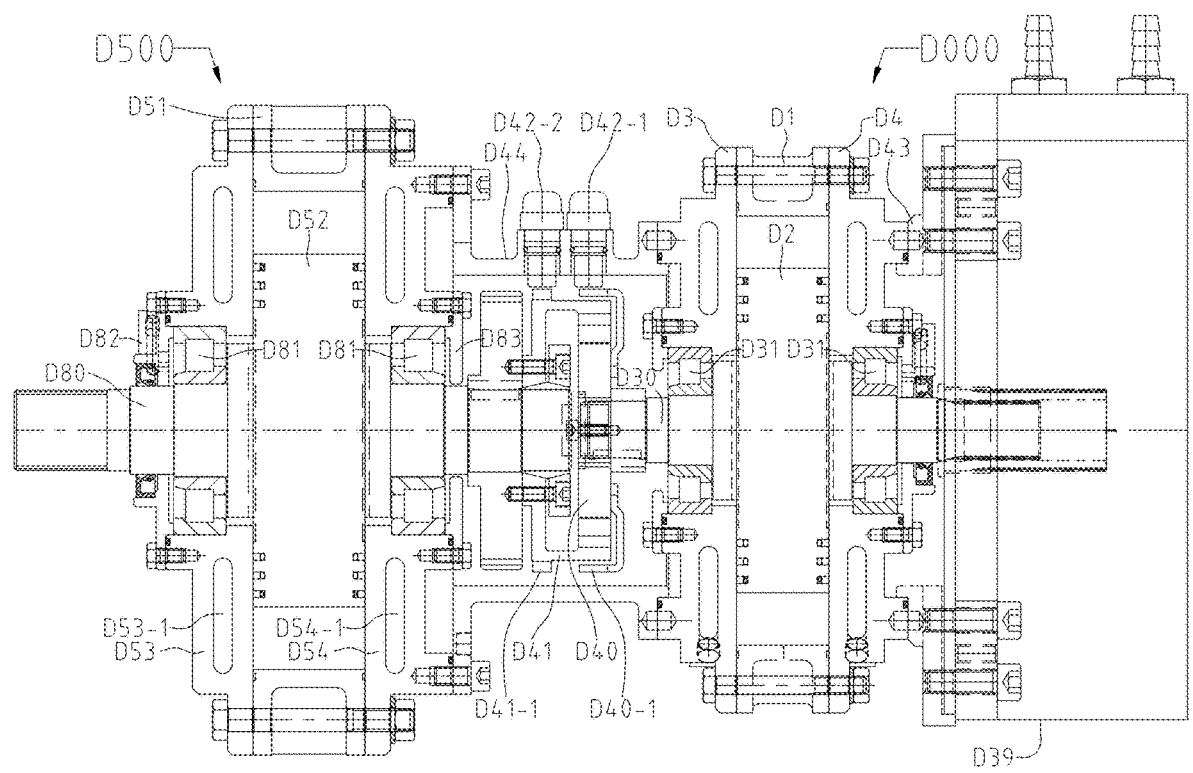
FIG. 9A is an axial sectional view of a wide fuel engine according to a second embodiment of the present application.
Figure 9B:
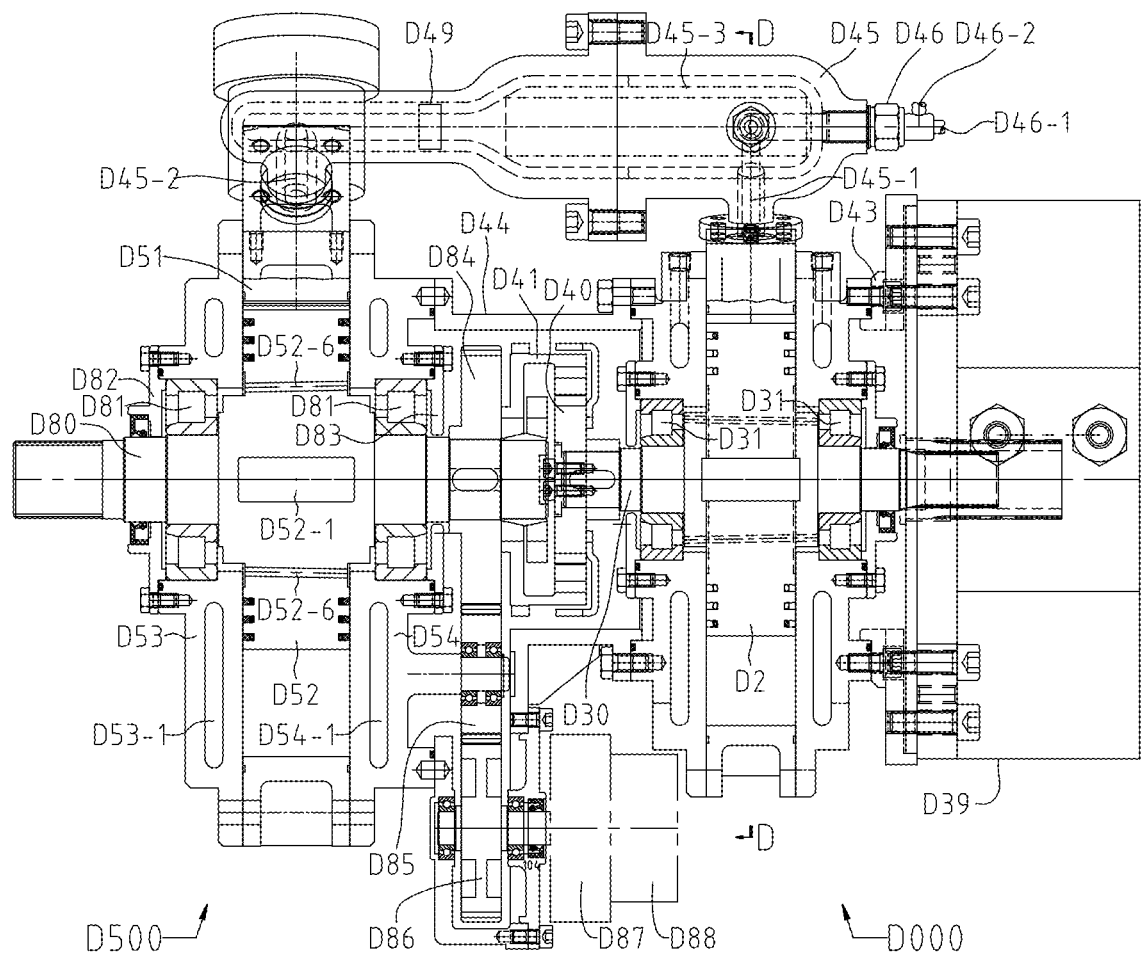
FIG. 9B is a top sectional view of the wide fuel engine in FIG. 9A according to a second embodiment of the present application.
Figure 9C:
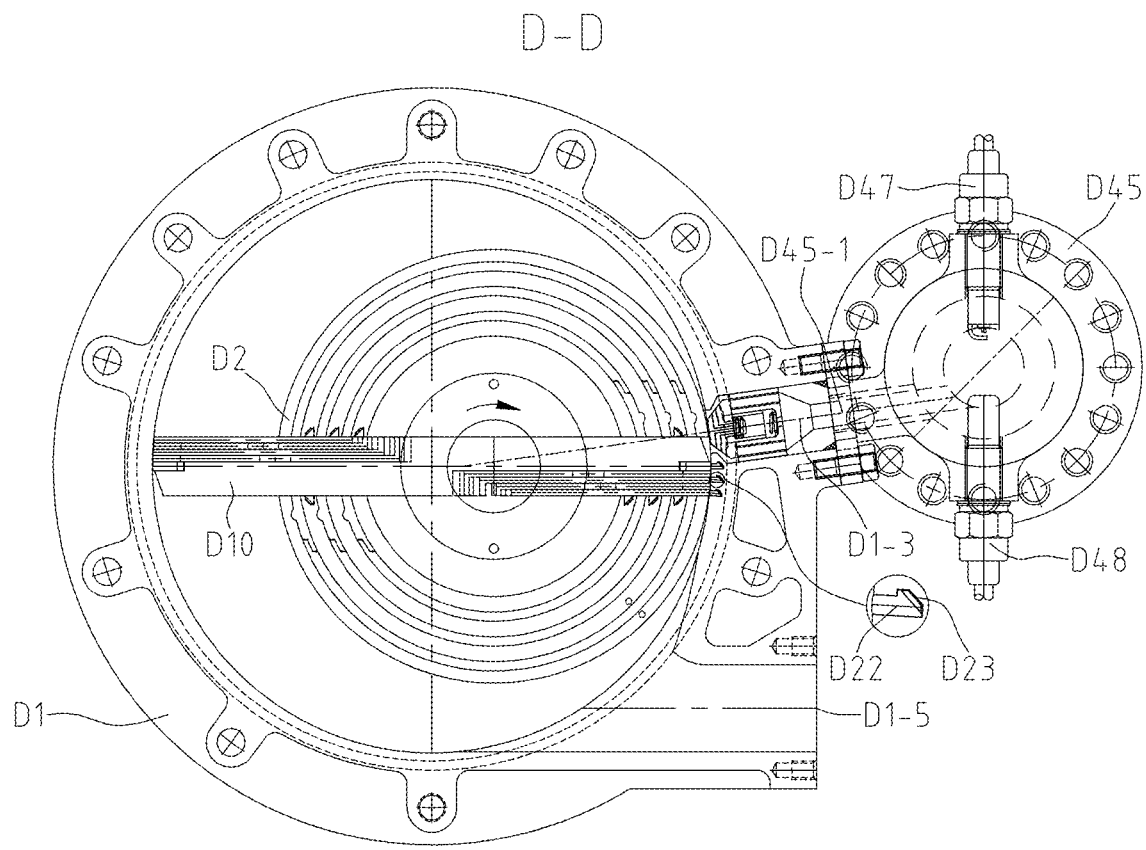
FIG. 9C is a sectional view of a wide fuel engine taken along D-D according to a second embodiment of the present application.
Figure 9D:
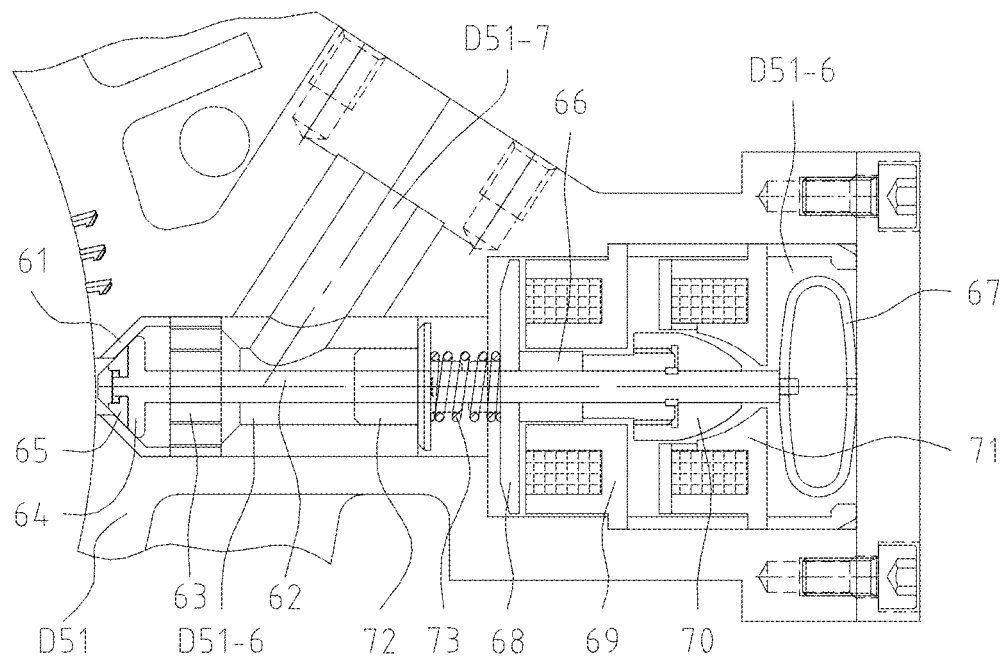
FIG. 9D is a view illustrating a closed state of a solenoid valve of a wide fuel engine according to a second embodiment of the present application.

Referring to FIG. 9D, the solenoid valve includes an insert 61 embedded into the accommodation cavity D51-6 of the cylinder block D51, a valve stem 62, a valve stem guide member 63, disc-shaped sealing members 64 and 65 at the end of the valve stem 62, a reset elastic member 67, a first armature 68, a first electromagnet 69, a second armature 70, and a second electromagnet 71. Holes are distributed around the circumference of the valve stem guide member 63, and the working medium can pass through the holes.

A thermal insulator 72 contributes to a function of thermal insulation and a function of auxiliary guiding for the valve stem 62. The first armature 68 is sleeved on the valve stem 62. The elastic member 73 enables the first armature 68 to move towards a buffer sleeve 66 in the case where the first electromagnet 69 is not powered. The second armature 70 is fixed to the valve stem 62.

Figure 9E:
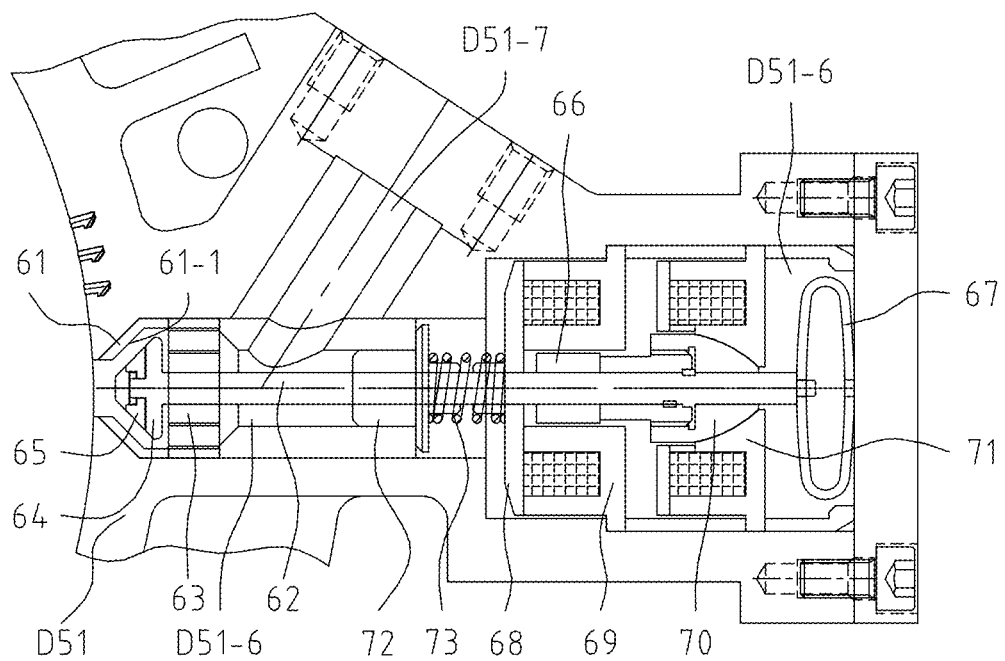
FIG. 9E is a view illustrating an opened state of a solenoid valve of a wide fuel engine according to a second embodiment of the present application.

Referring to FIG. 9E, the on/off of current of the first electromagnet 69 and the second electromagnet 71 is controlled by the ECU, and the solenoid valve is opened at the occasion when the smallest sealed chamber on the expansion side is formed. The opening process is as follows: the first armature 68 is attracted by the first electromagnet 69, and then the second armature 70 is attracted by the second electromagnet 71; the first armature 68 is separated from the buffer sleeve 66, the disc-shaped sealing members 64 and 65 leave a sealing surface 61-1 of the insert 61 which is stationary relative to the cylinder block D51, and the working medium passes through. When the solenoid valve is closed, the sequence is reversed. The first armature 68 and the first electromagnet 69 have a relatively large action area and a relatively large attraction force so that the resistance during opening can be overcome.

A relative movement gap exists between the disc-shaped sealing members 64 and 65 to achieve two-level sealing so that the leakage is reduced, and the disc-shaped sealing members 64 and 65 are easy to open level by level.

The occasion when the solenoid valve is closed after being opened is controlled to control the pressure of the combustion chamber, thereby controlling the compression ratio on the compression side.

Referring to FIG. 9C, the structure of the compression side volumetric machine D000 is similar to the structure of the expansion side volumetric machine D500. The main differences are as follows: the opening is a working medium inlet D1-5, and the valve is the one-way valve; the axial widths and radial dimensions of a cylinder block D1, a rotor D2 of the combined sealing piece, a slider D10, and the carried main and auxiliary sealing pieces are less than those at the expansion side, but the shapes and structures are similar; in addition, a radial sealing strip D22 and an elastic member D23 are not symmetrically distributed on the minor axis of the ellipse; among three radial sealing strips D22 and the three elastic members D23, one radial sealing strip D22 and one elastic member D23 are on the minor axis of the ellipse, and the other two radial sealing strips D22 and the other two elastic members D23 are at the side of the low-pressure region; the clearance volume in this embodiment is close to the limit 0, only a necessary movement gap is left when the rotor of the combined sealing piece approaches an inlet 11-2 of the one-way valve, and basically no excess volume exists.

Figure 9F:
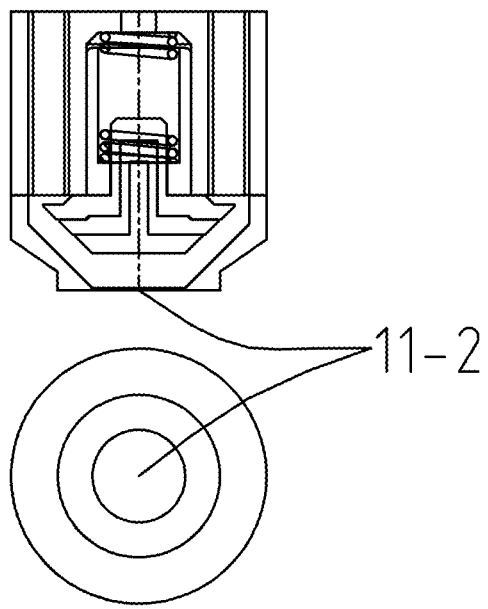
FIG. 9F is a view of a one-way valve of a wide fuel engine according to a second embodiment of the present application.

Referring to FIG. 9F, the one-way valve is basically the same as that in FIG. 8D, except that the inlet 11-2 is round instead of oblate and the clearance volume is smaller. The one-way valve is located in the outlet D1-3 of the cylinder block D1.

Referring to FIGS. 9B and 9C, the combustion chamber D45 is provided with a fuel nozzle D46, an ignition device D47, a pressure sensor D48, and a temperature sensor D49. A pressure signal and a temperature signal are inputted into the ECU for feedback and control. The combustion chamber D45 is lined with a heat-resistant insulation layer D45-3.

The fuel nozzle D46 of the combustion chamber D45 has two access ports D46-1 and D46-2. The access port D46-1 delivers the fuel, and the access port D46-2 delivers water. The delivery volume of fuel and water per revolution is controlled by the ECU.

A gear D84 is mounted at a main shaft at the expansion side D80. Through a transition gear D85 mounted on a cylinder head D54, the power is transmitted to a gear D86 mounted on the housing D44. The gear D86 is connected to power devices D87 and D88. The power devices D87 and D88 can drive the lubricating oil pump, the coolant pump, and the like and can also assist in starting the expansion side only when the zero-speed solenoid valve does not match the phase of the rotor. Each of the power devices D87 and D88 is at least one of an electric motor or a generator.

The overrunning clutch includes a driven disc D40 and a driver disc D41. The driven disc D40 and the driver disc D41 are provided with a toothed disc D40-1 and a toothed disc D41-1, respectively, corresponding to the positions of a position sensor D42-1 and a position sensor D42-2 mounted on the housing D44. The signals of the position sensor D42-1 and the position sensor D42-2 are inputted into the ECU for feedback and control.

A compression side output shaft D30 is connected to an electric motor D39 configured to start the wide fuel engine and also configured to provide additional torque and power for the wide fuel engine, the rotational speed at the compression side overruns the rotational speed at the expansion side, the amount of air intake and the fuel injection amount are increased, and greater torque and power are provided. The electric motor D39 is fixed to a cylinder head D4 through a housing D43. The electric motor D39 is a permanent magnet synchronous motor that also functions as a generator and is used for generating electricity when needed.

The Third Embodiment of the Wide Fuel Engine

Referring to FIGS. 10A, 10B, 10C, 10D, 10E, 10F, and 10G and FIGS. 7A, 7B, 7C, and 7D, the wide fuel engine includes a compression side volumetric machine E000, an expansion side volumetric machine E500, and an expansion side volumetric machine E700, the working medium heater is a combustion chamber E45, an outlet E1-8 of the compression side volumetric machine E000 is connected with an inlet E45-1 of the combustion chamber E45, and outlets E45-2 and E45-3 of the combustion chamber E45 connect with inlets E51-6 and E71-6 of the expansion side volumetric machine E500 and the expansion side volumetric machine E700, respectively.

The compression side volumetric machine E000, the expansion side volumetric machine E500, and the expansion side volumetric machine E700 are connected into one body through cylinder heads E4 and E54. The main shaft at the expansion side is coaxial with a main shaft at the compression side E30.

The compression side volumetric machine E000 adopts the third embodiment shown in FIGS. 7A, 7B, 7C, and 7D. The opening is a working medium inlet E1-5, and the valve is a one-way valve.

Figure 10C:
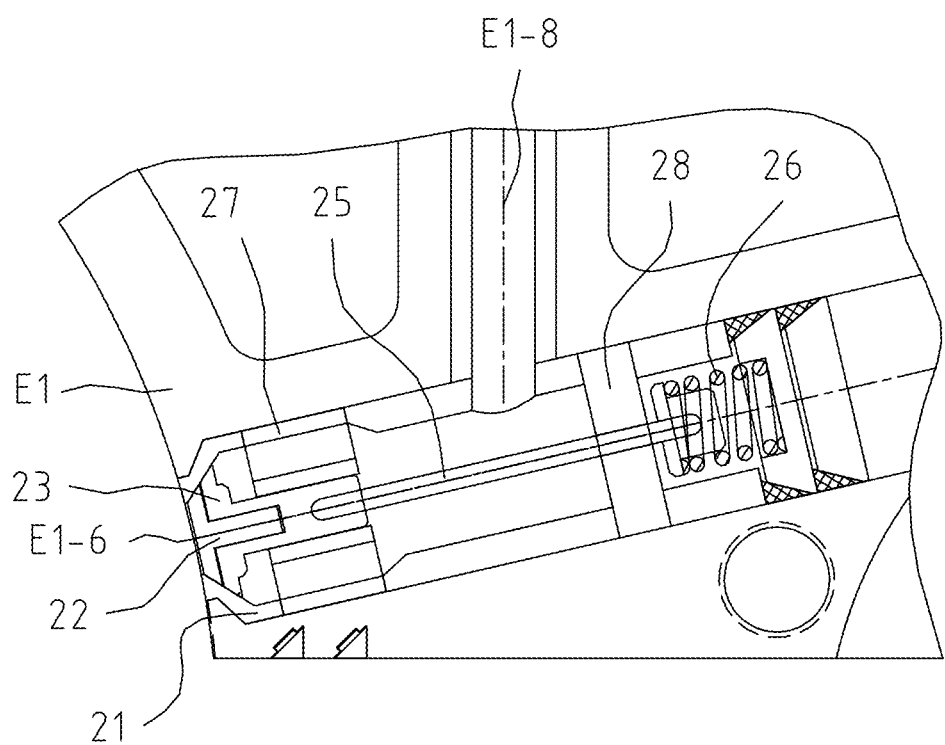
FIG. 10C is a view of a one-way valve of a wide fuel engine according to a third embodiment of the present application.

Referring to FIGS. 7C and 10C, an insert 21 is in the working medium outlet E1-6, and a relative movement gap exists between two stacked disc-shaped sealing members 22 and 23. The disc-shaped sealing member 23 is supported and limited by a guide member 27. Multiple holes are disposed on the circumference of the guide member 27, and the working medium pressed in through the compression side can pass through the holes. An elastic member 26 that acts on the disc-shaped sealing member 23 is behind a thermal insulator 28, and a force is applied to the disc-shaped sealing member 23 through a push rod 25. In this embodiment, the temperature of the elastic member 26 is not too high.

The structures of the expansion side volumetric machines E500 and E700 are similar to the structure of the compression side volumetric machine E000. The differences are as follows: the openings are working medium outlets E51-5 and E71-5, and the valve is a plug valve; the sum of the axial widths of cylinder blocks E51 and E71, rotors E52 and E72, and sliders E60 and E80 is greater than that on the compression side; referring to FIG. 7D, the sliders E60 and E80 and the main and auxiliary sealing pieces carried by the sliders E60 and E80 at the expansion side and the slider E10 and the main and auxiliary sealing pieces carried by the slider E10 at the compression side have the same lengths and thicknesses, similar shapes and structures, and different widths.

Figure 10D:
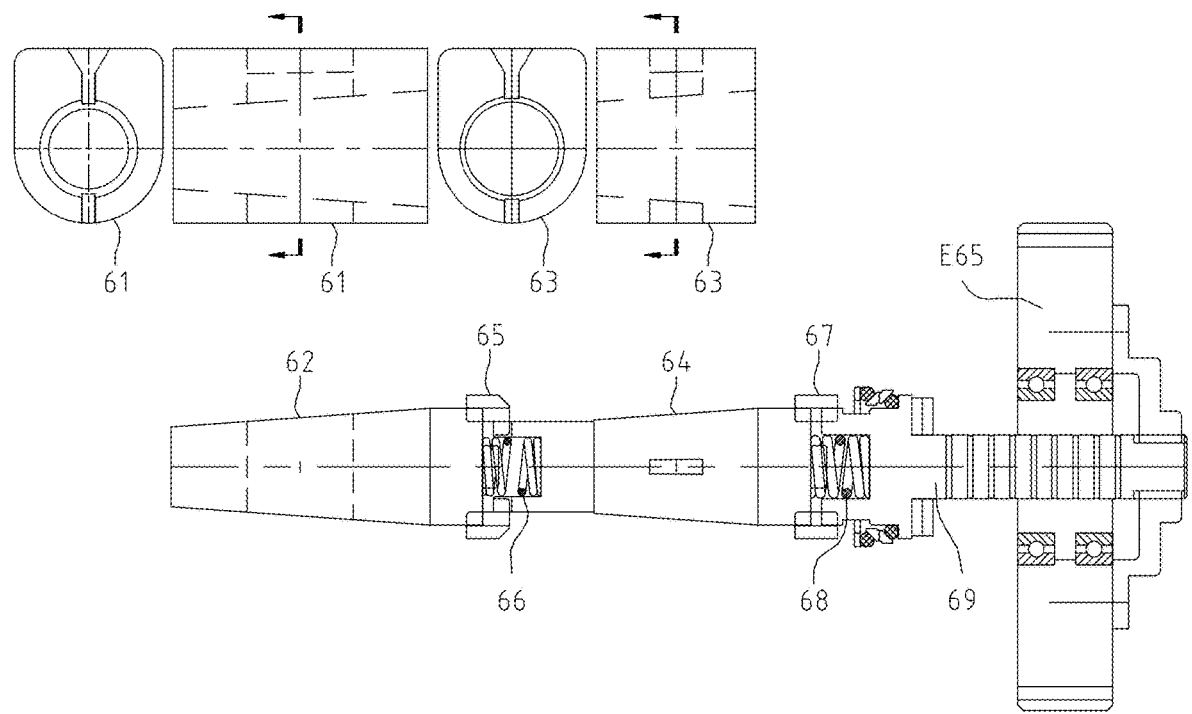
FIG. 10D is a view of a plug valve of a wide fuel engine according to a third embodiment of the present application.
Figure 10E:
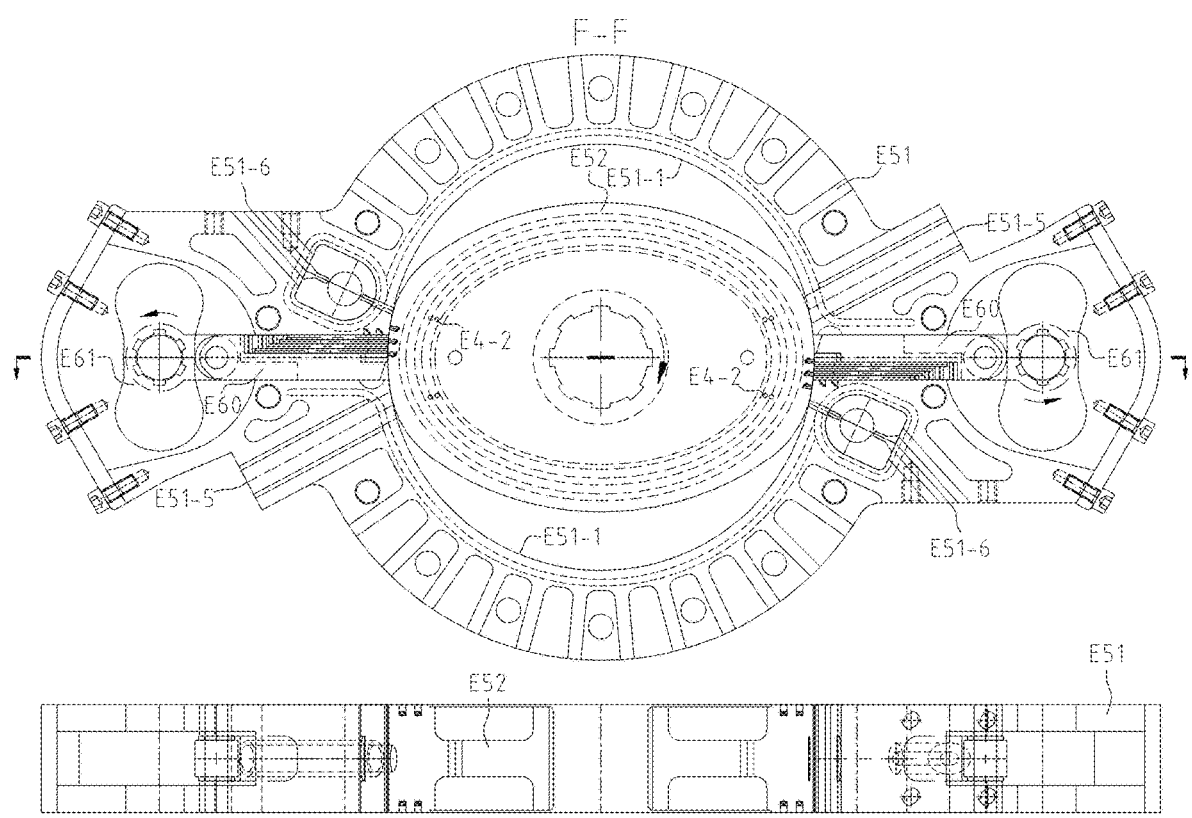
FIG. 10E is a sectional view of a wide fuel engine taken along F-F according to a third embodiment of the present application.
Figure 10F:
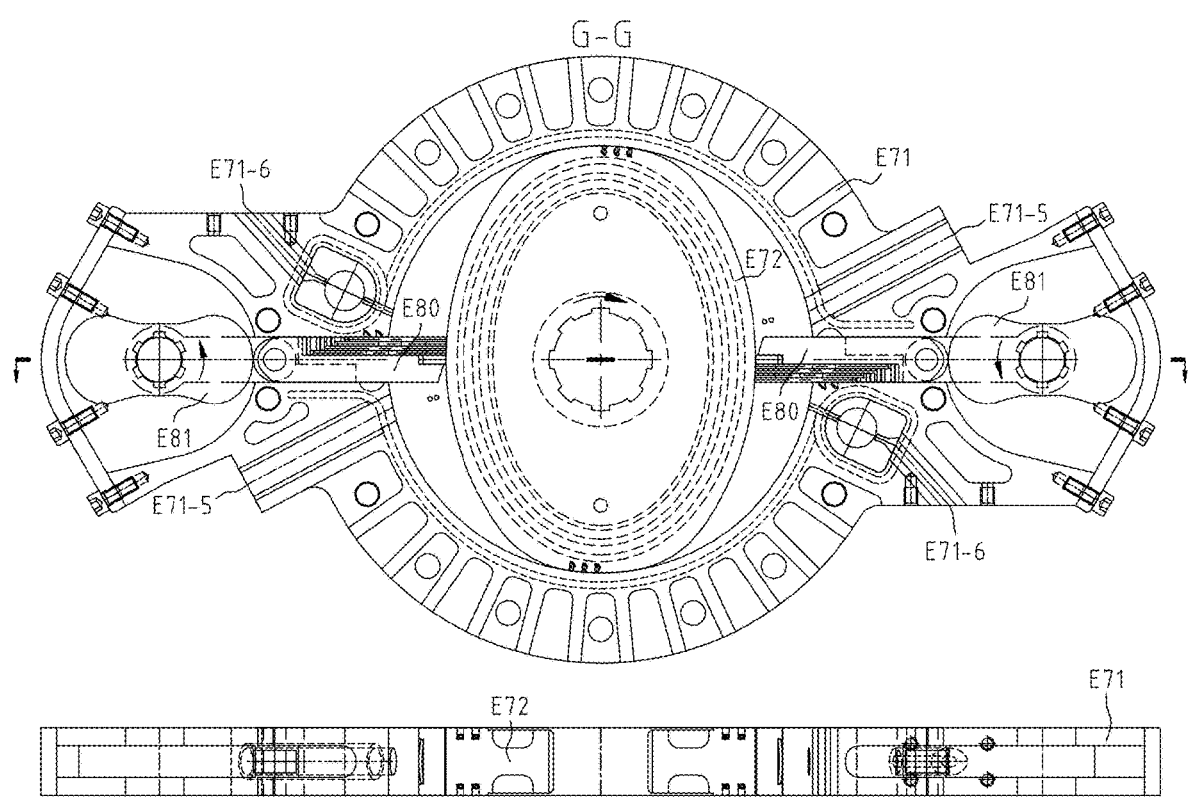
FIG. 10F is a sectional view of a wide fuel engine taken along G-G according to a third embodiment of the present application.
Figure 10G:
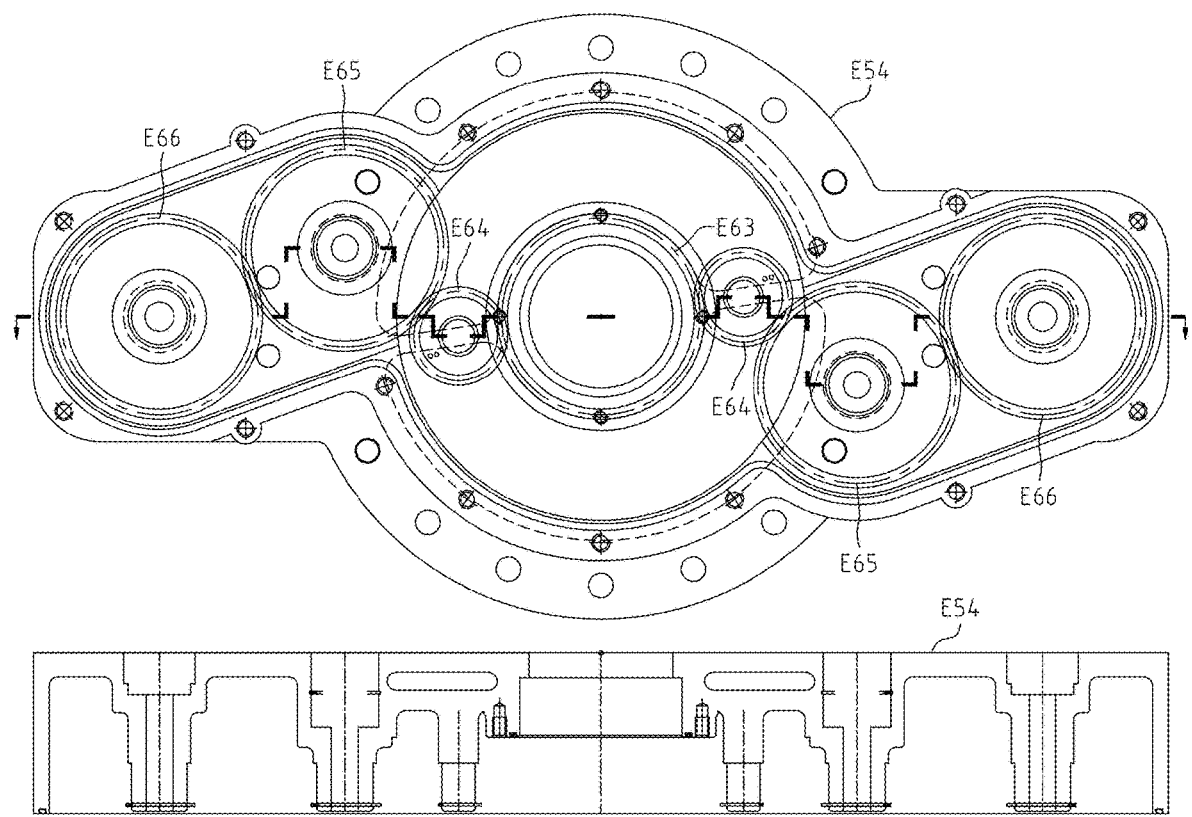
FIG. 10G is a view illustrating a cylinder head E54 and gear transmission of a wide fuel engine according to a third embodiment of the present application.

Referring to FIG. 10D, the plug valve includes valve seats 61 and 63 and valve cores 62 and 64. An elastic member 66 is disposed between the valve cores 62 and 64, and the valve cores 62 and 64 are connected through a coupler 65. An elastic member 68 is disposed between the valve core 64 and a shaft 69, and the valve core 64 and the shaft 69 are connected through a coupler 67. The shaft 69 is connected to a gear E65 coaxial with the shaft 69.

The size of the through-overlap angle between the valve seat 61 and the valve core 62 is selected and the size of the through-overlap angle between the valve seat 63 and the valve core 64 is selected such that the compression ratio at the compression side reaches the designed maximum value in the condition where the fuel injected into the combustion chamber per revolution reaches the maximum.

The angles of the rotors E52 and E72 are offset by 90°, and the angles of the valve cores 62 and 64 are offset by 90°.

Referring to FIGS. 7C, 10A, 10D, and 10G, a gear E63 is mounted on the main shaft E30, two gears E65 are driven through two transition gears E64, and the gear E65 drives a gear E66. Gears E63, E65, and E66 have the same number of teeth, so the rotational speed ratio is 1:1. The gear E65 is connected to the shaft 69 of the plug valve. The valve cores 62 and 64 of the plug valve are driven through the set of gears. The relative angles between the valve cores 62 and 64 and the valve seats 61 and 63 need to be specially designed, and a passage between the valve cores 62 and 64 and the valve seats 61 and 63 begins to be formed at the occasion when the volume of the smallest sealed chamber on the expansion side is formed. The plug valve is a mechanically controlled control valve. The gear E66 is connected to cams E11, E61, and E81 to drive the combined sealing piece.

Referring to FIG. 10B, the combustion chamber E45 is provided with a fuel nozzle E46, an ignition device E47, and a pressure sensor E48. A pressure signal is inputted into the ECU for feedback and control. The fuel nozzle E46 of the combustion chamber E45 has two access ports E46-1 and E46-2. The access port E46-1 delivers the fuel, and the access port E46-2 delivers water. The delivery volume of fuel and water per revolution is controlled by the ECU.

A part with a rotational speed ratio of 1:1 to the main shaft E30 is selected. The part is provided a toothed disc and a position sensor corresponding to the part is provided. The signal is inputted into the ECU for feedback and control. The toothed disc and the position sensor are not shown.

The main shaft E30 is connected to an electric motor E39 configured to start the wide fuel engine and also configured to provide additional torque and power for the wide fuel engine. The electric motor E39 is fixed to a cylinder head E54 through a housing E43. The electric motor E39 is a permanent magnet synchronous motor that also functions as a generator and is used for generating electricity when needed. The lubricating oil pump and the coolant pump are driven by electricity and are not shown.

The First Embodiment of the Gate Valve Applicable to the Wide Fuel Engine

Figure 11A:
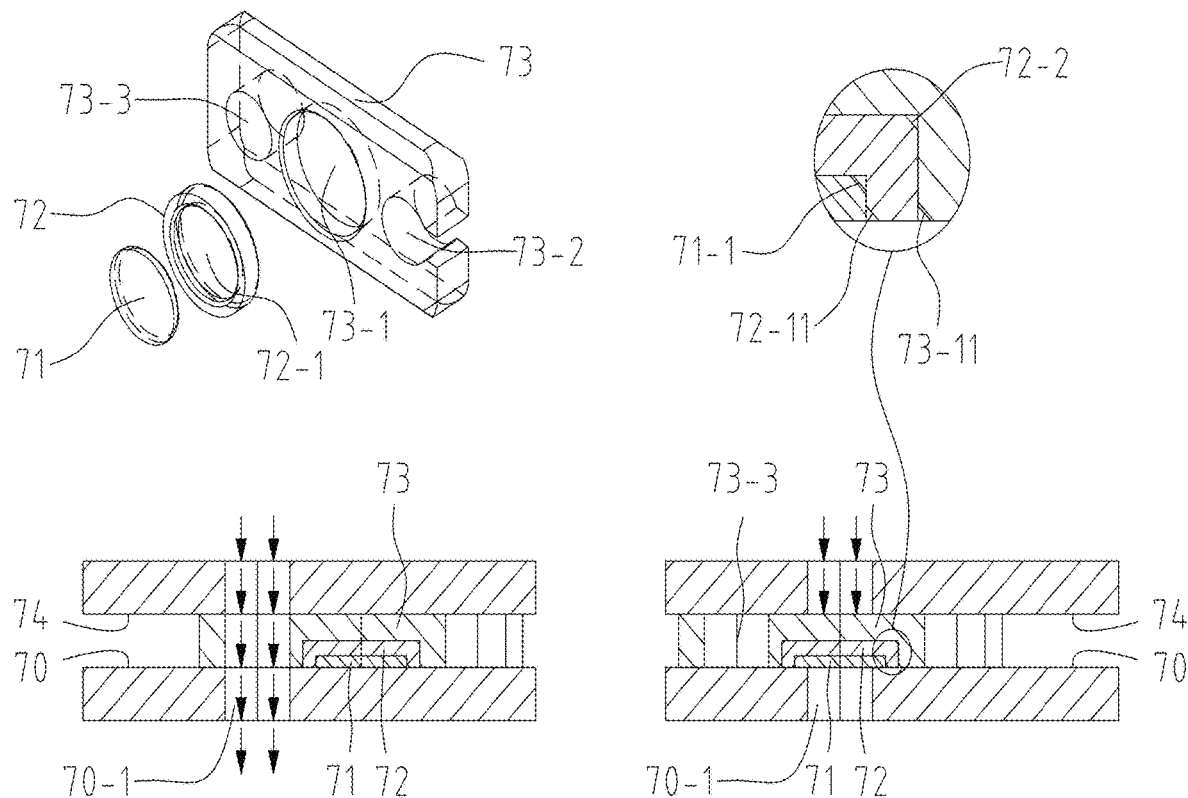
FIG. 11A is a view of a gate valve according to a first embodiment of the present application.

As shown in FIG. 11A, the gate valve applicable to the wide fuel engine includes a stationary sealing surface 70 relative to the cylinder block or the cylinder head, a gate plate 73, and a surface 74 that prevents the gate plate 73 from moving away from the sealing surface 70. The gate plate 73 is provided with an accommodation cavity 73-1 for accommodating a disc-shaped sealing member 72, and the disc-shaped sealing member 72 is provided with an accommodation cavity 72-1 for accommodating a sheet sealing member 71. The gate plate 73, the disc-shaped sealing member 72, and the sheet sealing member 71 are stacked together, and the slight radial and axial gaps exist between the gate plate 73, the disc-shaped sealing member 72, and the sheet sealing member 71. The stationary sealing surface 70 is provided with a working medium outlet 70-1. When the gate plate 73 moves to drive the sealing member 72 and the sheet sealing member 71 to cover the working medium outlet 70-1, the working medium is blocked, the high pressure is separately shared by the gate plate 73, the disc-shaped sealing member 72, and the sheet sealing member 71, the pressure decreases level by level, and the small pressure difference before and after each level reduces the leakage. When the movement of the gate plate 73 causes a through hole 73-3 to connect with the working medium outlet 70-1, the working medium passes through. These two positions are shown in the figure.

The optional solutions are as follows: the sheet sealing member 71 is provided with a chamfer or arc angle 71-1, the disc-shaped sealing member 72 is provided with a chamfer or arc angle 72-11 and a chamfer or arc angle 72-2, the accommodation cavity 73-1 is provided with a chamfer or arc angle 73-11, and the function is to equalize pressure on the circumference, which is conducive to each disc-shaped sealing member being close to the sealing surface 70 under uniform pressure.

Further, the optional solutions are as follows: elastic sheets are provided between the sheet sealing member 71 and the accommodation cavity 72-1 and between the disc-shaped sealing member 72 and the accommodation cavity 73-1, and many available shapes are provided and are not shown in the figure. The elastic sheets are made of high-temperature resistant materials.

The gate plate 73 is further provided with an opening cavity 73-2, and the gate plate driving device acts on the opening cavity 73-2. The gate plate driving device has an electromagnetic method, such as an electromagnet or a linear motor, and a mechanical method, which may be the same as the plug valve drive mentioned above, and a sealing device from the external normal-pressure region to the internal high-pressure region may be provided. The gate plate driving device is not shown.

The Second Embodiment of the Gate Valve Applicable to the Wide Fuel Engine

Figure 11B:
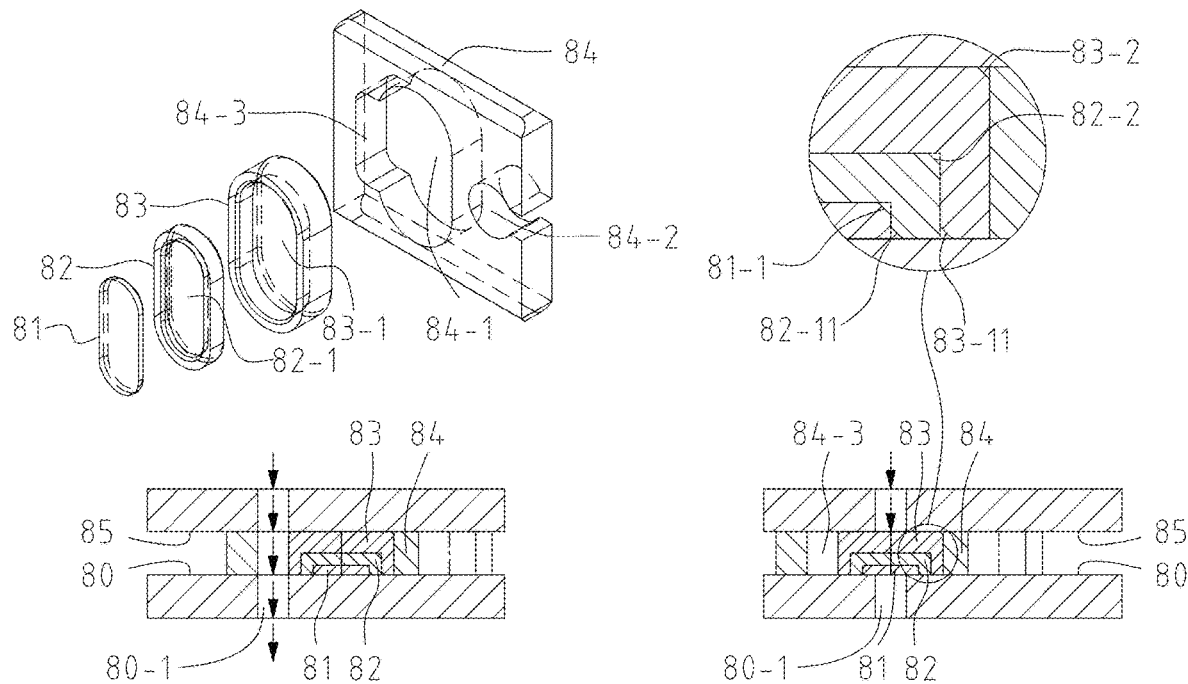
FIG. 11B is a view of a gate valve according to a second embodiment of the present application.

As shown in FIG. 11B, the gate valve applicable to the wide fuel engine includes a stationary sealing surface 80 relative to the cylinder block or the cylinder head, a gate plate 84, and a surface 85 that prevents the gate plate 84 from moving away from the sealing surface 80. The gate plate 84 is provided with an accommodation cavity 84-1, which is opened and can accommodate a disc-shaped sealing member 83. The disc-shaped sealing member 83 is provided with an accommodation cavity 83-1 for accommodating a disc-shaped sealing member 82. The disc-shaped sealing member 82 is provided with an accommodation cavity 82-1 for accommodating a sheet sealing member 81. The gate plate 84, the disc-shaped sealing member 83, the disc-shaped sealing member 82, and the sheet sealing member 81 are stacked together, and the slight radial and axial gaps exist between the gate plate 84, the disc-shaped sealing member 83, the disc-shaped sealing member 82, and the sheet sealing member 81. The stationary sealing surface 80 is provided with a working medium outlet 80-1. When the gate plate 84 moves to drive the disc-shaped sealing member 83, the disc-shaped sealing member 82, and the sheet sealing member 81 to cover the working medium outlet 80-1, the working medium is blocked, the high pressure is separately shared by the disc-shaped sealing member 83, the disc-shaped sealing member 82, and the sheet sealing member 81, the pressure decreases level by level, and the small pressure difference before and after each level reduces the leakage. When the movement of the gate plate 84 causes a through hole 84-3 to connect with the working medium outlet 80-1, the working medium passes through. These two positions are shown in the figure. The working medium outlet 80-1 is a long hole corresponding to the shape of the sheet sealing member 81.

The optional solutions are as follows: the sheet sealing member 81 is provided with a chamfer or arc angle 81-1, the disc-shaped sealing member 82 is provided with a chamfer or arc angle 82-11 and a chamfer or arc angle 82-2, the disc-shaped sealing member 83 is provided with a chamfer or arc angle 83-11 and a chamfer and arc angle 83-2, and the function is to equalize pressure on the circumference, which is conducive to each disc-shaped member being close to the sealing surface 80 under uniform pressure.

Further, the optional solutions are as follows: elastic sheets are provided between the sheet sealing member 81 and the accommodation cavity 82-1 and between the disc-shaped sealing member 82 and the accommodation cavity 83-1, and many available shapes are provided and are not shown in the figure. The elastic sheets are made of high-temperature resistant materials.

The gate plate 84 is further provided with an opening cavity 84-2, and the gate plate driving device acts on the opening cavity 84-2. The gate plate driving device adopts an electromagnetic method, such as an electromagnet or a linear motor, and a mechanical method, which may be the same as the plug valve drive mentioned above, and a sealing device from the external normal-pressure region to the internal high-pressure region may be provided. The gate plate driving device is not shown.

In these two embodiments of gate valves, the resistance to the passage of the working medium is small, the driving force of the gate plate is not large, the machining is easy, the cost is low, and the operation is reliable.

The three embodiments of wide fuel engines listed in the present application have at least the characteristics described below.

Since the fuel is burned in a specific combustion chamber, there is no deflagration problem with the crank-piston gasoline engine, and the compression ratio is not limited by deflagration. The combined sealing piece in the present application adopts multi-level sealing. The volumetric machine reduces the clearance volume such that the clearance volume is close to the limit 0. The pressure and volumetric efficiency on the compression side are improved, laying the foundation for the improvement and optimization of the compression ratio. Due to the characteristics of the present application in terms of the compression ratio, the compression ratio can reach or exceed the compression ratio of diesel engines, and the thermal efficiency is expected to reach or exceed 46% of the thermal efficiency of mainstream diesel engines.

Since the compression side and the expansion side are carried out in different volumetric spaces, the expansion work volume per revolution on the expansion side may be greater than the compression volume per revolution on the compression side, better reflecting the thermal efficiency advantage than the Atkinson cycle imitated by the crank-piston gasoline engine. Just by this, the thermal efficiency is expected to increase by about 6%.

Since the fuel is burned in a specific combustion chamber, compared with the crank-piston internal combustion engine, the time window of fuel combustion is long enough, the temperature fluctuation is small, no quenching phenomenon occurs, no dead ends and no leakage exist, and the fuel is completely burned. On the one hand, the fuel injection amount per revolution is less than or equal to the fuel proportioning amount of the theoretical air fuel ratio, creating conditions for lean combustion or even ultra-lean combustion. On the other hand, CO, HC, and particulate matter are prevented from being produced at all, or even though CO, HC, and particulate matter are produced in small amounts, CO, HC, and particulate matter have the opportunity to be burned in the combustion chamber. Full combustion of fuel brings full utilization of heat, the thermal efficiency is expected to improve, and emissions of CO, HC, and particulate matter are improved. Since the fuel has been completely burned in the combustion chamber before the working medium enters the expansion side, heat is used for working during the entire process of volume expansion on the expansion side, and the thermal efficiency is expected to improve.

Since the fuel is burned in a specific combustion chamber, the combustion temperature is easier to control. The maximum combustion temperature per revolution of the combustion chamber is controlled by adjusting the fuel injection amount per revolution, the fuel injection duration per revolution, and the distribution state of fuel in the combustion chamber. NOX emissions are reduced from the source, and the fuel is completely burned so that the exhaust aftertreatment device is simplified or even omitted, the exhaust resistance is expected to be reduced, and the thermal efficiency is improved.

Since the fuel is burned in a specific combustion chamber, it is very tolerant to the fuel. In addition to gasoline, diesel, kerosene, and heavy oil, non-fossil fuels such as biodiesel, methanol, and hydrogen can also be used.

The introduction of water in the combustion chamber reduces the temperature of the combustion chamber, reduces NOX emissions, reduces the impact of excessive temperature on the expansion side, and improves the workability of the working medium.

A gas distribution system is greatly simplified, and the pumping gas loss and mechanical friction loss are reduced. Just by this, the thermal efficiency is expected to increase by about 4%.

To sum up, the thermal efficiency of the wide fuel engine in the present application is expected to exceed 56%.

Compared with the crank-piston internal combustion engine, the crank and the connecting rod are omitted, the gas distribution system is greatly simplified, the volume and mass are reduced, the rotor can be dynamically balanced, the rotational speed is higher, and the power density is increased. In particular, the latter two embodiments are double-acting and have higher power density.

In the three embodiments of wide fuel engines listed in the present application, the torques of the working media in different chambers on the expansion side overlap but are not interrupted, the torque is continuous, the operation is smoother, and the idle speed can be very low.

The present application further provides the technical solutions described below.

In technical solution 58, the combined sealing piece in any one of technical solutions 1 to 15 is mounted on a volumetric machine, for example, a compressor.

In technical solution 59, the combined sealing piece in any one of technical solutions 1 to 15 is mounted on an engine, for example, a wide fuel engine.

Technical solution 60 is about the use of the combined sealing piece in any one of technical solutions 1 to 15 in a volumetric machine or an engine.

What is claimed is:

1. A combined sealing piece, comprising a slider with a main sealing piece, wherein the combined sealing piece further comprises at least one auxiliary sealing piece, a first auxiliary sealing piece of the at least one auxiliary sealing piece is backed against the slider or leans against the main sealing piece and the slider at the same time, an elastic member is disposed between the first auxiliary sealing piece and the main sealing piece, and the elastic member is disposed between the first auxiliary sealing piece and the slider.

2. The combined sealing piece of claim 1, wherein a second auxiliary sealing piece of the at least one auxiliary sealing piece is backed against the first auxiliary sealing piece or leans against the first auxiliary sealing piece and the slider at the same time, and the elastic member is disposed between the second auxiliary sealing piece and the first auxiliary sealing piece or the slider.

3. The combined sealing piece of claim 2, wherein a number of the at least one auxiliary sealing piece is N, and the at least one auxiliary sealing piece is arranged in the following continuous descending order:

an N-th auxiliary sealing piece is backed against an (N−1)-th auxiliary sealing piece or leans against the (N−1)-th auxiliary sealing piece and the slider at the same time, and the elastic member is disposed between the N-th auxiliary sealing piece and the (N−1)-th auxiliary sealing piece or the slider; the (N−1)-th auxiliary sealing piece is backed against an (N−2)-th auxiliary sealing piece or leans against the (N−2)-th auxiliary sealing piece and the slider at the same time, and the elastic member is disposed between the (N−1)-th auxiliary sealing piece and the (N−2)-th auxiliary sealing piece or the slider; . . . and so on until the sequence decreases to the second auxiliary sealing piece, wherein N is one of 3, 4, 5, 6, 7, 8, 9, or 10.

4. The combined sealing piece of claim 1, wherein at least one of the main sealing piece or the at least one auxiliary sealing piece is formed by splicing a left piece and a right piece, and the elastic member for applying a transverse force is disposed between the left piece and the right piece.

5. The combined sealing piece of claim 1, wherein the elastic member is disposed between the main sealing piece and the slider.

6. The combined sealing piece of claim 1, wherein an accommodation cavity for accommodating the combined sealing piece comprises at least one groove, a sealing strip and the elastic member are disposed in a groove of the at least one groove, and the sealing strip is in contact with the combined sealing piece through elastic member.

7. The combined sealing piece of claim 6, wherein a cross-sectional shape of the sealing strip is triangular, and a direction of a force applied by the elastic member is biased towards a side of a low-pressure region.

8. The combined sealing piece of claim 1, wherein a wear-resistant strip and a circular arc-shaped groove for accommodating the wear-resistant strip are further disposed closest a port of an accommodation cavity for accommodating the combined sealing piece.

9. The combined sealing piece of claim 1, wherein a combination of the main sealing piece and the at least one auxiliary sealing piece is disposed on each of a front surface and a back surface of the slider, and a side shape of the slider is centrosymmetric.

10. The combined sealing piece of claim 1, wherein the main sealing piece and the at least one auxiliary sealing piece are disposed on a surface of the slider, and a roller follower that passes through a shaft is mounted at an end of the slider.

11. The combined sealing piece of claim 1, wherein the main sealing piece and the slider are integrated, and the at least one auxiliary sealing piece and a corresponding elastic member of the at least one auxiliary sealing piece are symmetrically distributed at two sides of the main sealing piece.

12. The combined sealing piece of claim 1, wherein the main sealing piece and the slider are integrated, and two combinations of main sealing pieces, the at least one auxiliary sealing piece, and corresponding elastic members of the at least one auxiliary sealing piece are arranged symmetrically back to back with each other.

13. A volumetric machine, comprising:
a rotor, a cylinder block, and cylinder heads located at two sides of the cylinder block, wherein the rotor is rotatably mounted in a cylindrical inner wall of the cylinder block through a main shaft and bearings by means of the cylinder heads;
wherein the rotor is a cam rotor, an outline of the rotor extends smoothly from a maximum radius arc to two sides until overlapping, a distance from each point of the outline to a rotary axis center gradually decreases from a maximum value to a minimum value during an extension process, an arc cylindrical surface of the maximum radius arc comprises at least one groove, and a radial sealing strip that acts on the cylindrical inner wall of the cylinder block is disposed in a groove of the at least one groove;
each of two end surfaces of the rotor comprises at least one annular groove and a sealing ring in the at least one annular groove;
the cylinder block is provided with a front accommodation cavity configured to accommodate a combined sealing piece and a rear accommodation cavity configured to accommodate a drive mechanism of the combined sealing piece;
a variable volume is isolated in the cylindrical inner wall of the cylinder block by the rotor and the combined sealing piece, and an opening and a valve for entry and exit of a working medium are located on the cylinder block or a cylinder head of the cylinder heads on each of one side of a low-pressure region and one side of a high-pressure region separated by the combined sealing piece, respectively; and
the volumetric machine further comprises a lubrication channel and a cooling surface;
wherein the combined sealing piece is the combined sealing piece of claim 1.

14. The volumetric machine of claim 13, wherein a radius of the maximum radius arc is R0, a center of the maximum radius arc coincides with the rotary axis center, a line between a midpoint of the maximum radius arc and the rotary axis center is a line of symmetry, a radius of another arc with a center on the line of symmetry is R1, a transition arc R2 is disposed between the arc with a radius of R0 and the arc with a radius of R1 on each of two sides of the line of symmetry, or a plurality of arcs replace the arc R2, and all the plurality of arcs are adjacent, tangent, and connected into a smooth curve.

15. The volumetric machine of claim 13, wherein an anti-off step is comprised between the radial sealing strip that acts on the cylindrical inner wall of the cylinder block and the groove of the radial sealing strip, the radial sealing strip is allowed to have a radial movement gap, and a position of the radial sealing strip on the arc cylindrical surface is centered or biased towards the side of the low-pressure region.

16. The volumetric machine of claim 13, wherein each of the two end surfaces of the rotor further comprises a groove bottom of the at least one annular groove and an elastic sealing member between sealing rings, and a cross section of the sealing ring is square or rectangular; or the sealing ring is formed by rolling a sheet with a length greater than a circumference of the annular groove, and two ends of the sheet gradually become thinner.

17. The volumetric machine of claim 13, wherein the cylinder block is provided with two cylindrical inner walls, two rotors with parallel rotation axes are separately mounted in the two cylindrical inner walls, the two rotors have parallel lines between a midpoint of the maximum radius arc and the rotary axis center of outlines of the two rotors, and an inter-axis rotational speed ratio of the two rotors are 1:1;
wherein the front accommodation cavity is connected with the two cylindrical inner walls, sealing end surfaces of two combinations of main sealing pieces and auxiliary sealing pieces carried by a slider of the combined sealing piece are in contact with the two rotors in opposite directions; and wherein an end of the slider receives a force from the rotor on one side acting on sealing end surfaces of a plurality of sealing pieces, another end of the slider receives a force from the rotor on another side acting on the sealing end surfaces of the plurality of sealing pieces, the slider on which the two forces act slides back and forth, the two cylindrical inner walls serve as rear accommodation cavities for each other, and the two rotors serve as drive mechanisms of combined sealing pieces for each other.

18. The volumetric machine of claim 13, wherein a surface of the cylinder head facing the rotor is provided with at least one small dent or at least one thin groove, the at least one small dent or the at least one thin groove is closest to the cylindrical inner wall of the cylinder block and has an opportunity to be in contact with lubricating oil in sealing rings on the two end surfaces of the rotor.

19. A wide fuel engine, comprising:
a compression side volumetric machine, an expansion side volumetric machine, and a working medium heater, wherein an outlet of the compression side volumetric machine is connected with an inlet of the working medium heater, and an outlet of the working medium heater is connected with an inlet of the expansion side volumetric machine; and a main shaft of the compression side volumetric machine is operably connected to a main shaft of the expansion side volumetric machine;

wherein the compression side volumetric machine adopts the volumetric machine of claim 16, wherein an opening is a working medium inlet of the compression side volumetric machine, and a valve is a one-way valve of the compression side volumetric machine;

wherein the expansion side volumetric machine adopts the volumetric machine of claim 16, wherein an opening is a working medium outlet of the expansion side volumetric machine, and a valve is a control valve of the expansion side volumetric machine.

20. The wide fuel engine of claim 19, wherein the working medium heater is a combustion chamber, wherein the combustion chamber is provided with a fuel nozzle and an ignition device and is provided with at least one of a pressure sensor or a temperature sensor.

21. The wide fuel engine of claim 20, wherein at least two fuel nozzles are configured in the combustion chamber, a first fuel nozzle of the at least two fuel nozzles delivers fuel A, and a second fuel nozzle of the at least two fuel nozzles delivers at least one of water or fuel B; or the combustion chamber has a single fuel nozzle, and the single fuel nozzle comprises at least two access ports, wherein a first access port of the at least two access ports delivers fuel A, and a second access port of the at least two access ports delivers at least one of water or fuel B.

22. The wide fuel engine of claim 19, wherein maximum combustion temperature per revolution of the combustion chamber is controlled by adjusting the fuel injection amount per revolution, a fuel injection duration per revolution, and a distribution state of fuel in the combustion chamber, wherein the maximum combustion temperature is lower than maximum production temperature of a thermal nitrogen oxide NOX permitted by regulations.

23. The wide fuel engine of claim 19, wherein the one-way valve comprises a stationary sealing surface relative to a cylinder block or a cylinder head, the working medium inlet is disposed in a center of the stationary sealing surface, the one-way valve further comprises at least two stacked disc-shaped sealing members, a relative movement gap exists between the at least two stacked disc-shaped sealing members, a disc-shaped sealing member of the at least two stacked disc-shaped sealing members is supported and limited by a guide member, the one-way valve is further provided with an elastic member that acts on the disc-shaped sealing member such that the disc-shaped sealing member leans against the stationary sealing surface, and the disc-shaped sealing member is automatically separated from or in contact with the stationary sealing surface according to a pressure difference between two sides to achieve one-way sealing.

24. The wide fuel engine of claim 19, wherein the control valve is a plug valve, a valve core of the plug valve is driven by a shaft mounted on a cylinder head, the shaft extends out of the cylinder head and is driven by the main shaft at a fixed rotational speed ratio, the shaft is provided with a plurality of pressure equalizing grooves, an oil pool is disposed between the shaft and the cylinder head, and oil in the oil pool is used for sealing and lubrication; or the valve core of the plug valve is driven by an electromagnetism component mounted on the cylinder head or driven by a magnetic coupling component mounted on the cylinder head, and the electromagnetism or the magnetic coupling is driven by a magnetic force and separates pressure of inner and outer spaces with a housing or an isolation sleeve.

25. The wide fuel engine of claim 24, wherein a through-overlap angle between a valve seat opening and a valve core opening of the plug valve is selected such that a compression ratio at a compression side reaches a designed maximum value when fuel injected into a combustion chamber per revolution reaches a maximum value.

26. The wide fuel engine of claim 19, wherein the control valve is a solenoid valve and the control valve comprises a stationary sealing surface relative to a cylinder block or a cylinder head, a valve stem, a valve stem guide member, a disc-shaped sealing member at an end of the valve stem, a reset elastic member, a first armature, a first electromagnet, a second armature, and a second electromagnet;

wherein a working medium outlet is disposed in a center of the stationary sealing surface, and current and on-off state of the first electromagnet and the second electromagnet are controlled by an electronic control unit (ECU), wherein during a process of opening the solenoid valve, the first armature is attracted by the first electromagnet, and the second armature is attracted by the second electromagnet; and during a process of closing the solenoid valve, the second armature is released by the second electromagnet, and the first armature is released by the first electromagnet.

27. The wide fuel engine of claim 26, wherein an occasion when the solenoid valve or the gate valve is closed after being opened is controlled to control pressure of a combustion chamber, so that a compression ratio at a compression side is controlled.

28. The wide fuel engine of claim 19, wherein the control valve is a gate valve and comprises a stationary sealing surface relative to a cylinder block or a cylinder head and a gate plate;

wherein the gate plate comprises a through hole, accommodation cavities, and at least two nested disc-shaped sealing members accommodated in the accommodation cavities;

wherein each of the at least two nested disc-shaped sealing members has an accommodation cavity except for a smallest disc-shaped sealing member of the at least two nested disc-shaped sealing members which has no accommodation cavity and is a sheet sealing member so that a disc-shaped sealing member one level smaller than a disc-shaped sealing member of the at least two nested disc-shaped sealing members is accommodated, radial gaps and axial gaps exist between all the accommodation cavities and disc-shaped sealing members of the at least two nested disc-shaped sealing members accommodated in and in direct contact with the accommodation cavities;

wherein the sealing surface is provided with a working medium outlet, and the gate valve further comprises a gate plate driving device for driving the gate plate such that the through hole is connected with the working medium outlet or the disc-shaped sealing members and the sheet sealing member seal the working medium outlet to achieve on-off of a working medium.

29. The wide fuel engine of claim 19, wherein an expansion work volume per revolution at an expansion side is greater than a compression volume per revolution at a compression side.

30. A volumetric machine, comprising:

a rotor, a cylinder block, and cylinder heads located at two sides of the cylinder block, wherein the rotor is rotatably and eccentrically mounted in a cylindrical inner wall of the cylinder block through a main shaft and bearings by means of the cylinder heads;

the rotor is a rotor of a combined sealing piece, a basic cylinder of the rotor is provided with an accommodation cavity that passes through a rotation axis, and the accommodation cavity is configured to accommodate the combined sealing piece;

each of two end surfaces of the rotor comprises at least a pair of arc-shaped grooves and arc-shaped sealing members in the at least a pair of arc-shaped grooves;

at least one groove is opened on an inner wall where the rotation axis of the rotor is closest to the cylindrical inner wall of the cylinder block, and a radial sealing strip that acts on the rotor is disposed in a groove of the at least one groove;

a variable volume is isolated in the cylindrical inner wall of the cylinder block by the rotor and the radial sealing strip that acts on the rotor, and an opening and a valve for entry and exit of a working medium are on the cylinder block or a cylinder head of the cylinder heads on each of one side of a low-pressure region and one side of a high-pressure region separated by the radial sealing strip, respectively; and the volumetric machine further comprises a lubrication channel and a cooling surface;

wherein the combined sealing piece is the combined sealing piece of claim 1.

31. The volumetric machine of claim 30, wherein an inner wall of the cylindrical inner wall of the cylinder block facing away from the rotation axis of the rotor is basically an elliptical arc cylindrical surface, an inner wall of the at least one groove opened where the rotation axis of the rotor is closest to the cylindrical inner wall of the cylinder block is an arc cylindrical surface, an arc center line of the arc cylindrical surface coincides with the rotation axis of the rotor, and the arc cylindrical surface and the elliptical arc cylindrical surface are adjacent and tangentially transitioned by arc cylindrical surfaces with at least one radii.

32. The volumetric machine of claim 31, wherein an anti-off step is disposed between the radial sealing strip that acts on the rotor and the groove corresponding to the radial sealing strip, the radial sealing strip is allowed to have a radial movement gap, a position of the radial sealing strip on the arc cylindrical surface is centered or biased towards the side of the low-pressure region, and an elastic member is disposed between the radial sealing strip and the groove of the radial sealing strip and the radial sealing strip is in contact with the rotor through the elastic member.

33. The volumetric machine of claim 30, wherein each of the two end surfaces of the rotor further comprises a groove bottom of the at least a pair of arc-shaped grooves and an elastic sealing member between the arc-shaped sealing members, and a cross section of an arc-shaped sealing member of the arc-shaped sealing members is square or rectangular.

34. The volumetric machine of claim 33, wherein the arc-shaped sealing member is provided with a concave-convex interlocking shape between a position closest to a front end in a direction of rotation and the arc-shaped groove, the arc-shaped sealing member is circumferentially fixed, and a tail of the arc-shaped sealing member comprises a section of jointed arc-shaped sealing member.

35. A volumetric machine, comprising:

a rotor, a cylinder block, and cylinder heads located at two sides of the cylinder block, wherein the rotor is rotatably mounted in a cylindrical inner wall of the cylinder block through a main shaft and bearings by means of the cylinder heads;

the rotor is an olive-shaped rotor, an outline of the rotor closest to the cylindrical inner wall of the cylinder block is formed by two centrosymmetric arcs whose centers are coincident, the outline extends smoothly from a same side of the two arcs towards each other until overlapping, a distance from each point of the outline to a rotary axis center gradually decreases from a maximum value to a minimum value during an extension process, cylindrical surfaces of the two arcs closest to the cylindrical inner wall of the cylinder block each comprise at least one groove, and a radial sealing strip that acts on the cylindrical inner wall of the cylinder block is disposed in a groove of the at least one groove;

each of two end surfaces of the rotor is provided with at least one elliptical annular groove and a sealing ring located in the at least one elliptical annular groove;

the cylinder block is provided with two centrosymmetric front accommodation cavities configured to accommodate two combined sealing pieces and two centrosymmetric rear accommodation cavities configured to accommodate drive mechanisms of the two combined sealing pieces;

a variable volume is isolated in the cylindrical inner wall of the cylinder block by the rotor and the two combined sealing pieces, and two openings and two valves for entry and exit of a working medium are on the cylinder block or a cylinder head of the cylinder heads on each of a side of a low-pressure region and a side of a high-pressure region separated by the two combined sealing pieces, respectively; and the volumetric machine further comprises a lubrication channel and a cooling surface;

wherein each combined sealing piece of the two combined sealing pieces is the combined sealing piece of claim 1.

36. The volumetric machine of claim 35, wherein a radius of the two centrosymmetric arcs whose centers are coincident is R00, an arc with a radius of R11 is disposed on each of two sides of the two centrosymmetric arcs with a radius of R00, and two endpoints of each arc with a radius of R11 are equidistant from an adjacent arc with a radius of R00;

wherein R11>R00, a distance from a midpoint of the arc with a radius of R11 to the rotary axis center is less than R00, a transition arc with a radius of R22 or a plurality of transition arcs are disposed between each of the two arcs with a radius of R00 and a respective one of two arcs with a radius of R11, and all the plurality of transition arcs are adjacent, tangent, and connected into a smooth curve.

37. The volumetric machine of claim 35, wherein an anti-off step is disposed between the radial sealing strip that acts on the cylindrical inner wall of the cylinder block and the groove of the radial sealing strip, the radial sealing strip is allowed to have a radial movement gap, and a position of the radial sealing strip on an arc cylindrical surface is centered or biased towards the side of the low-pressure region.

38. The volumetric machine of claim 35, wherein each of the two end surfaces of the rotor further comprises a groove bottom of the at least one elliptical annular groove and an elastic sealing member between sealing rings, and a cross section of the sealing ring is square or rectangular; or the sealing ring is formed by rolling a sheet with a length greater than a circumference of the annular groove, and two ends of the sheet gradually become thinner.

39. The volumetric machine of claim 35, wherein a drive mechanism of the drive mechanisms of the two combined sealing pieces is a cam mechanism, the cam mechanism is rotatably mounted in a rear accommodation cavity of the two centrosymmetric rear accommodation cavities and driven by the main shaft at a fixed rotational speed ratio;

wherein a slider of a combined sealing piece of the two combined sealing pieces is provided with a roller follower, an end of the slider receives a force from the rotor acting on a sealing end surface of each sealing piece, another end of the slider receives a force applied by a cam of the cam mechanism to the roller follower, and the slider on which the two forces act slides back and forth; and a shape of the cam is configured such that a main sealing piece is always in contact with the rotor and no relative displacement occurs between the main sealing piece and the slider.

40. The volumetric machine of claim 35, wherein a surface of the cylinder head facing the rotor is provided with at least one small dent or at least one thin groove, the at least one small dent or the at least one thin groove is closest to the cylindrical inner wall of the cylinder block and has an opportunity to be in contact with lubricating oil in sealing rings on the two end surfaces of the rotor.

* * * * *